(12) United States Patent
Adachi et al.

(10) Patent No.: US 7,495,719 B2
(45) Date of Patent: Feb. 24, 2009

(54) DEVICE CAPABLE OF SWITCHING BETWEEN AN IMAGE DISPLAY STATUS AND A MIRROR STATUS, AND AN INSTRUMENT DISPOSED THEREWITH

(75) Inventors: Masaya Adachi, Hitachi (JP); Makoto Tsumura, Hitachi (JP); Gorouta Fuji, Tokyo (JP)

(73) Assignee: Hitachi Displays, Ltd., Chiba (JP)

( * ) Notice: Subject to any disclaimer, the term of this patent is extended or adjusted under 35 U.S.C. 154(b) by 379 days.

(21) Appl. No.: 10/468,872

(22) PCT Filed: Apr. 27, 2001

(86) PCT No.: PCT/JP01/03710

§ 371 (c)(1),
(2), (4) Date: Aug. 25, 2003

(87) PCT Pub. No.: WO02/069031

PCT Pub. Date: Sep. 6, 2002

(65) Prior Publication Data

US 2004/0100598 A1 May 27, 2004

(30) Foreign Application Priority Data

Feb. 28, 2001 (JP) ............................... 2001-56034

(51) Int. Cl.
*G02F 1/1335* (2006.01)
(52) U.S. Cl. .......................................... 349/96; 349/74
(58) Field of Classification Search .................. 349/96, 349/74
See application file for complete search history.

(56) References Cited

U.S. PATENT DOCUMENTS 5,557,177 A * 9/1996 Engle .......................... 315/366

(Continued)

FOREIGN PATENT DOCUMENTS

JP 10-197844 7/1998

(Continued)

OTHER PUBLICATIONS

Okuda, Shino, et al. "Study on Establishing an Evaluation Method for the Visibility of the Human Face-Visual Factors Used in the Evaluation Method and the Composition of Verbal Expressions Used to Evaluate Visibility." J. Illum. Engng. Inst. Japan. vol. 84 No. 11 2000, pp. 809-814.

*Primary Examiner*—Richard H Kim
(74) *Attorney, Agent, or Firm*—McDermott Will & Emery LLP

(57) ABSTRACT

There is provided a device capable of switching between a state that displays a high-quality image and a mirror status in which is obtained an easy-to-view reflection image suitable for a person to view his/her own face or figure. An image display portion 1000 that emits image light 3001, reflective polarization selection means 300 that transmits a first linear polarization component emitted from the image display portion 1000 and reflects a second linear polarization component, whose polarization axis is orthogonal to that of the first linear polarization component, a transmission polarization axis variable portion 400 capable of selecting between one of a state that changes the polarization axis of incident linearly polarized light and a state that does not change the polarization axis of incident linearly polarized light, and a polarization selection member 500 which, of the incident light, absorbs the first linear polarization component and transmits the second linear polarization component, whose polarization axis is orthogonal to that of the first linear polarization component, are disposed in this order. In this case, absorbing polarization selection means 208 is disposed at the image display portion 1000, and the first linear polarization is emitted as the image light.

13 Claims, 41 Drawing Sheets

U.S. PATENT DOCUMENTS

| | | |
|---|---|---|
| 6,462,724 B1 | 10/2002 | Ozawa et al. |
| 6,507,380 B1 * | 1/2003 | Iijima .......................... 349/96 |
| 6,646,697 B1 | 11/2003 | Sekiguchi et al. |
| 6,707,515 B1 * | 3/2004 | Ide et al. ....................... 349/74 |

FOREIGN PATENT DOCUMENTS

| | | |
|---|---|---|
| JP | 11-015392 | 1/1999 |
| JP | 11-223680 | 8/1999 |
| JP | 11-291817 | 10/1999 |

* cited by examiner

RALATION BETWEEN DEGREE OF POLARIZATION OF
ABSORBING POLARIZATION SELECTION MEMBER 500
AND REFLECTANCE IN MIRROR STATUS AND
UNNECESSARY REFLECTANCE IN IMAGE DISPLAY STATUS

RALATION BETWEEN DISPLAY LUMINANCE AND DEGREE
OF POLARIZATION OF ABSORBING POLARIZATION
SELECTION MEMBER 208

FIG. 33

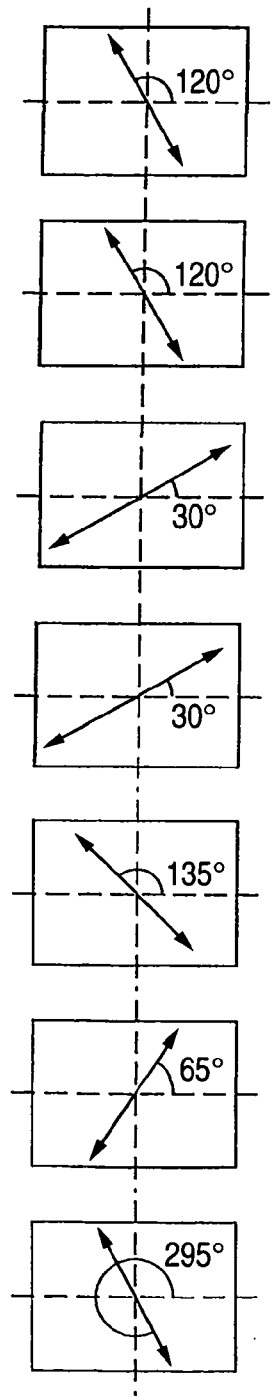

ABSORBING POLARIZATION SELECTION MEMBER 500 LINEAR POLARIZATION TRANSMISSION POLARIZATION AXIS

LIQUID CRYSTAL ORIENTATION AXIS OF LIQUID CRYSTAL LAYER 407 OF TRANSMISSION POLARIZATION AXIS VARIABLE PORTION 400 (TRANSPARENT SUBSTRATE 401 SIDE)

LIQUID CRYSTAL ORIENTATION AXIS OF LIQUID CRYSTAL LAYER 407 OF TRANSMISSION POLARIZATION AXIS VARIABLE PORTION 400 (TRANSPARENT SUBSTRATE 402 SIDE)

REFLECTIVE POLARIZATION SELECTION MEMBER 300 LINEAR POLARIZATION TRANSMISSION POLARIZATION AXIS

PHASE- DIFFERENCE PLATE 3020 OF REFLECTIVE LIQUID CRYSTAL ELEMENT 3000 LAG AXIS

LIQUID CRYSTAL ORIENTATION AXIS OF LIQUID CRYSTAL LAYER 3130 OF REFLECTIVE LIQUID CRYSTAL ELEMENT 3000 (TRANSPARENT SUBSTRATE 3030 SIDE)

LIQUID CRYSTAL ORIENTATION AXIS OF LIQUID CRYSTAL LAYER 3130 OF REFLECTIVE LIQUID CRYSTAL ELEMENT 3000 (TRANSPARENT SUBSTRATE 3100 SIDE)

DEVICE CAPABLE OF SWITCHING BETWEEN AN IMAGE DISPLAY STATUS AND A MIRROR STATUS, AND AN INSTRUMENT DISPOSED THEREWITH

TECHNICAL FIELD

The present invention relates to a display device including a mirror function that can switch a display screen to a mirror, an instrument disposed therewith, and to a mirror including an image display function that can switch a mirror to an image display screen, and an instrument disposed therewith.

BACKGROUND ART

As described in, for example, JP-A-11-15392 and JP-A-11-291817, display devices in which a half mirror material is disposed on a front surface of an image display member, such as a liquid crystal display device, have been known as display devices capable of switching to a mirror status that reflects outside light (or a mirror disposed with a display function). In these display devices, because outside light reflected by the half mirror material becomes greater than image light transmitted through the half mirror material when a lighting system is turned off or when an image is a dark display, the state becomes a mirror status. Conversely, because the image light transmitted through the half mirror material becomes greater than the outside light reflected by the half mirror material when the lighting system is turned on or when an image is a bright display, the state becomes an image display status. That is, in these display devices, it is possible to change the same viewing screen between a mirror status and an image display status by switching the brightness of the image display member at the half mirror material rear surface.

Also, in the republished publication of International Publication No. WO99/04315, a liquid crystal display device capable of switching between an open shutter state, in which an image display is viewed, and a closed shutter state, in which the image display is not viewed, is disclosed. According to this publication, it is written that outside light is reflected and becomes "metallic" at the time of the closed shutter state.

The liquid crystal display device of the republished publication of WO99/04315 is one in which two liquid crystal display panels, in which a liquid crystal layer is injected into a gap between a pair of substrates disposed with electrodes, are stacked, and a polarizing plate is disposed at three places on an upper surface and a lower surface of the two stacked liquid crystal display panels, and between the two liquid crystal display panels. Of these polarizing plates, a reflective polarizing plate, which transmits a predetermined linear polarization and reflects a linear polarization whose polarization axis is orthogonal to that of the predetermined linear polarization, is used as the polarizing plate disposed between the liquid crystal display panels. The transmission polarization axis of the reflective polarizing plate is parallel to the transmission polarization axis of the polarizing plate on the upper surface of the two stacked liquid crystal display panels. Also, a Twist Nematic liquid crystal is used for the liquid crystal of the liquid crystal display panel of the upper side (viewer side). In this configuration, when a voltage applied to the liquid crystal layer of the liquid crystal display panel of the upper side is small, the light transmitted through the polarizing plate of the upper surface is strongly reflected due to reflectance characteristics of the reflective polarizing plate, because the polarization direction is rotated 90 degrees and the light reaches the reflective polarizing plate when it is transmitted through the liquid crystal layer. Thus, the state becomes the "metallic" closed shutter state. Conversely, when a voltage applied to the liquid crystal layer of the liquid crystal display panel of the upper side is large, the polarizing plate of the upper side, the liquid crystal display panel of the upper side, and the reflective polarizing plate becomes an effectively transparent state and the state thereof becomes the open shutter state in which the image display of the liquid crystal display panel of the lower side is viewed. That is, due to the voltage applied to the liquid crystal display panel of the upper side, it is possible to switch between the closed shutter state, in which outside light is reflected and "metallic" is provided, and the open shutter state, in which the display of the liquid crystal display panel of the lower side is viewed.

DISCLOSURE OF THE INVENTION

Although the above-described conventional display devices are capable of switching to a mirror-like state that reflects outside light, the mirror-like state is insufficient to use as a mirror with which a person can view his/her own reflected face or figure. This will be described specifically below.

Because the display devices of JP-A-11-15392 and JP-A-11-291817 use a half mirror, the brightness of the mirror status reflecting outside light is dependent on the reflectance of the half mirror. For this reason, it is necessary to raise the reflectance of the half mirror in order to make a bright mirror that can be used as a mirror reflecting a person's own face or figure. However, when the reflectance of the half mirror is raised, the display image becomes dark because the light amount of the image drops by the amount of light reflected by the half mirror material at the time the display device is in the image display status. That is, because there is a trade-off relation between the brightness of the image in the image display status and the brightness of the mirror in the mirror status, it is difficult to balance both a bright image display and a bright mirror. For this reason, it is difficult to raise the brightness of the mirror status of a display device using a half mirror to the extent that it can be used as a mirror for a person to view his/her own reflected face or figure.

Also, when such a display device using a half mirror is used in a bright environment, part of the outside light is reflected by the half mirror even if the display device is in the image display status. For this reason, deterioration of image quality, such as glare of the outside light and a drop in the contrast ratio of the image resulting from reflection of the outside light, arises in the image display status.

In the display device of the republished publication of International Publication No. WO99/04315, the following problems arise when the reflective function of outside light is made to function as a mirror for a person to view his/her own reflected face or figure.

In this display device, when the voltage applied to the liquid crystal layer of the upper side (the viewer side) liquid crystal panel of the two liquid crystal panels is small, the state becomes the "metallic" closed shutter state. In this case, light made incident from the outside is transmitted through the polarizing plate of the upper surface, is transmitted through the liquid crystal layer of the upper side liquid crystal panel, is reflected by the reflective polarizing plate, and again returns to the outside. Thus, a mirror-like reflectance is provided. Of the image display light emitted from the lower side liquid crystal panel, because the polarization axis of light whose state of polarization is controlled as dark display portion light is orthogonal to the transmission polarization axis of the reflective polarizing plate, the light is reflected by the reflective polarizing plate and is not emitted to the outside. However, in reality, because a reflective polarizing plate whose reflectance in the direction orthogonal to the transmission polarization axis is completely 100% does not exist, part of the dark display portion light is transmitted through the reflective polarizing plate. Because the polarization axis of the dark display light transmitted through the reflective polarizing plate matches the transmission polarization axis of the polarizing plate of the upper surface due to the dark display light being transmitted through the liquid crystal layer of the upper side liquid crystal panel, the dark display light is transmitted therethrough and is viewed by the viewer. That is, at the time of the closed shutter mirror status, light leakage arises from the dark display portion of the image to the outside.

Of the image display light emitted from the lower side liquid crystal panel, because the polarization axis of light whose polarization state is controlled as bright display light is parallel to the transmission polarization axis of the reflective polarizing plate, the light is transmitted therethrough and passes through the liquid crystal layer of the upper side liquid crystal panel. Because the polarization axis is rotated 90 degrees at this time, the polarization axis is orthogonal to the polarizing plate of the upper surface and is absorbed by the polarizing plate of the upper surface. As is commonly known, when light passes through a liquid crystal layer whose liquid crystal molecules are continuously twisted in the thickness direction and is emitted, because the polarization states of light emitted in a diagonal direction of the liquid crystal layer differ due to the state of inclination and twist of the liquid crystal molecules in the thickness direction, a polarization component that is parallel to the transmission polarization axis of the polarizing plate of the upper surface is included in the light emitted in the diagonal direction. For this reason, much light leakage arises from a more diagonal direction than the front direction of the display device, whereby the light leakage is viewable to the viewer.

FIG. 44 shows results in which the present inventors actually created a display device that was virtually the same as the display device of the republished publication of International Publication No. WO99/04315 and measured the leakage of light in the closed shutter state. The graph of FIG. 44 is data in which image display was conducted in the lower side liquid crystal panel so that a luminance of 450 cd/m$^2$ was obtained in the bright display portion when the display device was image-displayed in the open shutter state, and in that state, the upper side liquid crystal panel was switched to the closed shutter state and light leakage from the front surface of the display device was measured. The horizontal axis of FIG. 44 represents positions on the display portion of the display device and the vertical axis represents luminance values in the front direction.

As shown in FIG. 44, light leakage in the front direction of the dark display portion was a luminance value of 24 to 28 cd/m$^2$, and light leakage in the front direction of the bright display portion was a luminance value of 4 to 5 cd/m$^2$. Thus, light leakage in the front direction was about seven times larger in the dark display portion than in the bright display portion. Also, leakage of light at the dark display portion was uneven with respect to position, and color unevenness was also discernible. It should be noted that the luminance value of 4 to 5 cd/m$^2$ is a value that is sufficiently visible in a dim environment. Also, when observed from a diagonal direction, leakage of light of 4 to 5 cd/m$^2$ or more from the bright display portion was viewed depending on the direction. In this manner, when the closed shutter state of the conventional display device is made to function as a mirror, the contrast ratio of the reflection image remarkably drops because of the leakage of light. For this reason, it is not sufficient as a mirror reflecting a person's face or figure.

It should be noted that the birefringence reflective polarization film, in which different birefringence polymer films are alternatingly laminated, disclosed in, for example, International Application International Publication No. WO95/27919 can be used as a reflective polarizing plate. This reflective polarizing plate is one that is ordinarily disposed between a lighting system (backlight) and a polarizing plate disposed at an undersurface side of a liquid crystal element and in which extremely high effects are obtained when used for the purpose of improving the usability of illumination light. However, because leakage of light with respect to a predetermined polarization becomes a large problem when realizing mirror capabilities of the kind that the present inventors aim to realize, sufficient mirror capabilities cannot be obtained only with this kind of reflective polarizing plate.

It is an object of the present invention to provide a device that is capable of switching between a state in which a high-quality image is displayed and a mirror status in which is obtained an easy-to-view reflection image suitable for a person to view his/her own face or figure.

In order to attain this object, according to the invention, a device capable of switching between an image display status and a mirror status of the following configuration is provided.

That is, there is provided a device capable of switching between an image display status and a mirror status, the device including an image display portion that emits image light for displaying a desired image and a mirror function portion that is superposed on the image display portion and is capable of being switched between an image transmittance state that transmits the image light and a mirror status that reflects outside light, the mirror function portion including reflective polarization selection means, transmission polarization axis variable means, and absorbing polarization selection means successively disposed from the image display portion side, with the reflective polarization selection means transmitting a first polarization of a predetermined polarization axis and reflecting a second polarization whose polarization axis intersects that of the first polarization, the transmission polarization axis variable means being capable of switching between a state that transmits by changing the incident first polarization to the second polarization and a state that transmits without changing the polarization axis of the incident light, and the absorbing polarization selection means transmitting one of the first polarization and the second polarization and absorbing the other, and the image display portion being disposed with image light-use polarization selection means that transmits the first polarization and absorbs the second polarization, the image display portion emitting, as the image light, the first polarization transmitted through the image light-use polarization selection means.

BRIEF DESCRIPTION OF THE DRAWINGS

FIG. 33 are explanatory drawings of directions of axes of the respective members configuring the display device of Example 6 of the invention.

BEST MODES FOR IMPLEMENTING THE INVENTION

A device of an embodiment of the invention will be described below.

In the present embodiment, a device capable of switching between an image display status and a mirror status (i.e., a display device disposed with a mirror function or a mirror disposed with a display function) is provided. In the mirror status, the device prevents light leakage of image display light and a reflection image that is bright and has a high contrast ratio can be obtained. Thus, in the case of the mirror status, the device of the present embodiment is suited for a person to view his/her own reflected face or figure. It is commonly thought that the way people view faces is dependent upon physical quantities, such as area size, luminance, and contrast ratio (luminance contrast), and it has been experimentally confirmed that, the larger the contrast ratio (luminance contrast) is, the higher the evaluation that something is easy to see is (Shino Okada and Ryuji Sato, "Hito no kao no miekata ni taisuru hyokaho no kochiku ni kansuru kiso kento" ("Basic considerations relating to the construction of evaluation methods with respect to the way people view faces"), *Shomei Gakkaishi* ("Journal of Light & Visual Environment"), Vol. 84, No. 11, pp. 809-814). Also, with the device of the present embodiment, in the image display status, there is little deterioration of image quality, such as a drop in the contrast ratio or glare of outside light, even in a bright environment, and a bright image is obtained.

A display device disposed with a function for switching to a mirror status of the embodiments of the invention will be described below with reference to FIGS. 1 to 6.

First Embodiment

First, the basic configuration and operation of a display device disposed with a function for switching to a mirror status of a first embodiment will be described using FIGS. 1 and 2.

Figure 1:
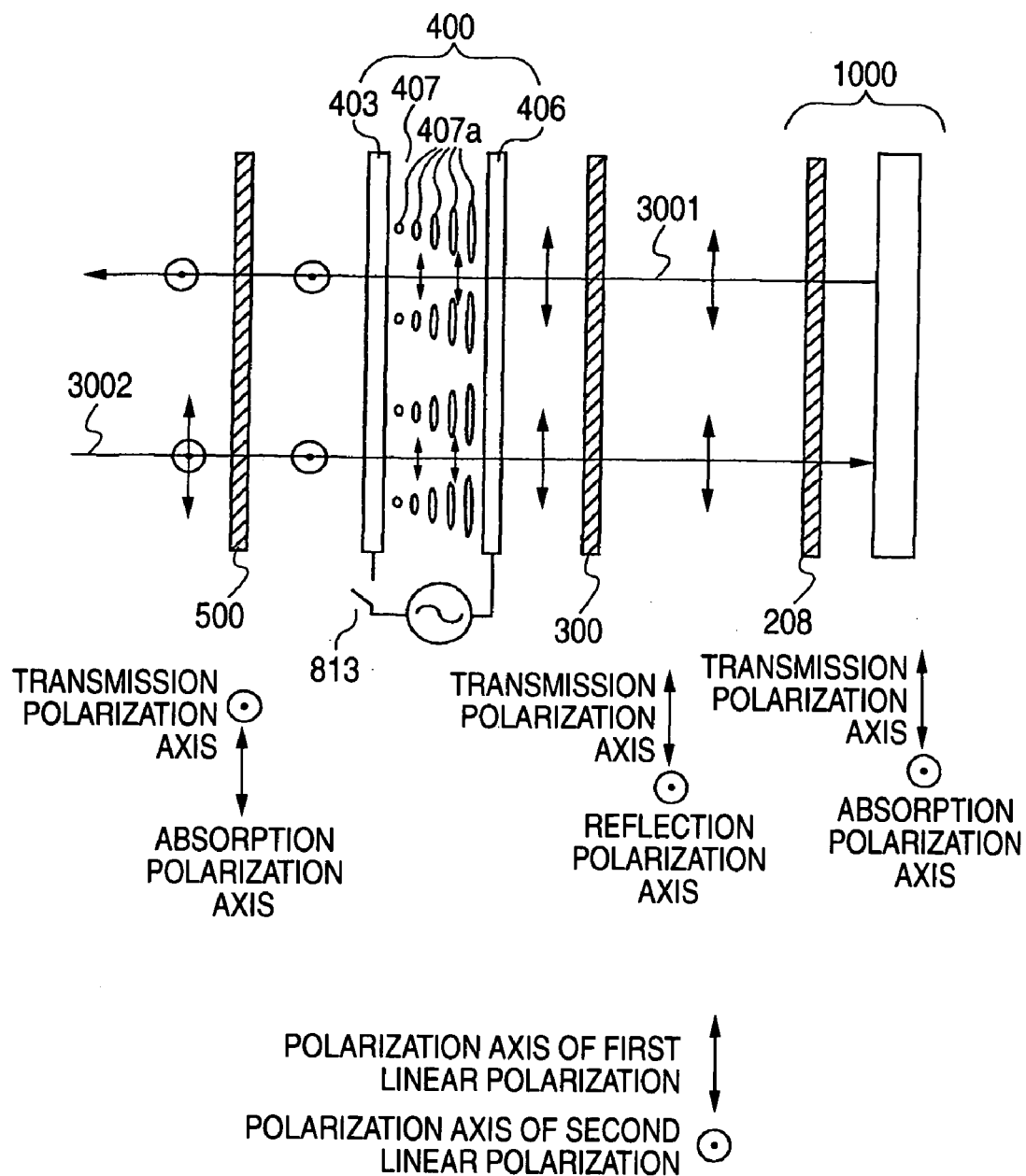
FIG. 1 is an explanatory drawing for explaining the basic configuration and operation of a display device, disposed with a function for switching to a mirror status, of a first embodiment of the invention.

As shown in FIG. 1, the display device of the first embodiment includes an image display portion 1000, a reflective polarization selection member 300, a transmission polarization axis variable portion 400, and an absorbing polarization selection member 500, which are successively disposed. The image display portion 1000 includes an absorbing polarization selection member 208 that transmits a linear polarization component of a predetermined direction and absorbs a linear polarization component of a direction orthogonal thereto, and the absorbing polarization selection member 208 is disposed at the reflective polarization selection member 300 side. In the present embodiment, the image display portion 1000 includes two absorbing polarization selection members that sandwich a lighting system, a liquid crystal layer, and a liquid crystal layer. Of the two absorbing polarization selection members, the one at the emission side is the absorbing polarization selection member 208. A voltage applied to the liquid crystal layers is changed between a bright display region and a dark display region, the linear polarization transmitted through the absorbing polarization selection member 208 is emitted from the bright display region, light is absorbed by the absorbing polarization selection member 208 at the dark display region, and the light is not emitted. Thus, it is a configuration that displays an image. Accordingly, image light (bright display light) emitted from the image display portion 1000 is a linear polarization including a polarization axis that matches a transmission polarization axis of the absorbing polarization selection member 208. A linear polarization including a polarization axis of a direction that is the same as that of a polarization axis of the image light will be referred to below as a "first linear polarization". A linear polarization of a direction in which a polarization axis thereof is orthogonal to that of the first linear polarization will be referred to as a "second linear polarization".

The reflective polarization selection member 300 is a member that transmits a linear polarization component of a predetermined direction and reflects a linear polarization component orthogonal thereto. Here, the reflective polarization selection member 300 is disposed at an orientation that transmits the first linear polarization component and reflects the second linear polarization component.

The transmission polarization axis variable portion 400 is an element including a structure that can select, by electrical switching, between a state that changes the polarization axis when incident linearly polarized light is transmitted therethrough and a state that does not change the polarization axis. In the present embodiment, a liquid crystal element, which includes a liquid crystal layer 407 and transparent electrodes 403 and 406 for applying a voltage to the liquid crystal layer 407, is used as the transmission polarization axis variable portion 400. A switching switch 813, which switches the voltage on and off, is connected to the transparent electrode 403. When the voltage applied to the liquid crystal layer 407 is switched off by the switching switch 813, the liquid crystal layer 407 is in a state that changes the polarization axis of an incident linear polarization, and when the voltage is switched on, the liquid crystal layer 407 is in a state that does not change the polarization axis. In the present embodiment, the liquid crystal layer 407 is a so-called Twist Nematic (TN) liquid crystal configured so that, when the voltage is OFF, long axes of liquid crystal molecules 407a are continuously twisted 90° between the transparent electrode 403 and the transparent electrode 406. The orientation direction of the liquid crystal layer 407 is set to a direction in which the first linear polarization made incident from the reflective polarization selection member 300 side is changed to the second linear polarization. When the voltage is on, the liquid crystal molecules 407a of the liquid crystal layer 407 stand perpendicular to the transparent electrodes 403 and 406, as shown in FIG. 2, and become a state that does not change the polarization axis of the incident light.

The absorbing polarization selection member 500 is a member that transmits a linear polarization component of a predetermined direction and absorbs a linear polarization component of a direction orthogonal thereto. Here, the absorbing polarization selection member 500 is disposed so as to absorb the first linear polarization component and transmit the second linear polarization component of the incident light.

It should be noted that a viewer views the present display device from the absorbing polarization selection member 500 side (the left side of the page in FIG. 1).

Next, the operation of the display device of the first embodiment will be described using FIGS. 1 and 2.

As shown in FIG. 1, when the display device of the present embodiment is used in the image display status, the switching switch 813 is switched off and the display device is set so that the liquid crystal molecules 407a of the liquid crystal layer 407 of the transmission polarization axis variable portion 400 are in a 90° twisted state. In this state, image light (bright display light) 3001 of a desired display is emitted from the image display portion 1000. Because the image. light 3001 is light that passes through the absorbing polarization selection member 208 of the image display portion 1000, it is the first linear polarization. Accordingly, the polarization axis of the image light 3001 matches the transmission polarization axis of the reflective polarization selection member 300, and the image light 3001 is transmitted through the reflective polarization selection member 300 and is made incident at the transmission polarization axis variable portion 400. As mentioned above, because the liquid crystal layer 407 of the transmission polarization axis variable portion 400 is set to an OFF state, the image light 3001 of the incident first linear polarization becomes the second linear polarization due to its polarization axis being rotated along the twist of the liquid crystal molecules 407a, and is emitted. Because the polarization axis of the image light 3001 that has become the second linear polarization matches the transmission polarization axis of the absorbing polarization selection member 500, the image light 3001 is transmitted therethrough and is viewable to the viewer.

On the other hand, because outside light 3002 that is made incident at the display device from the viewer side when the display device is in the image display status is non-polarized light, the first linear polarization component is absorbed when it is transmitted through the absorbing polarization selection member 500, and only the second linear polarization component is transmitted. The outside light 3002 of the second linear polarization that is transmitted through the absorbing polarization selection member 500 is changed from the second linear polarization to the first linear polarization when it is transmitted through the transmission polarization axis variable portion 400. Thus, because the polarization axis thereof matches the transmission polarization axis of the reflective polarization selection member 300, it is transmitted and made incident at the image display portion 1000 without being reflected by the reflective polarization selection member. Because the polarization axis of the outside light 3002 of the incident first linear polarization matches the transmission polarization axis of the absorbing polarization selection member 208, the outside light 3002 is transmitted through the absorbing polarization selection member 208 and made incident at the liquid crystal layer of the image display portion 1000. At this time, the light made incident at the dark display region is absorbed by the absorbing polarization selection member disposed nearer to the lighting system side than the liquid crystal layer. Accordingly, it does not return to the viewer side. Also, the light made incident at the bright display region is also transmitted through the absorbing polarization selection member at a light source side and reaches the lighting system. Although part of the light reaching the lighting system is reflected thereby, the reflected light is substantially no different from the illumination light and becomes part of the illumination light, whereby outside light that causes image quality to deteriorate is not reflected. That is, in the display device of the present embodiment, even if outside light is made incident in the image display status, there is virtually no reflection of outside light that causes image quality to deteriorate.

In this manner, with the display device of the present embodiment, a bright image is obtained because the image light 3001 proceeds toward the viewer with virtually no loss in the image display status. Because the outside light 3002 is virtually not reflected in the display device, there is virtually no deterioration of image quality resulting from reflection of the outside light, such as a glare and a drop in the contrast ratio.

Next, a case in which the display device of the present embodiment is switched to the mirror status and used will be described. In this case, as shown in FIG. 2, the switching switch 813 is switched on, and the liquid crystal molecules 407*a* of the liquid crystal layer 407 of the transmission polarization axis variable portion 400 are set to a state in which they are made to stand.

At this time, although the outside light 3002 proceeding toward the display device from the viewer side is non-polarized light, when it is transmitted through the absorbing polarization selection member 500, the first linear polarization component is absorbed and only the second linear polarization component is transmitted and made incident at the transmission polarization axis variable portion 400. With respect to the transmission polarization axis variable portion 400, because the liquid crystal molecules 407*a* of the liquid crystal layer 407 are in a standing state, the incident outside light 3002 is transmitted through the transmission polarization axis variable portion 400 as the second linear polarization, without its polarization state being changed, and reaches the reflective polarization selection member 300. Because the reflection polarization axis of the reflective polarization selection member 300 matches the polarization axis of the second linear polarization, the outside light 3002 is reflected by the reflective polarization selection member 300. The outside light 3002 reflected by the reflective polarization selection member 300 is again made incident at the transmission polarization axis variable portion 400, is transmitted therethrough as the second linearly polarized light, emitted, further transmitted through the absorbing polarization selection member 400, and proceeds toward the viewer. Thus, a reflection image of the outside light 3002 is obtained, and the mirror status is realized.

At the time of the mirror status, because the image light (bright display light) 3001 emitted from the image display portion 1000 is the first linear polarization transmitted through the absorbing polarization selection member 208, it is transmitted through the reflective polarization selection member 300 and made incident at the transmission polarization axis variable portion 400. Because the transmission polarization axis variable portion 400 is in an ON state, the polarization state of the image light 3001 is not changed, and the image light 3001 is transmitted therethrough as the first linear polarization and made incident at the absorbing polarization selection member 500. Because the first linear polarization matches the absorption polarization axis of the absorbing polarization selection member 500, it is absorbed by the absorbing polarization selection member 500 and is not viewable to the viewer.

In other words, in the case of the mirror status, the light from the image display member does not reach the viewer, and the outside light 3002 made incident at the display device from the surrounding area functions as a bright mirror because half the light of the non-polarized light is ideally reflected by the reflective polarization selection member 300 and proceeds toward the viewer side.

It should be noted that, in the case of the mirror status, the display device of the present embodiment can greatly reduce light leakage in comparison to the display device of the republished publication of International Publication No. WO99/04315. In International Publication No. WO99/04315, light leakage from the dark display portion stemming from the reflective capability of the reflective polarizing plate was a problem in the mirror status. However, in the display device of the present embodiment, because the image display portion 1000 is disposed with the absorbing polarization selection member 208 and absorbs the illumination light of the dark display region, light does not reach the reflective polarization selection member 300 at the dark display region. For this reason, regardless of the capability of the reflective polarization selection member 300, light leakage from the dark display region is virtually not viewable.

Also, the display device of the present embodiment has a configuration in which the transmission polarization axis variable portion 400 is switched on and the liquid crystal molecules 407*a* are made to stand at the time of the mirror status. Usually, with a nematic liquid crystal, there is less offset of the polarization axis of light emitted in a diagonal direction when the voltage is on and the liquid crystal molecules are made to stand than when the voltage is off and the liquid crystal molecules are twisted. For this reason, with the display device of the present embodiment, the effect is obtained that there is little light leakage in a diagonal direction of the image light (bright display light) 3001 in the mirror status in comparison to the display device of the configuration in which the voltage is switched off in the mirror status described in the conventional art.

Figure 3:
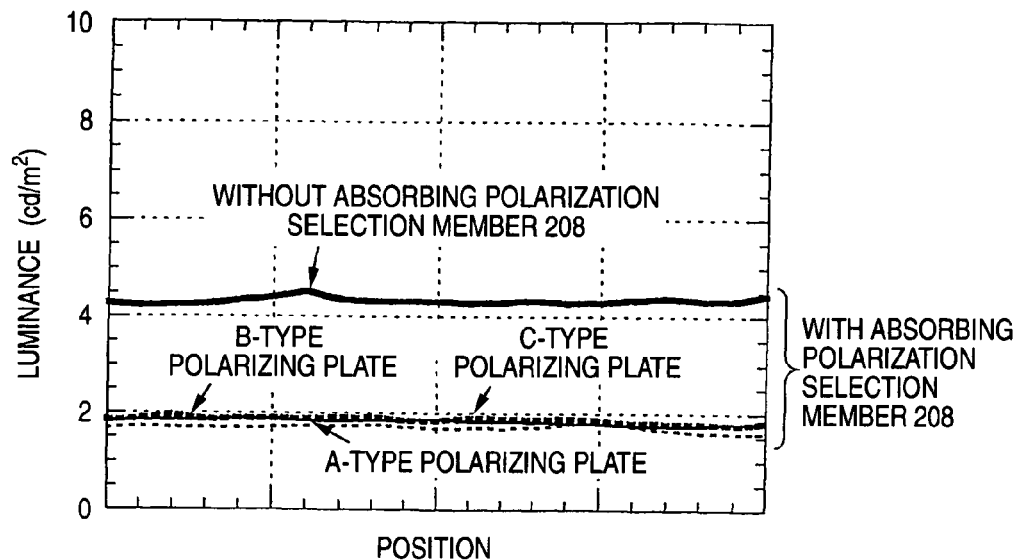
FIG. 3 is a graph showing leakage of light of a bright display region in a case where the display device of FIGS. 1 and 2 is in the mirror status.
Figure 4:
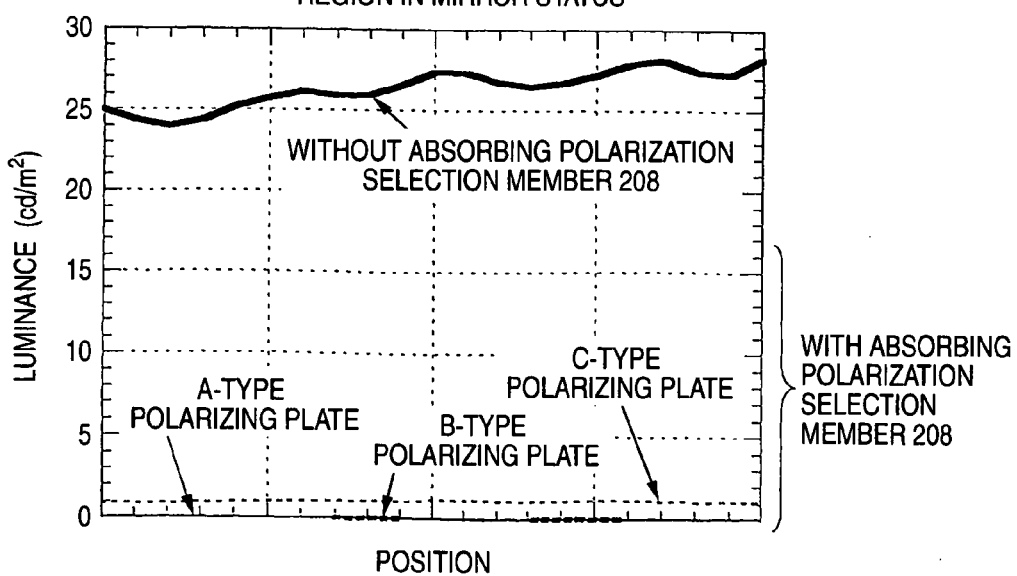
FIG. 4 is a graph showing leakage of light of a dark display region in a case where the display device of FIGS. 1 and 2 is in the mirror status.

Leakage of light from the image display portion 1000 in the mirror status will be specifically described using the graphs of FIGS. 3 and 4. FIG. 3 shows, in luminance values, the magnitude of leakage of light at the bright display region, and FIG. 4 shows, in luminance values, the magnitude of leakage of light at the dark display region. These graphs are data in a case in which bright display at a luminance of 450 cd/m² was conducted when the display device was in the image display status. The horizontal axes represent positions on the display portion of the display device, and the vertical axes represent luminance values in a front direction, i.e., in a direction perpendicular to the screen. FIGS. 3 and 4 also show respective light leakage in configurations using an A-type polarizing plate, a B-type polarizing plate, and a C-type polarizing plate as the absorbing polarization selection member. 208 of the image display portion 1000, and light leakage in a device in which the absorbing polarization selection member 208 was removed from the image display portion 1000 and in which other configurations were the same as those of the image device of the present embodiment. It should be noted that, even with the configuration in which the absorbing polarization selection member 208 had been removed, an image of an ordinary level could be displayed in the image display status. Details of the A-, B-, and C-type polarizing plates will be described later.

As shown in FIG. 3, in the bright display region in the mirror status, leakage of light in the display device of the present embodiment using the absorbing polarization selection member 208 was suppressed to about half the leakage of light in the device in which there was no absorbing polarization selection member 208. For this reason, a mirror that reflected a reflection image in which the contrast ratio was high could be realized with the display device of the present embodiment. Also, as shown in FIG. 4, in the dark display region in the mirror status, because there was virtually no leakage of light in the display device of the present embodiment using the absorbing polarization selection member 208, a mirror reflecting an easy-to-view reflection image in which the contrast ratio was higher could be realized. On the other hand, as shown in FIG. 4, a lot of light leakage arose in the dark display region with the display device that did not use the absorbing polarization selection member 208.

Figure 44:
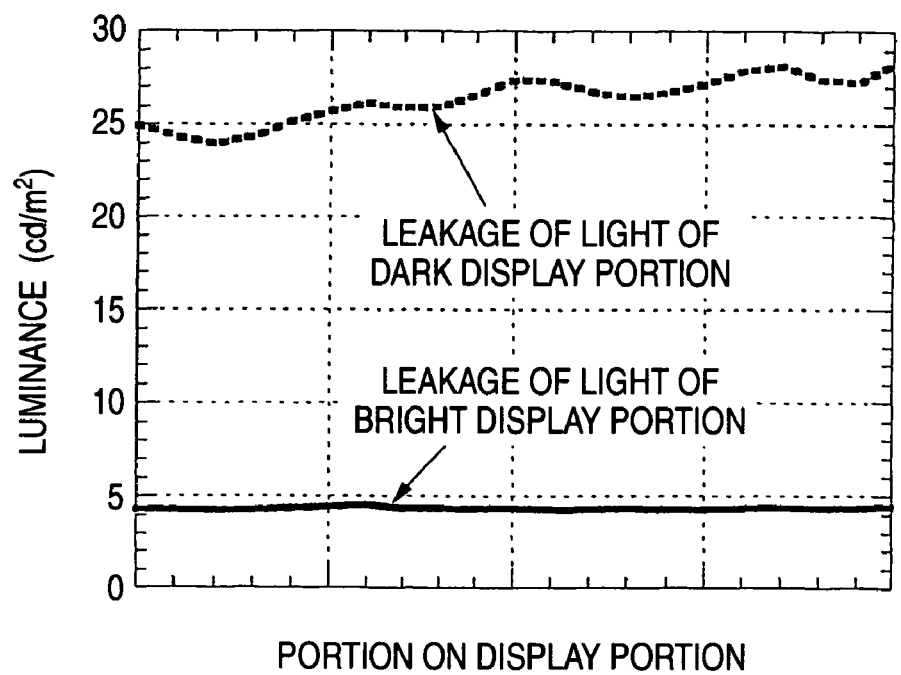
FIG. 44 is a graph showing leakage of light in a shutter state of a conventional display device.

These facts show that, by switching the display of the image display portion 1000 to a dark display at the time of the mirror status, a mirror having good visibility could be realized with the display device of the present embodiment. This is in contrast to the fact that there was more leakage of light in the dark display portion than in the bright display portion in the display device of the configuration not disposed with the absorbing polarization selection member (polarizing plate) 208 showing light leakage in FIGS. 3 and 4 and in the conventional display device showing light leakage in FIG. 44.

Accordingly, in the present embodiment, in a case where the entire screen is switched to the mirror status, the entire image display portion 1000 is switched to the dark display or the entire lighting system of the image display portion 1000 is switched to a non-emitting state. Also, in a case where the voltage is switched on only at a partial region of the transmission polarization axis variable portion 400 and only part of the screen is switched to the mirror status, the image display portion 1000 of the region overlapping with the region switched to the mirror status is switched to the dark display or the non-emitting state. Thus, light leakage from the portion of the mirror status is reduced, and a reflection image having a high contrast ratio can be reflected.

Specifically, if the switching switch 813 is switched on in order to switch to the mirror status, the display device can have a configuration in which a circuit that switches the liquid crystal element of the image display portion 1000 to the dark display in conjunction with the switching switch 813 is disposed, or in which a circuit that turns off the lighting system at the rear side of the liquid crystal element of the image display portion 1000 is disposed. In a case where the lighting system is turned off in the mirror status, reduction of the power consumption of the display device becomes possible. It should be noted that, in a case where only part of the screen is switched to the mirror status and an image is displayed on the remaining portion, it is preferable to switch the image display portion 1000 of the region overlapping with the region switched to the mirror status to the dark display because the display of the image display region becomes dark when the lighting system at the rear side of the liquid crystal element is turned off. Thus, it becomes possible to realize a mirror status that can realize a reflection image having a high contrast ratio and, at the same time, realize a bright image display on the same screen.

In addition to the display portion using the liquid crystal element, a self-luminous display portion, such as an organic electroluminescence (EL: electroluminescence) element, can also be used as the image display portion 1000. The absorbing polarization selection member 208 is disposed at a position facing the EL element reflective polarization selection member 300. When an EL element is used, leakage of light can, in principle, be eliminated by stopping the emission of light itself of the EL element in conjunction with switching to the mirror status and switching the display device to the dark display state. Thus, a high-definition mirror status, in which a reflection image having a high contrast ratio is obtained, can be realized, and reduction of the power consumption of the display device becomes possible.

The display device of the present embodiment can also be made into a projection display device by using a disvoltage lamp, such as a metal halide lamp, as the light source of the lighting system of the image display portion 1000 and combining this with the liquid crystal element. In this case, because the disvoltage lamp cannot be quickly turned on and off, it is preferable to configure the device to reduce light leakage by switching the display of the image display portion 1000 to the dark display in conjunction with switching to the mirror status.

Figure 2:
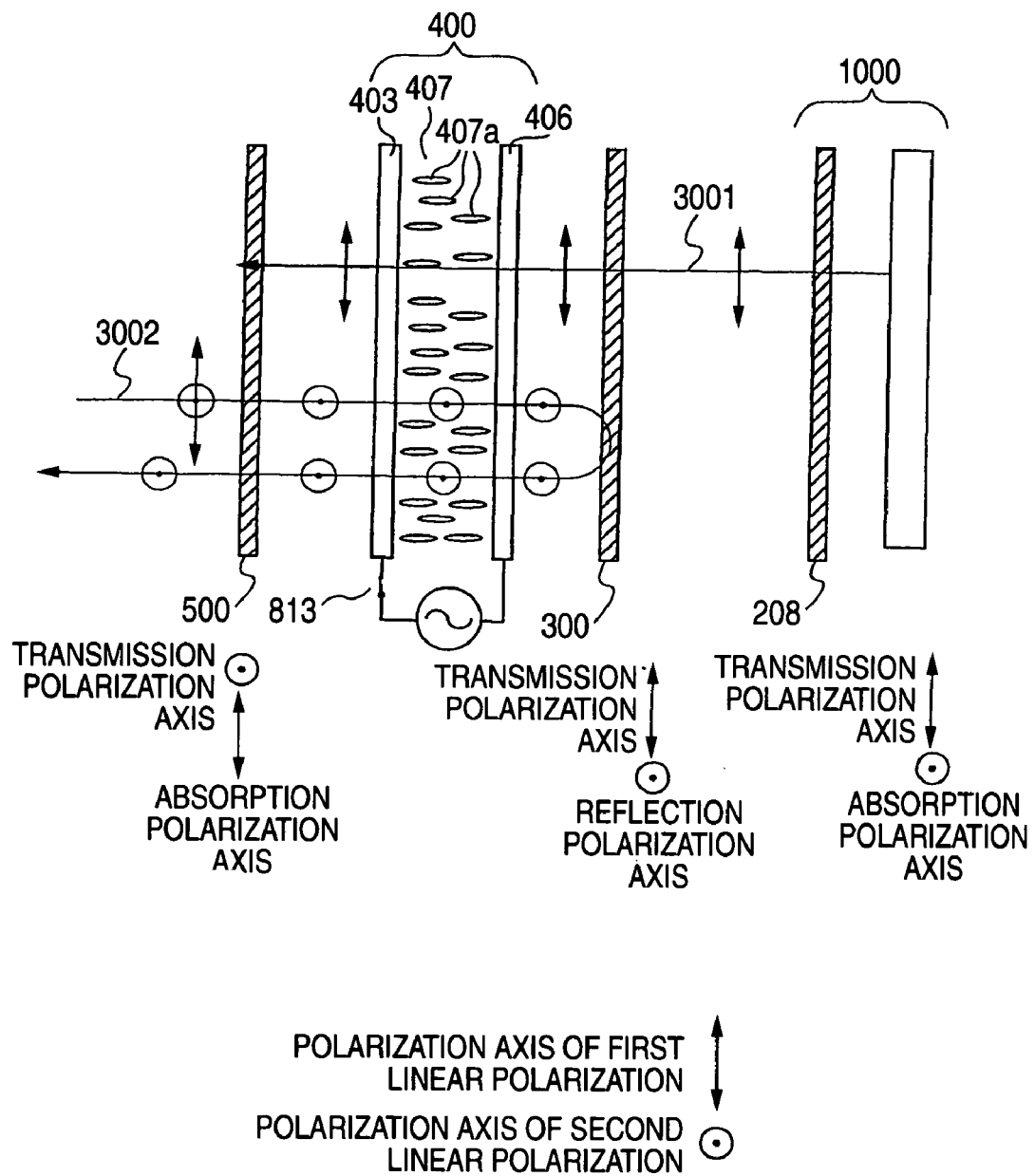
FIG. 2 is an explanatory drawing for explaining the basic configuration and operation of the display device, disposed with a function for switching to a mirror status, of the first embodiment of the invention.

It should be noted that, although a member whose transmission polarization axis is parallel to the polarization axis of the first linear polarization and whose absorption polarization axis is parallel to the polarization axis of the second linear polarization was used in the first embodiment as the absorbing polarization selection member 500, as shown in FIGS. 1 and 2, the present invention is not limited thereto. A member whose transmission polarization axis is parallel to the polarization axis of the second linear polarization and whose absorption polarization axis is parallel to the polarization axis of the first linear polarization can also be used. In this case, the display device is switched to an image transmittance state by switching the transmission polarization axis variable portion 400 to a state that transmits without changing the incident polarization axis (state in which the voltage is on), and the display device is switched to the mirror status by switching the transmission polarization axis variable member 400 to a state that changes the first polarization to the second polarization (state in which the voltage is off).

Second Embodiment

Next, the basic configuration and operation of a display device disposed with a function for switching to a mirror status of a second embodiment of the invention will be described using FIGS. 5 and 6.

The display device of the second embodiment is one in which the absorbing polarization selection member 500 of the display device of FIGS. 1 and 2 of the first embodiment is replaced with a combination of a reflective polarization selection member 301 and a variable polarization selection member 600. Because other configurations are the same as those of the display device of the first embodiment, the same reference numerals will be given to the same parts and detailed description thereof will be omitted.

The reflective polarization selection member 301 is disposed at a position facing the transmission polarization axis variable portion 400, and the variable polarization selection member 600 is disposed further toward the viewer side than the reflective polarization selection member 301. The reflective polarization selection member 301 has a configuration that reflects the first linear polarization component and transmits the second linear polarization component. The variable polarization selection member 600 has a configuration in which it is possible to select between a state that, of the incident light, absorbs the first linear polarization component and transmits the second linear polarization component and a state that transmits all linear polarization components.

The display device of the second embodiment is configured so that switching between the image display status and the mirror status is accomplished by control of the polarization state by the transmission polarization axis variable portion 400 and by control of the absorption or transmission of the polarization by the variable polarization selection member 600. It should be noted that a viewer views the display device from the variable polarization selection member 600 side.

Here, a member including a guest host liquid crystal layer 607, transparent electrodes 603 and 606 that apply a voltage to the liquid crystal layer 607, and a switching switch 600a is used for the variable polarization selection member 600. When the switching switch 600a is off, as shown in FIG. 5, the liquid crystal layer 607 is orientated so that long axes of liquid crystal molecules 607a of the liquid crystal layer 607 are parallel to the first linear polarization. Thus, in an OFF state, the variable polarization selection member 600 absorbs the first linear polarization component and transmits the second linear polarization component, whose polarization axis is orthogonal to the polarization axis of the first linear polarization component. When the switching switch 600a is on, as shown in FIG. 6, the liquid crystal molecules 607a become perpendicular to the transparent electrodes 603 and 606, whereby the variable polarization selection member 600 transmits all polarization components.

The operation of the display device of the second embodiment when the display device is in the image display status will be described using FIG. 5. When the display device is switched to the image display status, the switching switch 813 is switched off, the transmission polarization axis variable portion 400 is switched to an OFF state and, in conjunction therewith, the switching switch 600a is switched off, and the variable polarization selection member 600 is switched to an OFF state.

The image light 3001 that is emitted from the image display portion 1000 is transmitted through the reflective polarization selection member 300 and made incident at the transmission polarization axis variable portion 400. Because the transmission polarization axis variable portion 400 is in the OFF state at this time, the image light 3001 passing therethrough is changed from the first linear polarization to the second linear polarization. Because the image light 3001 transmitted through the transmission polarization axis variable portion 400 becomes the second linear polarization, the polarization axis thereof matches the transmission polarization ax is of the reflective polarization selection member 301, and the image light 3001 is transmitted therethrough. Moreover, because it also matches the transmission polarization axis of the variable polarization selection member 600 in the OFF state, the image light 3001 is also transmitted therethrough and is viewable to the viewer.

Although the outside light 3002 that is made incident at the display device in the image display status from the viewer side is non-polarized light, because the variable polarization selection member 600 is in the OFF state, the first linear polarization component, which matches the absorption polarization axis of the variable polarization selection member, is absorbed, and only the second linear polarization component, which matches the transmission polarization axis, is transmitted. When the outside light 3002 of the second linear polarization transmitted through the variable polarization selection member 600 is transmitted through the reflective polarization selection member 300 and transmitted through the transmission polarization axis variable portion 400, it is changed from the second linearly polarized light to the first linearly polarized light, transmitted through the first reflective polarization selection member 300, and made incident at the liquid crystal layer of the image display portion 1000. At this time, as described in the first embodiment, the light made incident at the dark display region is absorbed by the absorbing polarization selection member disposed further toward the lighting system side than the liquid crystal layer. Thus, it does not return to the viewer side. Although the light made incident at the bright display region is also transmitted through the absorption polarization selection member of the light source side, reaches the lighting system, and part of the light is reflected, the reflected light is substantially no different from the illumination light and becomes part of the illumination light. That is, in the display device of the present embodiment, at the time of the image display status, there is virtually no reflection of outside light that causes image quality to deteriorate, even if the outside light is made incident.

Therefore, in the image display status, a bright image can be obtained because the image light 3001 proceeds toward the viewer with virtually no loss. Also, because the outside light 3002 is virtually not reflected in the display device, deterioration of image quality, such as a glare of outside light and a drop in the contrast ratio, does not arise.

Next, the operation of the display device of the second embodiment when the display device is in the mirror status will be described using FIG. 6. In the case of the mirror status, the switching switch 813 and the switching switch 600a are switched on at the same time, and the transmission polarization axis variable portion 400 and the variable polarization selection member 600 are switched to an ON state.

Figure 6:
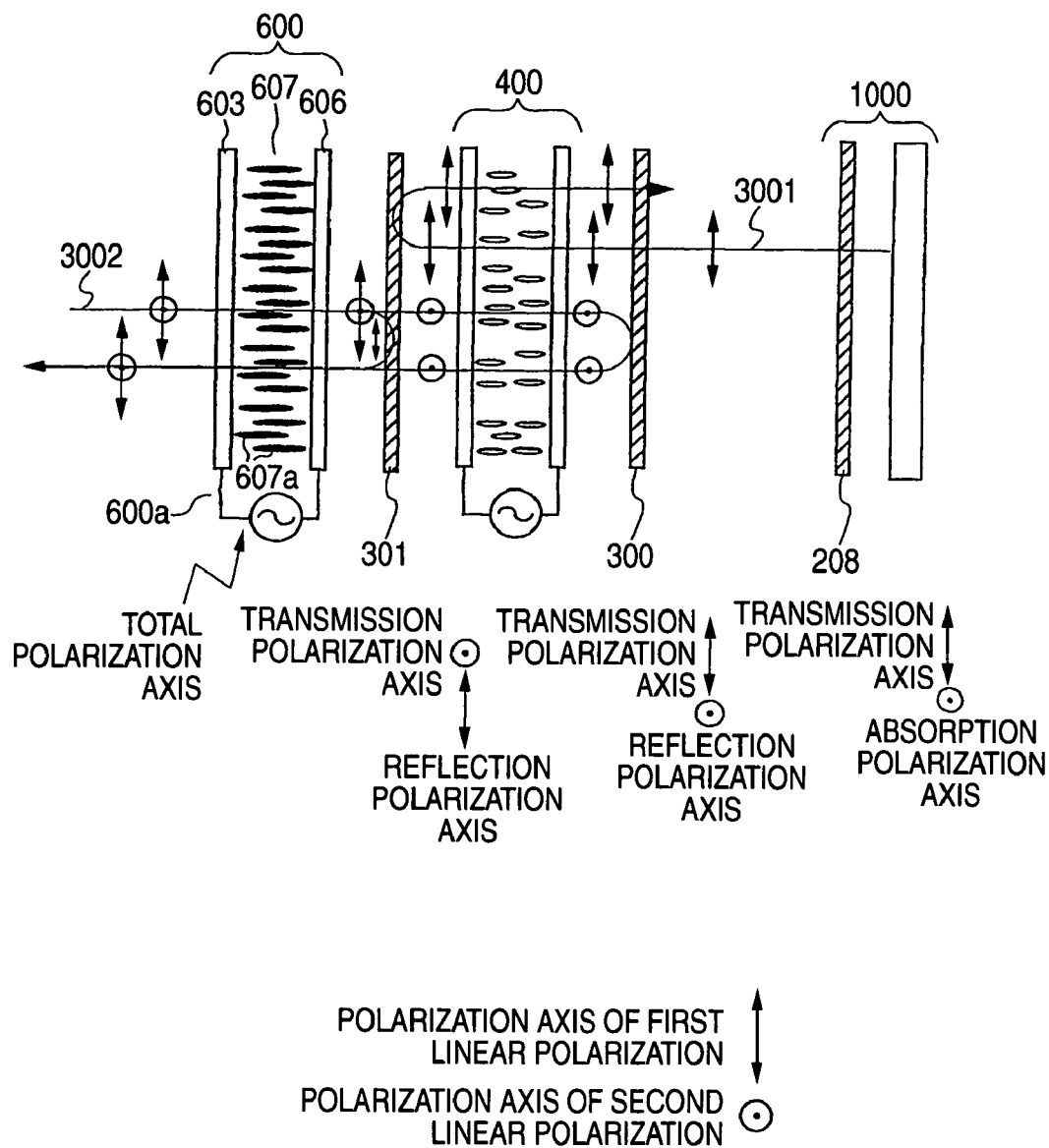
FIG. 6 is an explanatory drawing for explaining the basic configuration and operation of the display device, disposed with a function for switching to a mirror status, of the second embodiment of the invention.

In the case of the mirror status, all of the polarization components of the outside light 3002 that is made incident at the display device from the viewer side are transmitted through the variable polarization selection member 600, as shown in FIG. 6. The outside light 3002 transmitted through the variable polarization selection member 600 is made incident at the reflective polarization selection member 301. Of the outside light 3002 made incident at the reflective polarization selection member 301, the second linear polarization component is transmitted through the reflective polarization selection member 301, and the first linear polarization component is reflected by the reflective polarization selection member 301, is again transmitted through the variable polarization selection member 600, and proceeds toward the viewer side. The second linear polarization component transmitted through the reflective polarization selection member 301 is transmitted through the transmission polarization axis variable portion 400 without its polarization axis being changed, is reflected by the reflective polarization selection member 300, is again transmitted through the transmission polarization axis variable portion 400, through the reflective polarization selection member 301, and through the variable polarization selection member 600, and proceeds toward the viewer side.

In this manner, in the display device of the second embodiment, most of the polarization components of the incident outside light 3002 are reflected by the reflective polarization selection member 300 and the reflective polarization selection member 301. Therefore, a mirror status in which is obtained an extremely bright reflection image can be obtained.

In the case of the mirror status, because the image light (bright display light) 3001 emitted from the image display portion 1000 passes through the absorbing polarization selection member 208 as described in the first embodiment, it is the first linear polarization. Thus, after the image light 3001 is transmitted through the reflective polarization selection member 300, it is transmitted through the transmission polarization axis variable portion 400 as the first linear polarization without its polarization axis being changed, is reflected by the reflective polarization selection member 301, and returns to the image display device 1000, whereby it is virtually not viewable to the viewer.

It should be noted that, as described in the first embodiment, it is preferable to switch, to the dark display, the display region of the image display portion 1000 corresponding to the region that becomes the mirror status, in order to further reduce leakage of light from the image display portion 1000 side in the mirror status. When the entire display region is switched to the mirror status, leakage of light can also be eliminated by switching the lighting system of the image display portion to a non-emitting state.

In this manner, in the display device of the second embodiment, because virtually all of the polarization components of the outside light 3002 are reflected at the time of the mirror status, an extremely bright reflection image is obtained and an easy-to-view mirror is obtained with little light leakage of the image light 3001. Also, in the case of the image display status, similar to the first embodiment, there is little glare of the outside light, and a bright image can be displayed.

Figure 5:
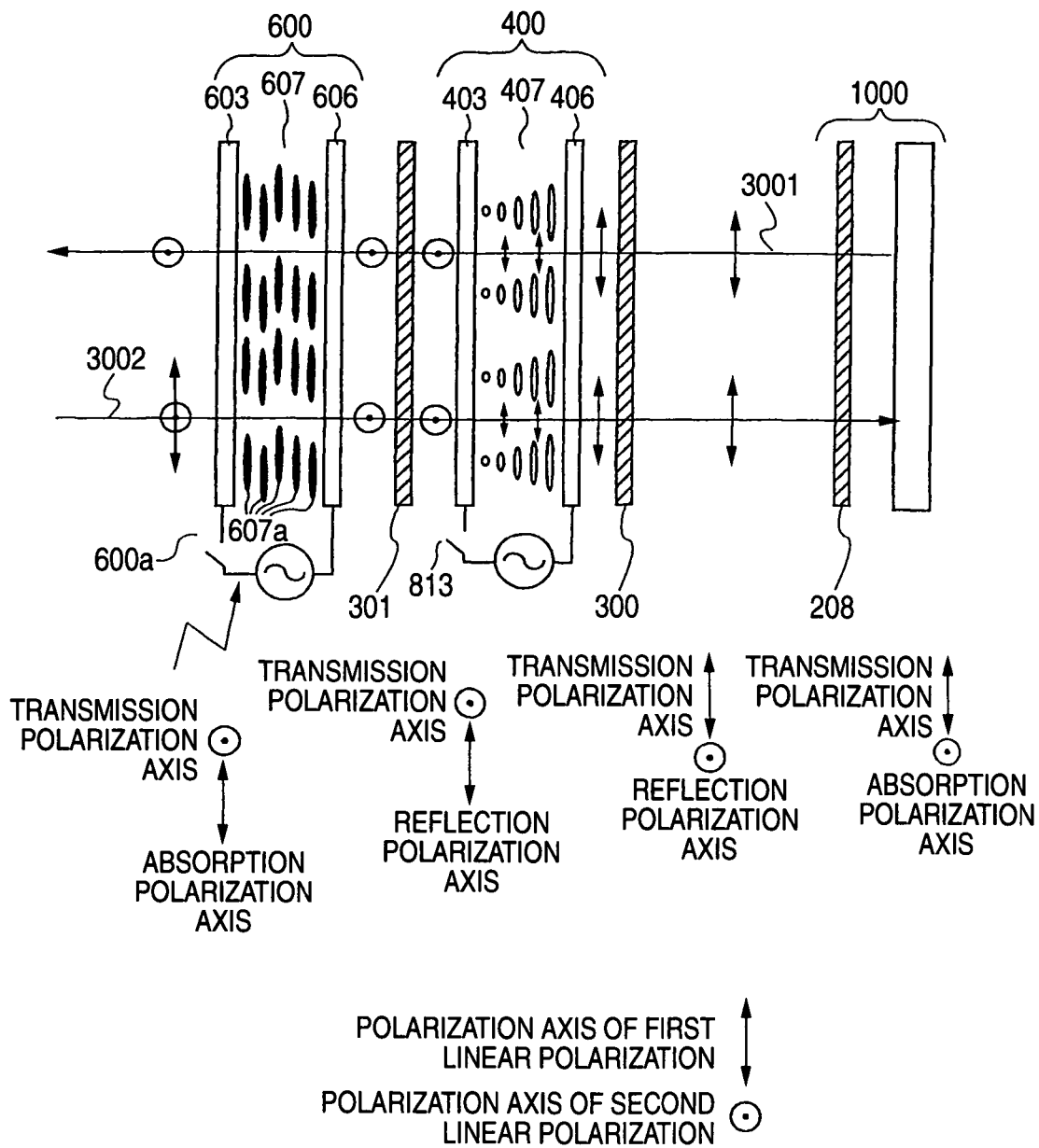
FIG. 5 is an explanatory drawing for explaining the basic configuration and operation of a display device, disposed with a function for switching to a mirror status, of a second embodiment of the invention.

It should be noted that, although a member whose reflection polarization axis is parallel to the polarization axis of the first linear polarization and whose transmission polarization axis is parallel to the polarization axis of the second linear polarization was used in the second embodiment as the second reflective polarization selection member 301, as shown in FIGS. 5 and 6, the present invention is not limited to this configuration. A member whose reflection polarization axis is parallel to the polarization axis of the second linear polarization and whose transmission polarization axis is parallel to the polarization axis of the first linear polarization can also be used. In this case, the invention can be configured so that the display device is switched to an image transmittance state by switching the transmission polarization axis variable portion 400 to a state that transmits without changing the incident polarization axis (a state in which the voltage is on) and switching the variable polarization selection member 600 to a state that absorbs the second linear polarization and transmits the first linear polarization (a state in which the voltage is off), and so that the display device is switched to the mirror status by switching the transmission polarization axis variable portion 400 to a state that changes the first linear polarization to the second linear polarization (a state in which the voltage is off) and switching the variable polarization selection member 600 to a state that transmits all polarization components (a state in which the voltage is on).

It should be noted that, in the first and second embodiments, although a transmissive liquid crystal element including the lighting system was described in a case where a liquid crystal element was used as the image display portion 1000, it is also possible to use a reflective liquid crystal element.

Also, when P1 represents the degree of polarization of the absorbing polarization selection member 208 configuring the image display member and P2 represents the degree of polarization of the absorbing polarization selection member 500, it is preferable that the relationship of $0.966.P1. 0.995 \leq P2$ is satisfied or that the relationship of $0.966 \leq P2 \leq 0.995 \leq P1$ is satisfied. The reason for this will be described later in Example 2.

Also, in the display device of the first and second embodiments, it is preferable to form an antireflection film on the surfaces of the absorbing polarization selection members 500 and 208 and on the outermost surface of the variable polarization selection member 600.

Also, in the invention, it is preferable to set the interval between the reflective polarization selection member 300 and the reflective polarization selection member 301 to 0.11 mm or less. The reason for this will be described later in Example 2.

Also, when the display device is switched to the mirror status, it is preferable to configure the invention so that at least an entire region of 58.6 mm×39.1 mm substantially serves as the mirror. This is a size that is set considering that ¼ of an adult male face is reflected. This will also be described later in the examples.

Also, in the first and second embodiments, a film-like member can be used as the reflective polarization selection members 300 and 301. In this case, it is preferable to either direct adhere the film-like member, via a transparent adhesive, to a transparent substrate that has high rigidity, is flat, transparent, and optically isotropic, or indirectly adhere and fix the film-like member, via a flat film or the like, so that there is no warping in the reflection surface.

Also, the display device of the first and second embodiments can be a projection display device, in which projection light emitted from a projection device is irradiated onto a transmissive screen via a mirror member. In this case, the device may be configured so that the transmissive screen is disposed with a mirror function portion. In this case, the device is configured so that the projection device is one that emits, as the projection light, linear polarizations in which the polarization state of each color light matches, and so that the linearly polarized light is s-polarized light or p-polarized light with respect to the reflection surface of the mirror member.

Moreover, of the optical system and the mirror function portion configuring the transmissive screen, the device can be configured so that the mirror function portion is a detachable structure that is removed when the mirror function is unnecessary. Alternatively, the screen may be configured so that the mirror function portion is disposed independently, without including the image display portion, and the mirror function screen may be configured to be fitted to an optional display device as needed.

In the first and second embodiments, members having a configuration in which a conductive metal linear pattern is disposed at a pitch of over a thousand angstroms ($10^{-10}$ m) can be used as the reflective polarization selection members 300 and 301. In this case, the longitudinal direction of the metal linear pattern becomes the reflection polarization axis. Also, a reflective polarization selection member in which a conductive metal linear pattern is formed on a transparent substrate at a pitch of over a thousand angstroms ($10^{-10}$ m) and part of an adjacent linear pattern is electrically connected can be used together with the transparent electrode. Thus, the transparent electrode 606 and the reflective polarization selection member 301, or the reflective polarization selection member 301 and the transparent electrode 403, or the transparent electrode 406 and the reflective. polarization selection member 300 can be configured.

In the first and second embodiments, the image display device 1000 can be structured as follows. That is, the image display 1000 can have a configuration disposed with: a liquid crystal element including a pair of transparent substrates joined with a constant gap therebetween, a liquid crystal layer sandwiched between these transparent substrates, a pixel electrode group disposed in a matrix formed by a transparent electrode on at least one of the pair of transparent substrates, the absorbing polarization selection member 208 disposed at the viewer side, and an absorbing polarization selection member disposed on the transparent substrate opposite from that of the viewer side; a display-use liquid crystal element drive portion that applies, to the pixel electrode group, a voltage corresponding to an image signal; and a lighting system disposed at a rear surface of a display-use liquid crystal element. In this case, the device can have a configuration disposed with a switch portion that switches the lighting system on and off in conjunction with the switching switch 813. The device can be configured so that the lighting system includes light sources that successively emit plural color lights and so that the liquid crystal element conducts field-sequential color display in correspondence to the color lights from the lighting system.

Also, the device can be configured to use a reflective liquid crystal element as the image display portion 1000. In this case, a reflective liquid crystal element, in which a transparent substrate and a reflection substrate disposed with a reflective portion are adhered together via spacers such as beads, the surrounding area thereof is sealed with a frame-like seal material, and liquid crystal is injected between the two substrates and sealed, can be used. In this case, a phase-difference plate is laminated and disposed on the transparent substrate. It should be noted that the transparent substrate or the reflection substrate can be disposed with a color filter. It is preferable for this color filter to be disposed with a function for raising brightness at the dark display. Specifically, it is more preferable to use a delta arrangement color filter.

Also, the display device of the first and second embodiments can be configured so that the sizes of the region that becomes the mirror status and the image display region in the image display status are different. Also, an image display portion having a configuration disposed with a display-use liquid crystal element, which functions as a transmissive type at part of the display region and functions as a reflective type at other regions, and a lighting system for illuminating the region functioning as the transmissive type can be used as the image display portion 1000.

Also, the display device of the first and second embodiments may be configured so that the display region of the image display portion is plurally divided into regions, and so that switching between the mirror status and the image display status is controlled per divided region. In order to realize this, the display device can be configured so that the light-transmitting surfaces of the transmission polarization axis variable portion 400 and the variable polarization selection member 600 are divided into plural regions, so that selection between a state in which the polarization axis of the transmitted light is changed and a state in which the polarization axis of the transmitted light is not changed is controlled per individual region, and so that selection of polarized light that is to be absorbed is controlled.

Examples of the invention will be described below.

EXAMPLE 1

A display device disposed with a function for switching to a mirror status of Example 1 of the invention will be described using FIGS. 7 and 8. The basic configuration of the display device of Example 1 is the same as that of the display device shown in FIGS. 1 and 2 of the first embodiment.

Figure 7:
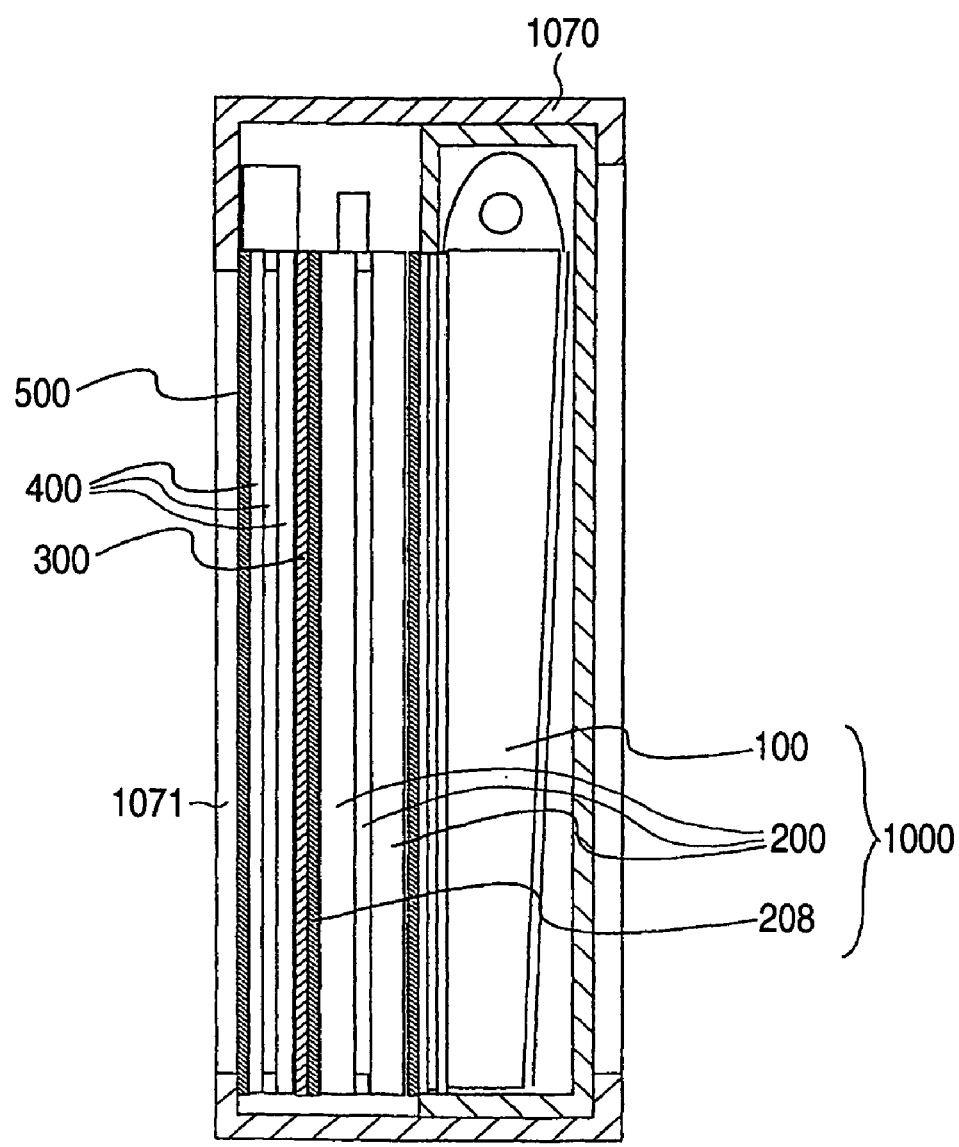
FIG. 7 is a cross-sectional view showing the configuration of a display device of Example 1 of the invention.

Similar to the first embodiment, the display device of FIG. 7 of Example 1 includes the image display portion 1000, the reflective polarization selection member 300, the transmission polarization axis variable portion 400, and the absorbing polarization selection member 500, which are successively superimposed. These are accommodated inside a case 1070 that includes an opening 1071. The opening 1071 serves as an image display portion capable of being switched to the mirror status. The action of each part is as was described in the first embodiment.

Figure 8:
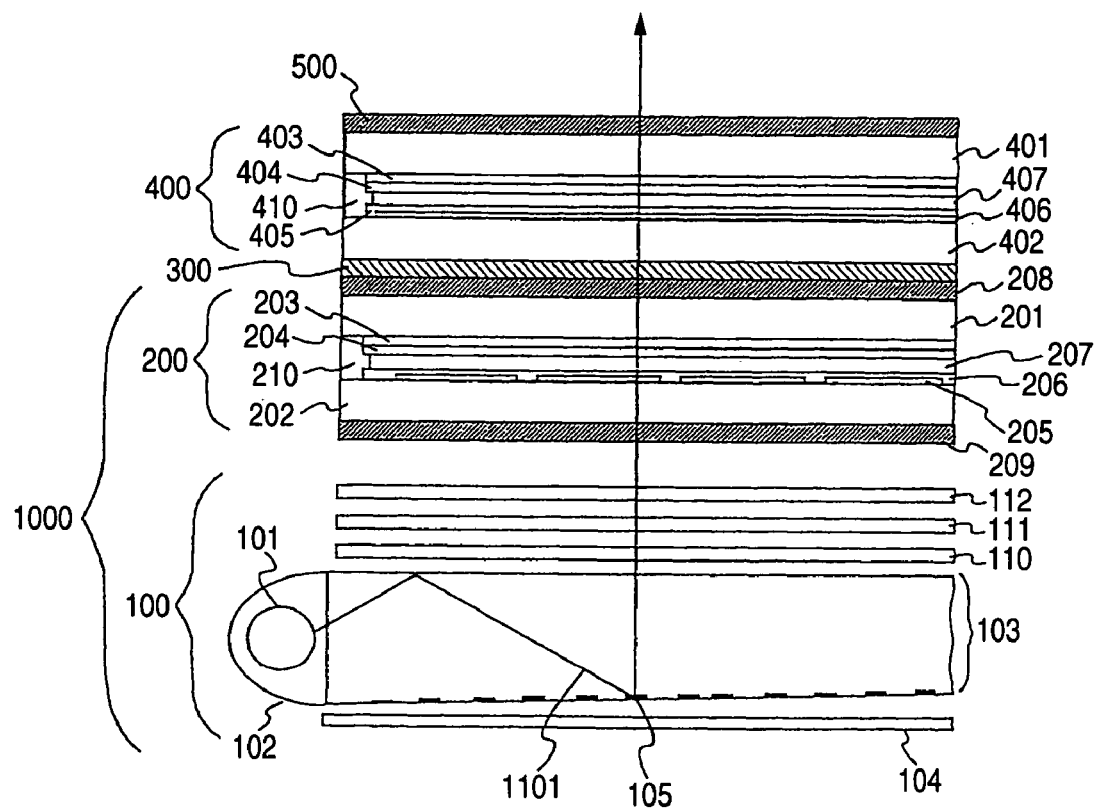
FIG. 8 is a cross-sectional view of respective members configuring the display device of Example 1 of the invention.

As shown in FIGS. 7 and 8, the image display portion 1000 includes a liquid crystal display panel 200, which includes a display-use liquid crystal element and displays images by adjusting the amount of light transmitted therethrough, and a lighting system 100 disposed at the rear surface of the liquid crystal display panel 200. It is preferable to use, as the liquid crystal display panel 200, a liquid crystal display panel that uses a display mode such as the TN (Twisted Nematic) mode, the STN (Super Twisted Nematic) mode, and the ECB (Electrically Controlled Birefringence) mode. Because such a liquid crystal display panel conducts display by modulating the polarization state of light made incident at the liquid crystal layer using a polarizing plate, a high contrast ratio can be obtained with a relatively low drive voltage. Also, linearly polarized light is emitted as image light by the polarizing plate that functions as the absorbing polarization selection member 208 disposed at the reflective polarization selection member 300 side of the liquid crystal display panel 200.

As is commonly known, there are two formats for the liquid crystal display panel 200—an active matrix drive liquid crystal display panel that uses a switching element such as a TFT (Thin Film Transistor), and a multiplex drive liquid crystal display panel—and either can be selected and used. Specifically, an active matrix drive liquid crystal display panel, such as a TN (Twisted Nematic) liquid crystal display panel, an IPS (In Plane Switching) liquid crystal display panel, and an MVA (Multi-domain Vertical Aligned) liquid crystal display panel, or a multiplex drive liquid crystal display panel such as an STN (Super Twisted Nematic) liquid crystal display panel, can be used. Although a case will be described in Example 1 where a TN liquid crystal display panel is used as the liquid crystal display panel 200, the present invention is not limited thereto.

Using FIG. 8, the detailed structure of each part of the display device of Example 1 will be described.

A system that can evenly illuminate the image display portion of the liquid crystal display panel 200 is used for the lighting system 100. As the lighting system, the edge light system (waveguide system), the directly-under system (reflector system), and the planar light source system (*Ekisho disupurei gijutsu* ("Liquid Crystal Display Technology"), pp. 252-256, Sangyotosho Kabushikigaisha, published on Nov. 8, 1996; Furukara ekisho hyoji gijutsu ("Full-color Liquid Crystal Display Technology"), pp. 201-202, Kabushikigaisha Torigeppusu, published on Feb. 26, 1990) are commonly known. As the lighting system 100, an optimum system may be selected from these systems or other systems to match purpose, object, or image size. Although description will be given here of a case where an edge light system is used as the lighting system 100, the invention is not limited thereto.

The lighting system 100 includes a waveguide 103 comprising transparent acrylic resin whose undersurface has been administered a treatment such as dot printing 105 by a white pigment, a linear light source 101 comprising, for example, a cold-cathode tube disposed at an end surface of the waveguide 103, a lamp cover 102, a reflective sheet 104 disposed at the undersurface of the waveguide 103, diffusion sheets 110 and 112 disposed at a front surface of the waveguide 103, and a prism sheet 111.

In this configuration, light emitted from the light source 101 is directly made incident on the waveguide 103 or made incident on the waveguide 103 after being reflected by the lamp cover 102. Although light 1101 made incident at the waveguide 103 is propagated within the waveguide 103 while being reflected, the traveling direction of light reaching the dot printing 105 by the white pigment administered to the undersurface of the waveguide 103 is changed and the light is emitted from the surface side of the waveguide 103. Light emitted from the waveguide 103 is irradiated onto the liquid crystal display panel 200 after its emission angle distribution and in-plane luminance distribution are made even by the diffusion sheets 110 and 112 and the prism sheet 111.

As shown in FIG. 8, the liquid crystal display panel 200 includes a first transparent substrate 201 and a second transparent substrate 202 comprising flat, transparent, and optically isotropic glass or plastic. A color filter (not shown), a transparent electrode 203 comprising ITO (Indium Tin Oxide), and an orientation film 204 comprising a polyimide polymer are laminated on the transparent substrate 201. An orientation film 206, a transparent electrode 205 forming pixels, and a switching element (not shown) such as a thin-film transistor or an electrode connected thereto are formed on the second transparent substrate 202. The two transparent substrates 201 and 202 are joined with the surfaces having formed thereon the orientation films 204 and 206 facing, a constant gap is disposed between the two transparent substrates 201 and 202 via unillustrated spacers, the surrounding area thereof is sealed with a frame-like seal material 210, and a space is formed inside. A liquid crystal layer 207 is disposed by injecting nematic liquid crystal, whose dielectric anisotropy is positive, into this space.

The orientation direction of the long axes of the liquid crystal molecules of the liquid crystal layer 207 is defined by conducting an orientation treatment, such as rubbing, on the orientation films 204 and 206 formed on the two transparent substrates 201 and 202. Here, they are continuously twisted 90° between the transparent substrates 201 and 202. A polarizing plate 209 and an absorbing polarization selection member (polarizing plate) 208 are respectively disposed on the rear surface of the transparent substrate 202 and the front surface of the transparent substrate 201 so that they transmit linear polarizations whose polarization axes are mutually orthogonal. The orientation directions of the long axes of the liquid crystal molecules of the transparent substrate 202 and the transparent substrate 201 are configured so that they are both parallel to or orthogonal to the transmission polarization axes of the polarizing plate 209 and the absorbing polarization selection member (polarizing plate) 208.

A plate in which a triacetylcellulose protection layer has been administered to both sides of a film to which a polarizing function has been imparted by causing stretched polyvinyl alcohol to absorb iodine can be used as the absorbing polarization selection member (polarizing plate) 208 and the polarizing plate 209. It should be noted that the absorbing polarization selection member (polarizing plate) 208 and the polarizing plate 209 are respectively adhered, so that they are optically bonded by an acrylic adhesive, to the transparent substrate 202 and the transparent substrate 201.

According to this configuration, of the illumination light made incident from the back surface (lighting system 100 side) of the liquid crystal display panel 200, the linear polarization transmitted through the polarizing plate 209 passes through the liquid crystal layer 207 and is made incident at the absorbing polarization selection member (polarizing plate) 208. At this time, the polarization state of the light transmitted through the liquid crystal layer 207 can be changed by a voltage applied to the liquid crystal layer 207. Thus, by applying, to the transparent electrodes 203 and 205, a voltage corresponding to image information conveyed from an image information generating unit (not shown) and applying an electric field to the liquid crystal layer 207, the polarization state of the light passing through the liquid crystal layer 207 can be changed and the light amount transmitted through the absorbing polarization selection member (polarizing plate) 208 can be controlled. Thus, desired image light comprising linearly polarized light can be formed.

Next, the reflective polarization selection member 300 will be described.

A member that includes the function of transmitting the first linear polarization component emitted from the image display portion 1000 and mirror-reflecting the second linear polarization component, which has a polarization axis that is orthogonal to that of the first linear polarization component, is used for the reflective polarization selection member 300. For example, the birefringence reflective polarization film disclosed in International Application International Publication No. WO95/27919, in which different plural birefringence polymer films are alternatingly laminated, or a member in which a ¼ wavelength plate is disposed on the top and bottom of a cholesteric liquid crystal layer, can be used as such a member. In the case of the birefringence reflective polarization film, a film that transmits a predetermined linear polarization component and mirror-reflects a linear polarization component whose polarization axis is orthogonal to that of the predetermined linear polarization component is commercially available under the brand name DBEF from 3M (U.S.), and this can be used as the reflective polarization selection member 300. It should be noted that, because the reflective polarization selection member 300 is an important member functioning as a mirror surface when the present display device is switched to the mirror status, a member to which a treatment that can blur the reflection image, such as matting, has not been administered is used.

In a case where the reflective polarization selection member 300 is configured by a member in which a ¼ wavelength plate is disposed on the top and bottom of a cholesteric liquid crystal layer, a liquid crystal cell in which low-molecular weight cholesteric liquid crystal is disposed between two oriented transparent substrates, or a layer in which polymer cholesteric liquid crystal is formed on a flat, optically isotropic transparent substrate such as glass or transparent resin, can be used as the cholesteric liquid crystal layer. The cholesteric liquid crystal layer exhibits unique optical characteristics based on its helical molecular arrangement, and exhibits selective reflection in which circularly polarized light of one rotational direction made incident in parallel on the helical axis is reflected and circularly polarized light of the other rotational direction is transmitted, in correspondence to the rotational direction of the cholesteric spiral. The wavelength region of the selective reflection is determined by the pitch of the molecular arrangement, and it is necessary to laminate and use plural cholesteric liquid crystal layers of different pitches in order for the selective reflection to occur in the entire visible wavelength region. In this case, in order to obtain selective reflection in the entire visible wavelength region, the cholesteric liquid crystal layer in which pitch is continuously changed and that is described in *Asia Display* 95 *Digest*, p. 735, The Institute of Television Engineers of Japan (ITE) & The Society for Information Display (SID), may be used in place of laminating plural cholesteric liquid crystal layers of different pitches.

In the case where the member in which a ¼ wavelength plate is disposed on the top and bottom of a cholesteric liquid crystal layer is used as the reflective polarization selection member 300, the lag axis of the ¼ wavelength plate disposed on the underside of the cholesteric liquid crystal layer, i.e., on the image display portion 1000 side, is set in the following direction. That is, the lag axis is disposed so that the first linear polarization emitted from the image display portion 1000 and made incident at the reflective polarization selection member 300 is converted to a circular polarization transmitted through the cholesteric liquid crystal layer. Similarly, the lag axis of the ¼ wavelength plate disposed on the top side of the cholesteric liquid crystal layer, i.e., on the transmission polarization axis variable portion 400 side, is disposed so that a circular polarization transmitted through the cholesteric liquid crystal layer is converted to the first linear polarization.

When the second linear polarization is made incident at the reflective polarization selection member of the configuration in which a ¼ wavelength plate is disposed on the top and bottom of a cholesteric liquid crystal layer, the second linear polarization is selectively reflected by the cholesteric liquid crystal layer because it is converted, by the action of the ¼ wavelength plates, to a circular polarization that is the reverse of the circular polarization transmitted through the cholesteric liquid crystal layer. When the circular polarization reflected by the cholesteric liquid crystal layer is again transmitted through the ¼ wavelength plates, it is converted by the action thereof to the second linear polarization.

It should be noted that it is preferable to use, as the ¼ wavelength plates used in the reflective polarization selection member 300 of this configuration, plates that function as ¼ wavelength plates in the entire visible wavelength region. A stretched polymer film that has high transmittance in the visible wavelength region, such as polyvinyl alcohol, polycarbonate, polysulfone, polystyrene, and polyarylate, can be used as the ¼ wavelength plate. In addition, mica, crystal, or a liquid crystal layer in which the molecular axes thereof have been oriented in one direction can also be used.

Also, although it is difficult to configure a phase-difference plate functioning as a ¼ wavelength plate with respect to the entire visible wavelength region with one type of phase-difference plate due to wavelength dependency (below, wavelength dispersion) of the refractive index of materials commonly configuring ¼ wavelength plates, a plate configured to function as a ¼ wavelength plate in a wide wavelength region by adhering together at least two types of phase-difference plates whose wavelength dispersion is different so that the optical axes thereof are orthogonal may be used.

Attention should be given to the following points when a film-like material, such as the birefringence reflective polarization film or a laminate member of the film-like cholesteric liquid crystal layer and the ¼ wavelength plates, is used as the reflective polarization selection member 300.

That is, because the flatness of a film-like reflective polarization selection member, as it is, is low, there is a lot of warping and it is difficult to realize a practically satisfactory mirror simply by disposing it on the front surface of the image display portion 1000. Thus, when a film-like member is used as the reflective polarization selection member 300, it is preferable to adhere and fix it, via a transparent adhesive, to a transparent substrate that is optically isotropic, transparent, flat and has high rigidity, such as a glass plate or a plastic plate, so that there is no warping.

Alternatively, in order to fix the reflective polarization selection member 300 in a flat state, it can be fixed to the transparent substrate of the transmission polarization axis variable portion 400 described later or the liquid crystal display panel 200 in place of adhering and fixing it to a new transparent substrate. In any event, when a film-like member is used as the reflective polarization selection member 300, it is preferable to adhere and fix it to another flat member in order to realize a mirror with no warping.

Next, the transmission polarization axis variable portion 400 will be described.

The transmission polarization axis variable portion 400 has a configuration in which it is possible to select, when incident linearly polarized light is transmitted therethrough, between one of a state that changes the polarization state of the incident linearly polarized light, so that it is changed to linearly polarized light whose polarization axis is orthogonal to that of the incident linearly polarized light, and a state that does not change the polarization axis of the incident linearly polarized light. For example, a liquid crystal element such as the one shown in FIG. 8 can be used.

The transmission polarization axis variable portion 400 includes a first transparent substrate 401, in which a transparent electrode 403 comprising ITO and an orientation film 404 comprising a polyimide polymer are laminated and formed on the entire surface thereof, a second transparent substrate 402, in which a transparent electrode 406 and an orientation film 405 are similarly laminated and formed on the entire surface thereof, and a liquid crystal layer 407. It should be noted that the transparent electrodes 403 and 406 respectively formed on the two transparent substrates 401 and 402 are connected to a power source (see FIG. 1; not shown in FIG. 8) via unillustrated wiring and the switching switch 813. Thus, the transmission polarization axis variable portion 400 is configured to be selectable between one of a state in which voltage is not applied and a state in which voltage is applied to the transparent electrodes 403 and 406. In other words, the transmission polarization axis variable portion 400 is configured to be selectable between one of a state in which that there is no difference in electric potential between the transparent electrodes 403 and 406 and an electric field is not applied to the liquid crystal layer 407 and a state in which voltage is applied to the transparent electrodes 403 and 406 and an electric field is applied to the liquid crystal layer 407.

The liquid crystal layer 407 of the transmission polarization axis variable portion 400 is configured by disposing the two transparent substrates 401 and 402 so that the surfaces on which the orientation films are formed face each other, disposing a constant gap between the two transparent substrates 401 and 402 by sandwiching unillustrated spacers therebetween, sealing, in a frame shape, the area surrounding the gap with a seal material 410, forming a space, and injecting into this space nematic liquid crystal whose dielectric anisotropy is positive.

Here, a case where a so-called TN liquid crystal element, which is configured so that orientation processing such as rubbing is conducted for each of the orientation films 404 and 405 formed on the two transparent substrates 401 and 402 and the liquid crystal molecule long axes of the liquid crystal layer 407 are continuously twisted 90° between the two transparent substrates 401 and 402, will be described as the transmission polarization axis variable portion 400.

In this case, the orientation direction of the liquid crystal molecule long axes of the transparent substrate 402 side is configured so as to be parallel or orthogonal to the linear polarization transmission polarization axis of the absorbing polarization selection member (polarizing plate) 208 of the liquid crystal display panel 200, and the liquid crystal layer 407 is configured to satisfy waveguide conditions in the visible wavelength region. The waveguide conditions are described in, for example, the thesis by C. H. Gooch and H. A. Tarry on pp. 1575-1584 of *J. Phys. D: Appl. Phys.*, Vol. 8 (1975).

Here, when $\Delta n$ represents the birefringence of the liquid crystal and d represents the thickness of the liquid crystal layer, $d \times \Delta n = 0.4452$ (633 nm wavelength).

According to the above-described configuration, in an OFF state in which there is no difference in electric potential between the transparent electrodes 403 and 406 respectively formed on the two transparent substrates 401 and 402 and an electric field is not applied to the liquid crystal layer 407, the transmission polarization axis variable portion 400 of the present example changes the first linear polarization, which is emitted from the image display portion 1000 and is transmitted through the reflective polarization selection member 300, to the second linearly polarized light whose polarization axis is orthogonal to that of the first linear polarization. Additionally, in an ON state in which voltage is applied to the transparent electrodes 403 and 406 respectively formed on the two transparent substrates 401 and 402 and an electric field is applied to the liquid crystal layer 407, the transmission polarization axis variable portion 400 transmits the first linearly polarized light, which is emitted from the image display portion 1000 and transmitted through the reflective polarization selection member 300, without changing its polarization axis. At this time, the voltage applied to the transparent electrodes 403 and 406 functions sufficiently as long as it is ±5V, 60 Hz.

It should be noted that, although a case was described in Example 1 in which the TN liquid crystal element was used as the transmission polarization axis variable portion 400, the present invention is not limited thereto. That is, it suffices as long as the transmission polarization axis variable portion 400 is a portion that is selectable, when incident linearly polarized light is transmitted therethrough, between a state that changes the polarization axis of the incident linearly polarized light, so that it is changed to linearly polarized light whose polarization axis is orthogonal to that of the incident linearly polarized light, and a state that does not change the polarization axis of the incident linearly polarized light. An ECB (Electrically Controlled Birefringence) liquid crystal element, a ferroelectric liquid crystal element, and an antiferroelectric liquid crystal element or the like can be used in addition to the TN liquid crystal element.

Next, the absorbing polarization selection member 500 will be described.

The absorbing polarization selection member 500 is a member including the function of absorbing the first linear polarization component of the incident light and transmitting the second linear polarization component, whose polarization axis is orthogonal to that of the first linear polarization component, or transmitting the first linear polarization component and absorbing the second linear polarization component, and a so-called polarizing plate can be used. In other words, a polarizing plate, in which a triacetylcellulose protection layer has been administered to both sides of a film to which a polarizing function has been imparted by causing stretched polyvinyl alcohol to absorb iodine, can be used as the absorbing polarization selection member 500.

It should be noted that it is preferable to administer, to the surface of the absorbing polarization selection member 500, a treatment for suppressing regular reflectance in order to suppress deterioration of image quality resulting from glare. However, that which is important here is that, in order for the display device of the invention to also function as a mirror, methods that reduce regular reflection component, such as forming minute recesses and projections on the surface or forming a transparent resin layer including transparent particles on the surface, are not preferable as the treatment for preventing regular reflectance of the absorbing polarization selection member 500. The reason for this is because, when such a treatment is administered, although image display performance is improved due to a reduction of glare, the problem arises that the image reflected in the mirror becomes blurry and the performance of the mirror deteriorates.

Therefore, as the treatment for preventing regular reflectance of the absorbing polarization selection member 500, it is preferable to form an antireflection film on the surface thereof. Well known technology can be used for the antireflection film. That is, it suffices as long as it is a method in which multilayers of several types of metal oxides having different optically designed refractive indexes are coated by vapor deposition or a method in which a low refractive index material such as a fluorine compound is coated.

Figure 9:
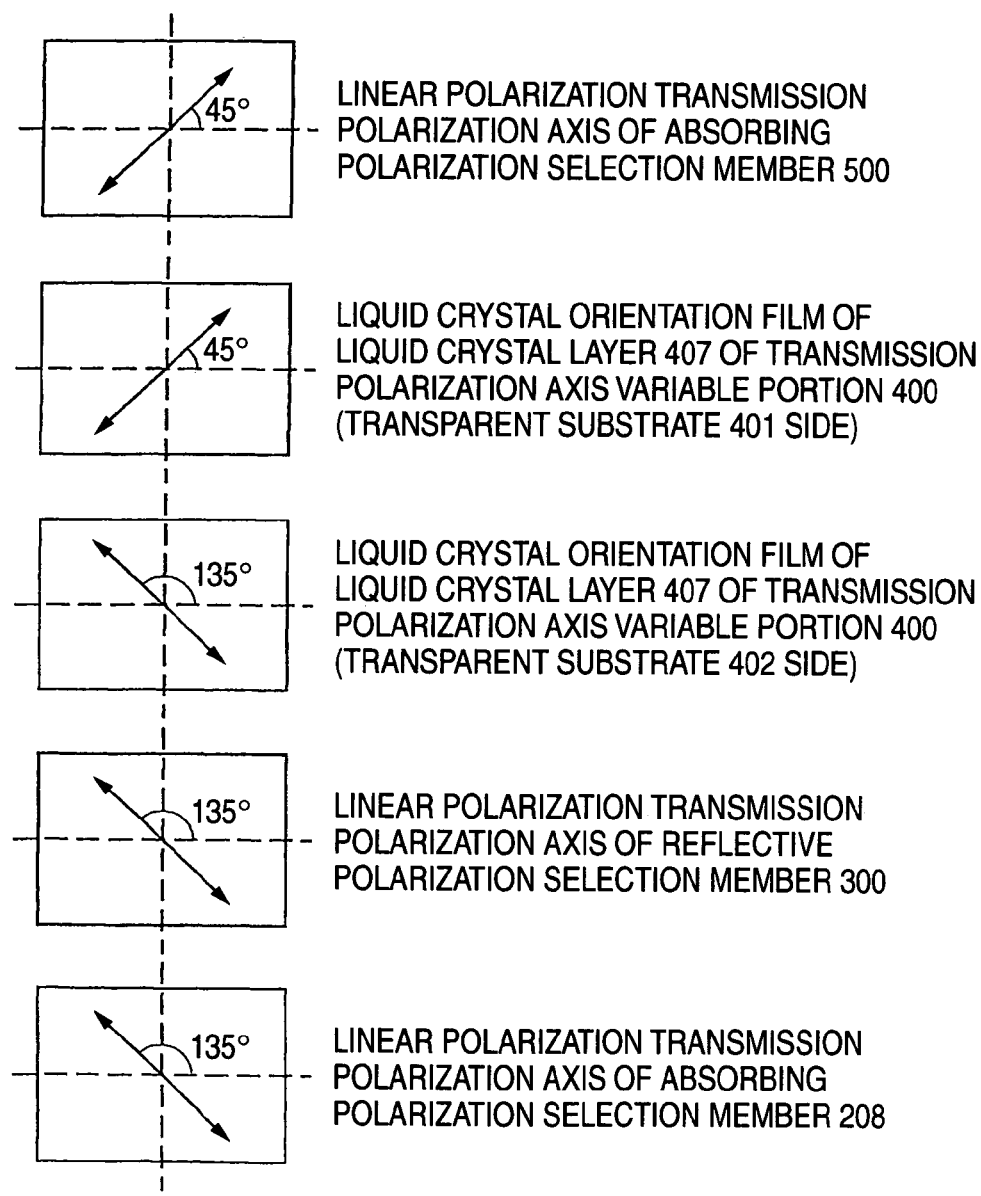
FIG. 9 are explanatory drawings of directions of axes of the respective members configuring the display device of Example 1 of the invention.

Next, the direction of the axis of each member of the display device of the present example will be described using FIG. 9.

Here, a case is described in which the absorbing polarization selection member 500 absorbs the first linear polarization component of the incident light and transmits the second linear polarization component whose polarization axis is orthogonal to that of the first linear polarization component. It should be noted that the angle of each axis uses, as a reference, a position at 3 o'clock in a horizontal direction of the image display surface, and is represented by an angle counterclockwise from here. As shown in FIG. 9, when a TN liquid crystal display panel is used as the liquid crystal display panel 200 configuring the image display portion 1000, the transmission polarization axis of the linear polarization of the polarizing plate is ordinarily 135° (or 45°; in the present example, 135°) in order to obtain horizontal direction symmetry of viewing angle characteristics. Therefore, the transmission polarization axis of the linear polarization of the reflective polarization selection member 300 is similarly 135°, the orientation directions of the liquid crystal molecule long axes of the transparent substrate 401 and the transparent substrate 402 of the transmission polarization axis variable portion 400 are 135° and 45°, respectively, and the transmission polarization axis of the linear polarization of the absorbing polarization selection member 500 is 45°.

Figure 10:
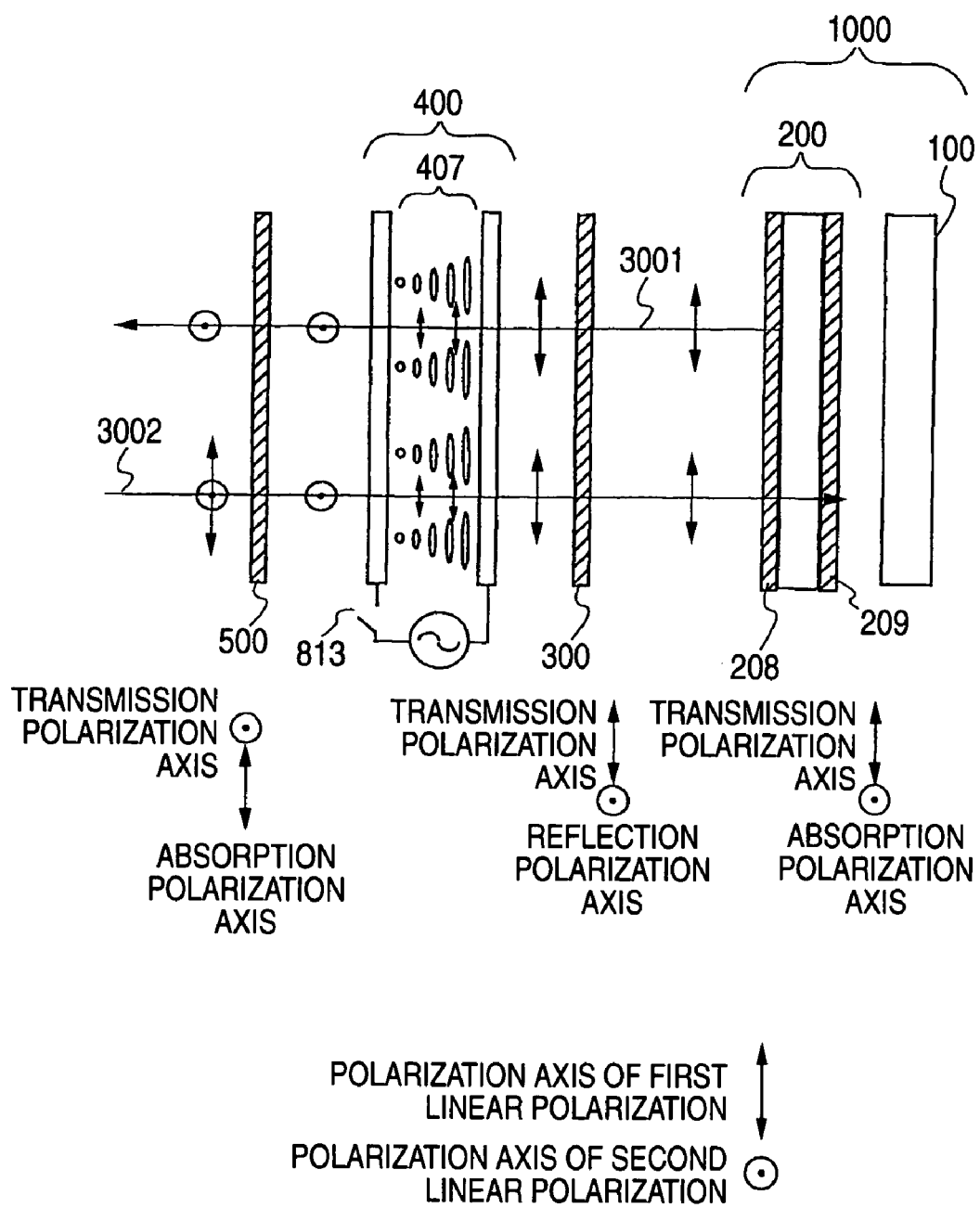
FIG. 10 is an explanatory drawing for explaining the operation of the display device of Example 1 of the invention.

Next, the operation of the display device of Example 1 will be described using FIGS. 10 and 11.

A case where the display device of Example 1 is in the image display status will be described using FIG. 10. When the display device is in the image display status, the switching switch 813 is switched off so that the transmission polarization axis variable portion 400 is in a state in which voltage is not applied to the liquid crystal layer 407 configuring the transmission polarization axis variable portion 400, i.e., is in an OFF state. A linear polarization that is emitted from the lighting system 100 of the image display portion 1000 and transmitted through the absorbing polarization selection member (polarizing plate) 208 of the liquid crystal display panel 200 is emitted as the image light 3001 from the image display portion 1000. The image light 3001 comprising the first linear polarization is transmitted through the reflective polarization selection member 300 and made incident at the transmission polarization axis variable portion 400. The image light 3001 passing through the transmission polarization axis variable portion 400 is changed from the first linear polarization to the second linear polarization. The image light 3001 of the second linear polarization transmitted through the transmission polarization axis variable portion 400 is made incident at the absorbing polarization selection member 500. Because the absorbing polarization selection member 500 absorbs the first linear polarization component and transmits the second linear polarization component, the image light 3001 of the second linear polarization is transmitted through the absorbing polarization selection member 500 and is viewable to the viewer.

Although the outside light 3002 made incident at the display device from the viewer side (the left side in the drawing) is non-polarized light, when it is transmitted through the absorbing polarization selection member 500, the first linear polarization component is absorbed and only the second linear polarization component is transmitted. When the outside light 3002 transmitted through the absorbing polarization selection member 500 is transmitted through the transmission polarization axis variable portion 400, it is changed from the second linear polarization to the first linear polarization, transmitted through the reflective polarization selection member 300 and proceeds toward the image display portion 1000. As described in the first embodiment, this light virtually does not return to the viewer side.

Therefore, in the image display status, a bright image can be obtained because the image light 3001 emitted from the image display portion 1000 proceeds toward the viewer with virtually no loss. Moreover, because the outside light 3002 is not reflected by the reflective polarization selection member 300 functioning as a mirror in the case of the mirror status, there is virtually no deterioration of image quality resulting from the outside light, such as a drop in contrast and glare.

Figure 11:
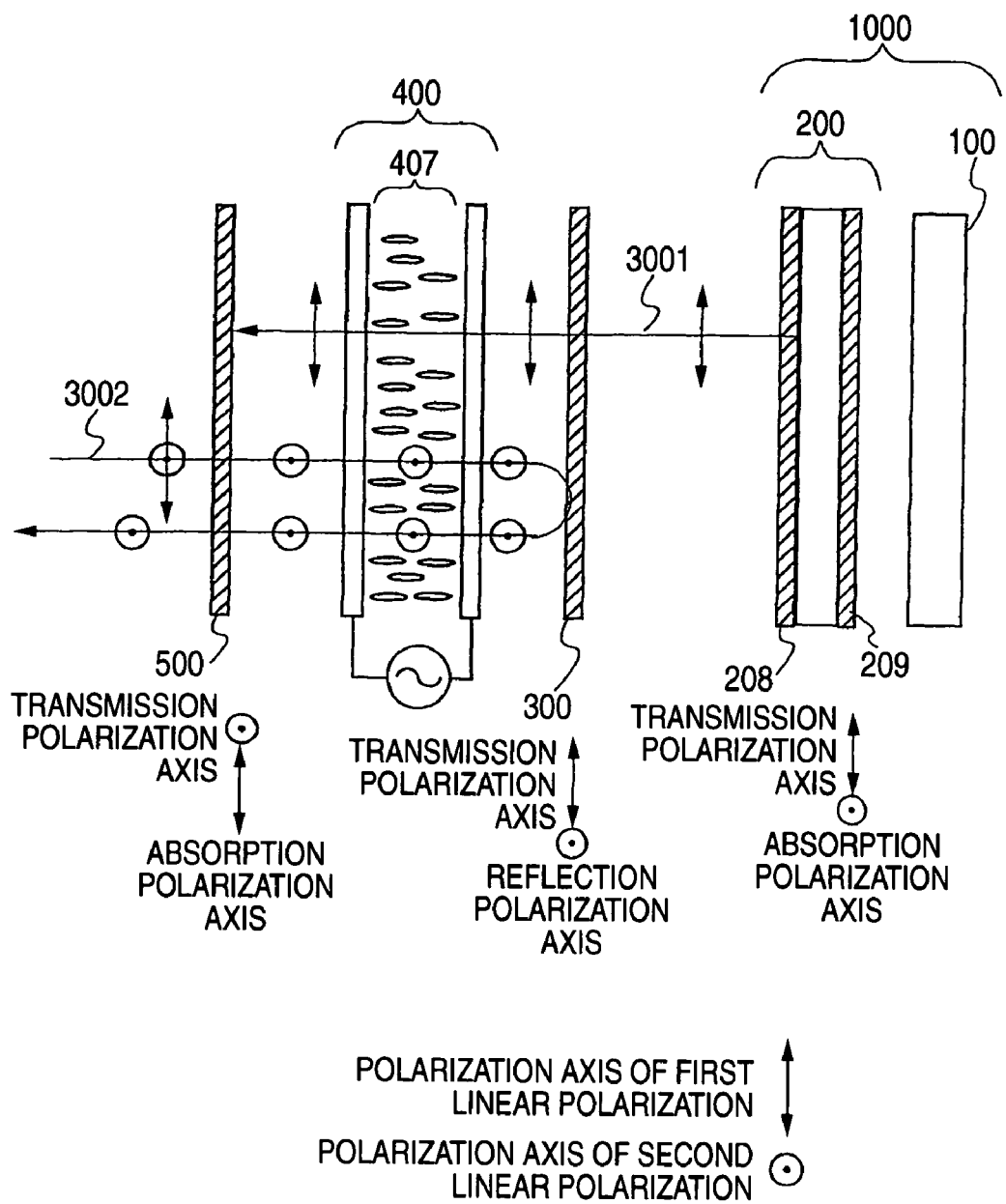
FIG. 11 is an explanatory drawing for explaining the operation of the display device of Example 1 of the invention.

FIG. 11 shows a case where the display device is in the mirror status. When the display device is in the mirror status, the switching switch 813 is switched on so that the transmission polarization axis variable portion 400 is in an ON state in which an electric field is applied to the liquid crystal layer 407 configuring the transmission polarization axis variable portion 400. In this case, although the outside light 3002 proceeding from the viewer side to the display device is non-polarized light, when it is transmitted through the absorbing polarization selection member 500, the first linear polarization component is absorbed and only the second linear polarization component is transmitted and made incident at the transmission polarization axis variable portion 400. The outside light 3002 made incident at the transmission polarization axis variable portion 400 at this time is transmitted through the transmission polarization axis variable portion 400 as the second linearly polarized light, without its polarization axis being changed, and reaches the reflective polarization selection member 300. Because the reflective polarization selection member 300 transmits the first linear polarization component and mirror-reflects the second linear polarization component, the outside light 3002 is reflected by the reflective polarization selection member 300. Because the outside light 3002 reflected by the reflective polarization selection member 300 is transmitted through the transmission polarization axis variable portion 400 as the second linear polarization without its polarization axis being changed, and is also transmitted through the polarization selection member 500 and proceeds toward the viewer, the mirror status is realized.

At this time, because the image display portion 1000 of the present example is disposed with the absorbing polarization selection member (polarizing plate) 208, the image light of the dark display region is absorbed by the absorbing polarization selection member (polarizing plate) 208 and does not reach the reflective polarization selection member 300. Thus, leakage of light from the dark display region can be largely reduced, regardless of the reflective capability of the reflective polarization selection member 300.

Also, of the image light emitted from the image display portion 1000, the image light 3001 emitted from the bright display region is transmitted through the reflective polarization selection member 300 and made incident at the transmission polarization axis variable portion 400. In a case where the present display device is in the mirror status, because the transmission polarization axis variable portion 400 is in an ON state and the image light 3001 transmitted through the transmission polarization axis variable portion 400 at this time is transmitted therethrough as the first linearly polarized light without its polarization axis being changed, it is absorbed by the absorbing polarization selection member 500 and is virtually not viewable to the viewer.

In other words, in the case of the mirror status, because the light from the image display member does not reach the viewer and half the light of the non-polarized light of the outside light 3002 made incident at the display device from the surrounding area is ideally reflected by the reflective polarization selection member 300 and proceeds toward the viewer side, the light functions as a bright mirror.

Also, the display device of the present example has a configuration in which, at the time of the mirror status, the transmission polarization axis variable portion 400 is switched on and the liquid crystal molecules 407a are made to stand. Usually, with a nematic liquid crystal, there is less offset of the polarization axis of light emitted in a diagonal direction when the voltage is on and the liquid crystal molecules are made to stand than when the voltage is off and the liquid crystal molecules are twisted. For this reason, with the display device of the present embodiment, the effect can also be obtained that there is little leakage of light in a diagonal direction of the image light (bright display light) 3001 in the mirror status in comparison to the display device of the configuration in which the voltage is off in the mirror status described in the conventional art.

It should be noted that the characteristics of the polarizing plates functioning as the absorbing polarization selection member 208 and the absorbing polarization selection member 500 are directly related to the image quality of the image display status and the ease with which the mirror of the mirror status can be viewed. Specifically, it is preferable for the transmittance of the polarizing plates to be high in order to contribute to the brightness of an image in the image display status and the brightness of the reflection image in the mirror status. Also, the degree of polarization of the polarizing plates is directly related to the amount of unnecessary reflection of outside light and the contrast ratio in the image display status. Because the higher the degree of polarization of the polarizing plates is, the higher the contrast of the image display becomes and the smaller unnecessary reflection of outside light becomes, it is preferable for the degree of polarization of the polarizing plates to be high. Even in the mirror status, because the higher the degree of polarization is, the smaller leakage of light from the image display member becomes, the contrast ratio of the reflection image is improved, and an easy-to-view mirror status is realized, it is preferable for the degree of polarization of the polarizing plates to be even higher.

Figure 12:
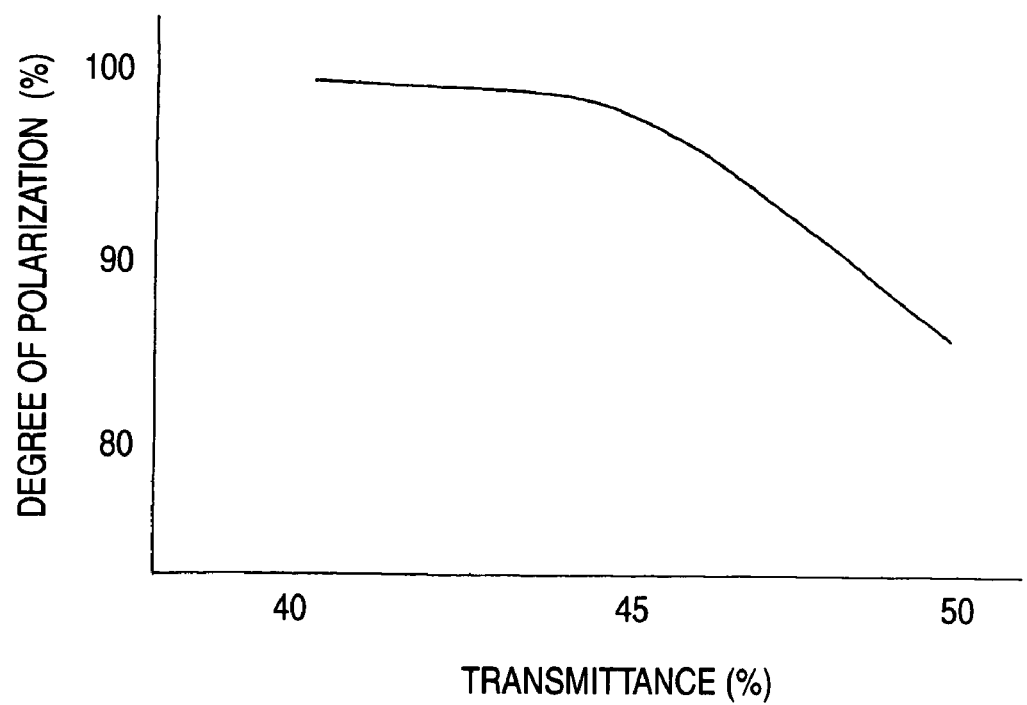
FIG. 12 is a graph showing an example of the relationship between transmittance and degree of polarization of a common polarizing plate.

Therefore, it is preferable to use polarizing plates that have high transmittance and a high degree of polarization for the polarizing plates used as the absorbing polarization selection member 208 and the absorbing polarization selection member 500. However, there usually exists a trade-off relationship, such as exemplified in FIG. 12, between the degree of polarization and the transmittance of the polarizing plates (*Nitto giho*, Vol. 38, No. 1, May 2000, pp. 11-14). FIG. 12 is a graph showing a common relationship between the degree of polarization and the transmittance of an iodine polarizing plate. The horizontal axis represents transmittance of the polarizing plate, and the vertical axis represents the degree of polarization. For this reason, the selection of characteristics of the polarizing plates used as the absorbing polarization selection member 208 and the absorbing polarization selection member 500 becomes extremely important for balancing the image quality of the image display status and mirror performance in the mirror status.

FIGS. 3 and 4 are graphs showing leakage of light from the image display portion 1000 in the mirror status. FIG. 3 shows, in luminance values, the magnitude of leakage of light at the bright display region, and FIG. 4 shows, in luminance values, the magnitude of leakage of light at the dark display region. These graphs are data of conditions in which bright display at a luminance of 450 cd/m$^2$ was conducted in a case where the display device was in the image display status. The horizontal axes represent positions on the display device display portion, and the vertical axes represent luminance values in a front direction. In the drawings, the A-type polarizing plate, the B-type polarizing plate, and the C-type polarizing plate represent types of polarizing plates used as the absorbing polarization selection member 208. For comparison, light leakage in a display device in which the absorbing polarization selection member 208 was eliminated and in which other configurations were the same as those of the image device of the present Example 1 is also included. With respect to the A-type polarizing plate of FIGS. 3 and 4, transmittance was 41.5% and the degree of polarization was 99.97%. With respect to the B-type polarizing plate, transmittance was 43.6% and the degree of polarization was 99.5%. With respect to the C-type polarizing plate, transmittance was 45.5% and the degree of polarization was 96.60%. It should be noted that the data of FIGS. 3 and 4 used the A-type polarizing plate as the absorbing polarization selection member 500.

As shown in FIGS. 3 and 4, it will be understood that leakage of light was remarkably reduced by disposing the absorbing polarization selection member 208, regardless of which of the A-type, B-type, or C-type polarizing plates was used, in comparison to the case in which there was no absorbing polarization selection member 208, and a mirror that reflected a reflection image having a high contrast ratio could be realized. It will be understood that, particularly in the cases of the A-type and B-type polarizing plates, in which the degree of polarization was 99.5% or higher, leakage of light at the dark display portion was remarkably reduced, as shown in FIG. 4, and a high-definition mirror status that reflected a reflection image with an even higher contrast ratio could be realized.

Therefore, it is preferable for the degree of polarization of the polarizing plate used as the absorbing polarization selection member 208 to be at least 96.60% or higher, and even more preferable for the degree of polarization to be 99.5% or higher in order to realize an even higher-definition mirror status.

Figure 13:
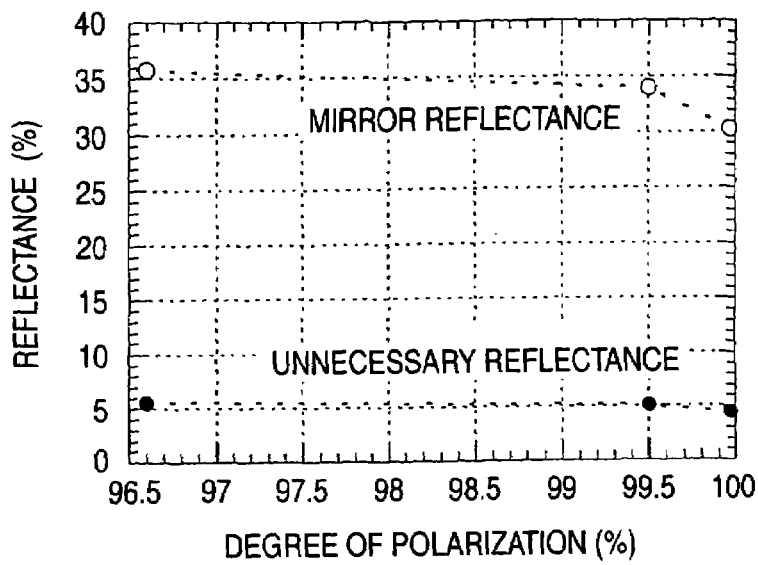
FIG. 13 is a graph showing the relationship between reflectance of outside light in an image display status and reflectance in the mirror status and degree of polarization of an absorbing polarization selection member 500 pertaining to the display device of Example 1 of the invention.

FIG. 13 is a graph showing the relationship between the degree of polarization of the polarizing plate used as the absorbing polarization selection member 500 and reflectance of the mirror in the mirror status and reflectance (unnecessary reflectance) of outside light in the image display status. The horizontal axis represents the degree of polarization of the polarizing plate used as the absorbing polarization selection member 500, and the vertical axis represents the reflectance. As shown in FIG. 13, by lowering the degree of polarization of the polarizing plate used as the absorbing polarization selection member 500 from 99.97% to 96.60% and making the polarizing plate more highly transmissive, the reflectance in the mirror status was improved by about 10% and a brighter mirror could be realized. At this time, the increase in unnecessary reflectance in the image display status was small.

Figure 14:
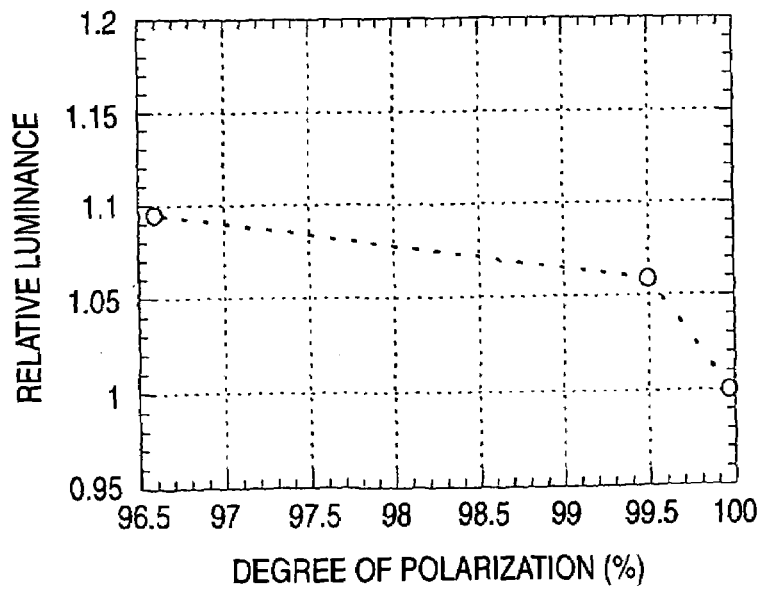
FIG. 14 is a graph showing the relationship between display luminance in the image display mode and degree of polarization of an absorbing polarization selection member 208 pertaining to the display device of Example 1 of the invention.

FIG. 14 is a graph showing one example of the relationship between the degree of polarization of the polarizing plate used as the absorbing polarization selection member 208 and luminance values of the bright display in the image display status. The horizontal axis represents the degree of polarization of the polarizing plate, and the vertical axis represents relative luminance. It should be noted that the data of FIG. 14 is data in the case where the A-type polarizing plate was used as the absorbing polarization selection member 500. As shown in FIG. 14, by lowering the degree of polarization of the polarizing plate used as the absorbing polarization selection member 208 from 99.97% to 96.60% and making the polarizing plate more highly transmissive, luminance rose by about 9.5%, and a brighter image was obtained. This relationship was the same as the case where the characteristics of the polarizing plate of the absorbing polarization selection member 208 were fixed and the degree of polarization of the polarizing plate of the absorbing polarization selection member 500 was changed.

Also, by using a polarizing plate having a degree of polarization of 99.5% or higher for one of the absorbing polarization selection member 208 and the absorbing polarization selection member 500, a sufficient contrast ratio could be obtained even if the degree of polarization of the other polarizing plate was 96.6% or less. Therefore, in order to improve luminance while maintaining a sufficient contrast ratio in the image display status, it is effective to use a polarizing plate with a high degree of polarization for one of the absorbing polarization selection member 208 and the absorbing polarization selection member 500 and to use a polarizing plate having a low degree of polarization for the other.

From the above, when P1 represents the degree of polarization of the polarizing plate of the absorbing polarization selection member 208 and P2 represents the degree of polarization of the polarizing plate of the absorbing polarization selection member 500, it is preferable that the following conditions are satisfied in order to balance, at a high level, the contrast ratio and brightness of the display image in the image display status and brightness and contrast ratio of the reflection image in the mirror status.

Condition 1: $0.966 \leq P1 \leq 0.995 \leq P2$

Condition 2: $0.966 \leq P2 \leq 0.995 \leq P1$ is satisfied, and the image display member is invariably switched to the dark display in the mirror status.

The reason that the image display member is invariably switched to the dark display in the mirror status in condition 2 is because, when the degree of polarization of the polarizing plate of the absorbing polarization selection member 500 is low, leakage of light from the bright display region becomes large and the contrast ratio of the reflection image drops remarkably. Thus, by switching the image display member to the dark display, leakage of light is prevented and a drop in the contrast ratio is prevented.

In the display device of Example 1, a switching portion that switches the lighting system 100 on and off in conjunction with the switching of the switching switch 813 of the transmission polarization axis variable portion 400 may be disposed, so that the lighting system is switched off when the entire screen is in the mirror status. In this case, because light is not outputted from the image display portion 1000, there are also the effects that an easy-to-view mirror, in which a reflection image having a high contrast ratio is obtained, can be realized with no leakage of light, and power consumption of the display device can be reduced only by the amount turned off.

Also, when only part of the screen is switched to the mirror status and an image is displayed on the remaining portion, a mirror that realizes a reflection image having a high contrast ratio can be realized and a bright image display region can be realized on the same screen by switching the region of the image display portion 1000 corresponding to the region of the mirror status to the dark display without switching the lighting system off, and a bright image display region can be realized on the same screen.

As described above, according to the display device of the present invention, the reflective polarization selection member 300 can be switched between an effectively transparent state and a state functioning as a mirror, due to control of the polarization state by the transmission polarization axis variable portion 400. Therefore, a bright image is obtained by switching the reflective polarization selection member 300 to the effectively transparent state in the image display status. Also, because outside light is virtually not reflected in the display device even in an environment in which the surrounding area is bright, deterioration of image quality, such as glare when a half mirror is used or a drop in contrast ratio accompanying glare, does not arise. In other words, switching between the image display status and the mirror status can be realized without deteriorating their mutual performance.

Also, because the image display portion 1000 of the present example is disposed with the absorbing polarization selection member (polarizing plate) 208, the image light of the dark display region is absorbed by the absorbing polarization selection member (polarizing plate) 208 and does not reach the reflective polarization selection member 300. Thus, leakage of light from the dark display region in the mirror status can be largely reduced, regardless of the reflective capability of the reflective polarization selection member 300.

It should be noted that, although a case was described in the above-described example in which the absorbing polarization selection member 500 transmits the second linear polarization component and absorbs the first linear polarization component, whose polarization axis is orthogonal to that of the second linear polarization component, a member that transmits the first linear polarization component and absorbs the second linear polarization component may be used as the absorbing polarization selection member 500. In this case, the transmission polarization axis variable portion 400 is switched to the mirror status in a state in which voltage is not applied to the liquid crystal layer 407, i.e., in an OFF state, and the transmission polarization axis variable portion 400 is switched to the image display status in a statue in which voltage is applied to the liquid crystal layer 407, i.e., in an ON state. That is, it can be switched to the mirror status when the power of the entire display device is off. This becomes very advantageous when the display device is used in instruments such as handheld PCs and mobile telephones, with respect to which power consumption is desired to be made as small as possible, because the mirror function can be realized in a state in which there is no power consumption.

It should be noted that, in order to reduce reflectance of light at the interfaces of the structural members in the display device of Example 1, it is possible to optically bond each member with a transparent adhesive that combines their refractive indexes.

EXAMPLE 2

A display device disposed with a function for switching to a mirror status of Example 2 of the invention will be described using FIGS. 15 and 16. The basic configuration of the display device of Example 2 is the same as that of the display device shown in FIGS. 1 and 2 of the second embodiment. That is, the display device of Example 2 is a device in which the absorbing polarization selection member 500 of the display device described in Example 1 is replaced with a combination of a reflective polarization selection member 301 and a variable polarization selection member 600. Therefore, the same reference numerals will be given to portions that are the same as those in Example 1, and detailed description of those portions will be omitted.

Figure 15:
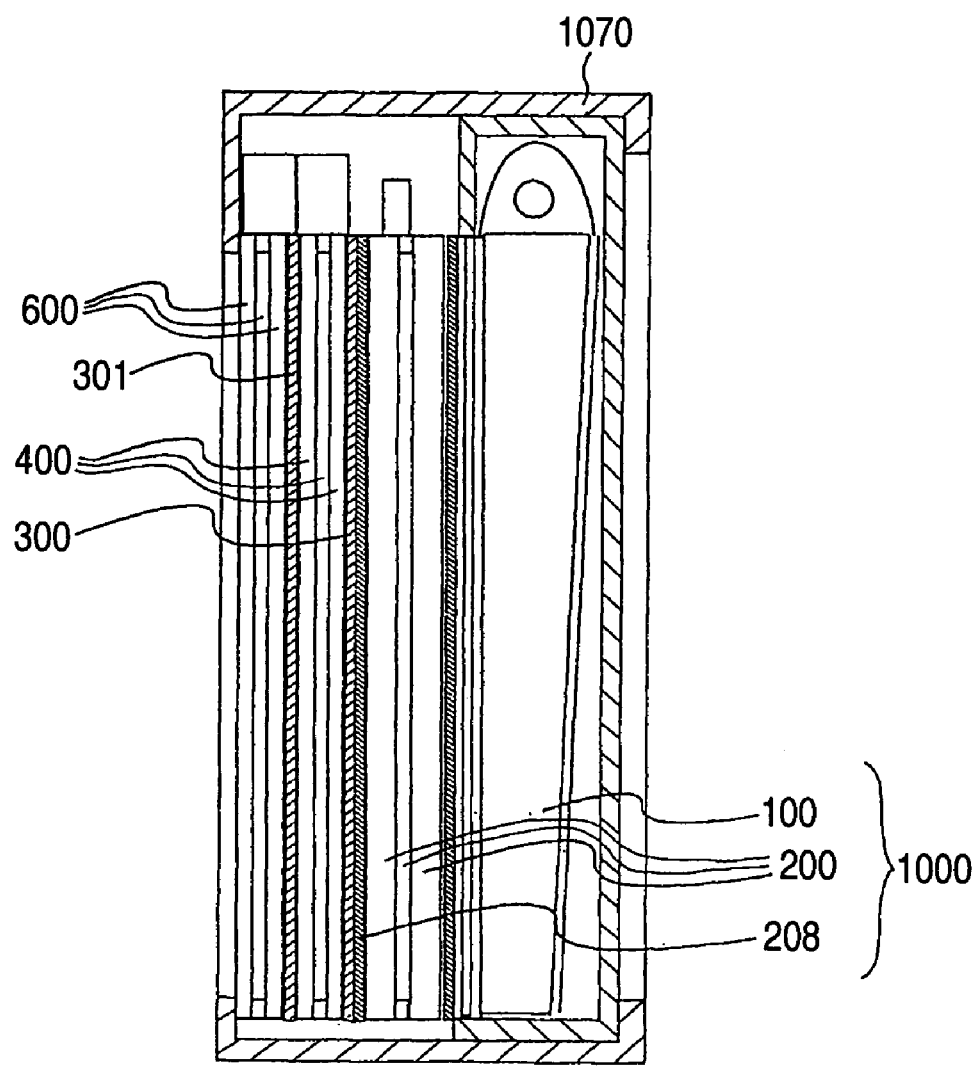
FIG. 15 is cross-sectional view showing the configuration of a display device of Example 2 of the invention.
Figure 16:
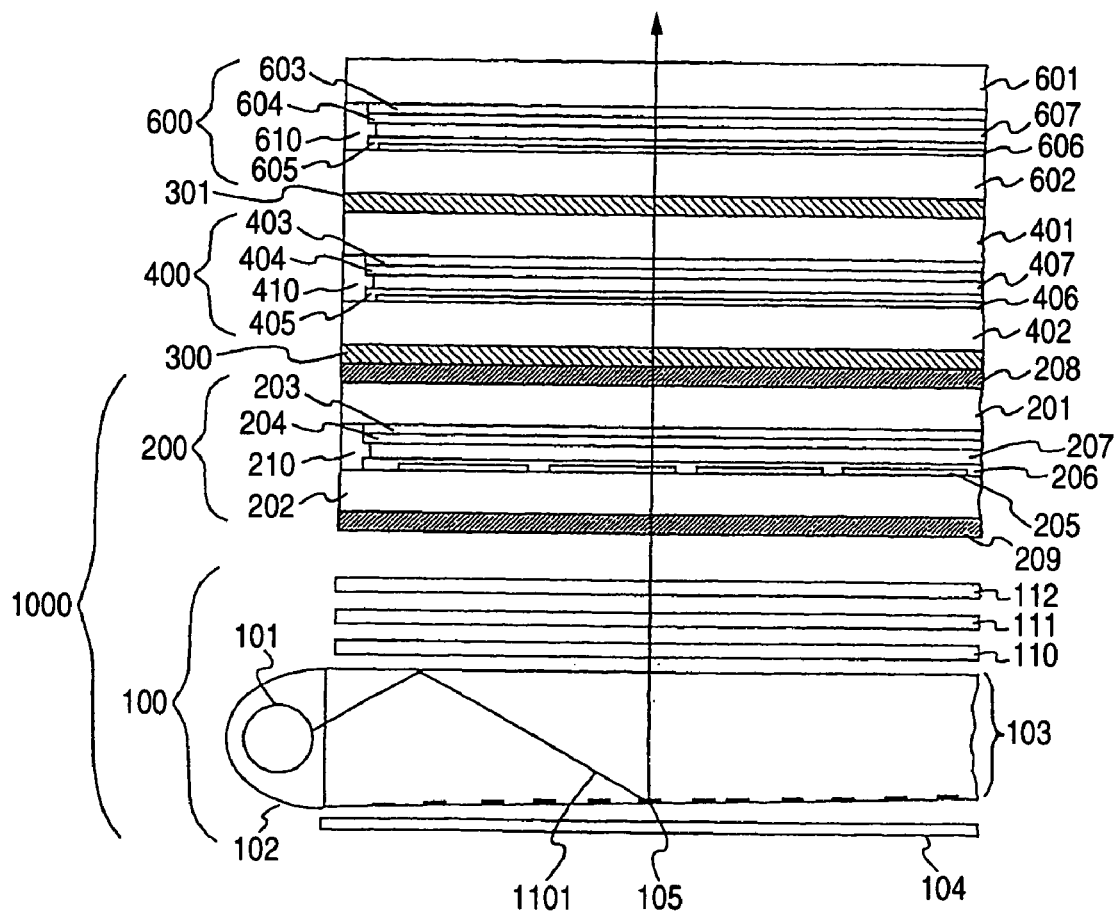
FIG. 16 is a cross-sectional view of respective members configuring the display device of Example 2 of the invention.

As shown in FIGS. 15 and 16, the configuration of the display device is one in which the reflective polarization selection member 301, which reflects the first linearly polarized light component and transmits the second linearly polarized light component, and the variable polarization selection member 600, which is selectable between one of a state that absorbs the first linear polarization component of the incident light and transmits the second linear polarization component and a state that transmits all polarization components, are successively disposed from the transmission polarization axis variable portion 400 side in place of the absorbing polarization selection member 500 of the display device of Example 1.

It should be noted that the viewer views the display device from the variable polarization selection member 600 side (left side in the drawings).

As the image display portion 1000, an image display portion configured by the liquid crystal display panel 200, which displays an image by adjusting the amount of light transmitted therethrough, and the lighting system 100 disposed at the rear surface of the liquid crystal display panel 200 can used.

In Example 2, although a case will be described with reference to FIG. 16 in which, similar to (Example 1), an edge light system is used as the lighting system 100 and a TN liquid crystal display panel is used as the display panel 200, the present invention is not limited thereto.

The reflective polarization selection member 300 and the reflective polarization selection member 301 transmit a predetermined linear polarization component and mirror-reflect a linear polarization component having a polarization axis orthogonal to that of the predetermined linear polarization component. The birefringence reflective polarization film or the member in which a ¼ wavelength plate is laminated on the top and bottom of a chlorestic liquid crystal layer described in (Example 1) can be used as these members.

When the birefringence reflective polarization film or the film-like member that is the laminate member of the film-like chlorestic liquid crystal layer and the ¼ wavelength plates is used as the reflective polarization selection member 300 and the reflective polarization selection member 301, the following is done. That is, because the flatness of the film-like reflective polarization selection member is low as it is, it is preferable to adhere and fix it, via a transparent adhesive, to a transparent substrate that is optically isotropic, transparent, flat and has high rigidity, such as a glass plate or a plastic plate, so that there is no warping. The film-like reflective polarization selection member 300 and the reflective polarization selection member 301 may also be adhered and fixed to a substrate of another member adjacent to the transparent substrate of the liquid crystal display panel 200.

The transmission polarization axis variable portion 400 is a portion that is selectable between one of a state that changes the polarization axis of incident linearly polarized light when incident linearly polarized light is transmitted therethrough, to thereby change the incident linearly polarized light to linearly polarized light whose polarization axis is orthogonal to that of the incident linearly polarized light, and a state that does not change the polarization axis, and the liquid crystal element described in (Example 1) can be used.

In the present example, the transmission polarization axis variable portion 400 is disposed between the reflective polarization selection member 300 and the reflective polarization selection member 301. The reflective polarization selection member 300 and the reflective polarization selection member 301 are members that function as reflection surfaces when the present display device is switched to the mirror status. For this reason, it is preferable to make the interval between the two as small as possible because parallax arises in the respective image reflected by the reflective polarization selection member 300 and the reflective polarization selection member 301 when the interval between the reflective polarization selection member 300 and the reflective polarization selection member 301 increases. In other words, it is preferable to thin as much as possible the thickness of the transmission polarization axis variable portion 400 disposed between the reflective polarization selection member 300 and the reflective polarization selection member 301.

The display device of Example 2 is primarily used for a person to view his/her reflected face in the mirror status. Given that the average height of an entire face of an adult male is 234.6 mm (*Ningen kogaku kijun suchi sushiki binran* ("Handbook of Ergonomic Standard Numerical Values and Mathematical Formulas"), 1992, Gihodo Shuppan), when it is presumed that the vertical distance from the eyes to the end of the face is half of that, or 117.3 mm, that the distance between display device in the mirror status and the eyes is 300 mm, and consideration is given to the fact that "the definition of resolution of average visual acuity 1.0 is a minimum of 1 minute at a viewing angle" (definition of eyesight; 1909 International Congress of Ophthalmology), it is preferable for the interval between the reflective polarization selection member 300 and the reflective polarization selection member 301 to be 0.11 mm or less from geometrical calculation in order for parallax to not be felt.

In other words, at present, when a 0.7 mm-thick glass substrate, which is commonly used in liquid crystal elements, is used for the transparent substrates 401 and 402 of the transmission polarization axis variable portion 400, parallax is generated in the reflected image when the present display device is in the mirror status. Therefore, in order to practically realize a mirror without parallax, it is preferable to use a transparent substrate of 0.05 mm or less as the transparent substrates 401 and 402. Glass or polymer film can be used for the transparent substrates 401 and 402. As the polymer film, particularly one without optical anisotropy, triacetylcellulose, or unstretched polycarbonate formed in a film by casting (solvent casting), can be used.

Alternatively, by disposing the reflective polarization selection member 300 and the reflective polarization selection member 301 further toward the liquid crystal layer 407 side than the transparent substrates 401 and 402, so that the liquid crystal layer 407 is sandwiched therebetween, a mirror status without parallax can be realized because the interval between the reflective polarization selection member 300 and the reflective polarization selection member 301 becomes about the thickness of the liquid crystal layer.

It should be noted that, because some parallax is allowable depending on the purpose, the present invention is not one that excludes cases where the interval between the reflective polarization selection member 300 and the reflective polarization selection member 301 is not the above-described value.

The variable polarization selection member 600 is a member that is selectable between one of a state that absorbs the first linear polarization component of the incident light and transmits the second linear polarization component, whose polarization axis is orthogonal to that of the first linear polarization component, and a state that transmits all polarization components. A guest host liquid crystal element can be used as such a member. Here, a variable polarization selection member 600 that uses a guest host liquid crystal element will be described with reference to FIGS. 17 and 18.

The variable polarization selection member 600 that uses a guest host liquid crystal element includes a first transparent substrate 601, on the entire surface of which are laminated and formed a transparent electrode 603 comprising ITO and an orientation film 604 comprising a polyimide polymer, a second transparent substrate 602, on the entire surface of which are laminated and formed a transparent electrode 606 and an orientation film 605, and a guest host liquid crystal layer 607 sandwiched therebetween.

The transparent electrodes 603 and 606 respectively formed on the two transparent substrates 601 and 602 are connected to a power source via wiring and a switching switch 600a, and are selectable between one of a state in which voltage is not applied to the transparent electrodes 603 and 606 and a state in which voltage is applied. In other words, they are formed so as to be selectable between one of a state in which there is no difference in potential between the transparent electrodes 603 and 606 and an electric field is not applied to the liquid crystal layer 607 and a state in which voltage is applied to the transparent electrodes 603 and 606 and an electric field is applied to the liquid crystal layer 607.

The liquid crystal layer 607 is configured by disposing the two transparent substrates 601 and 602 so that the sides on which the orientation films are formed face each other, disposing a constant gap between the two transparent substrates 601 and 602 by sandwiching unillustrated spacers therebetween, sealing the area surrounding this gap with a seal material 610 in a frame-shape, forming a space, and injecting guest host liquid crystal into this space.

Figure 17:
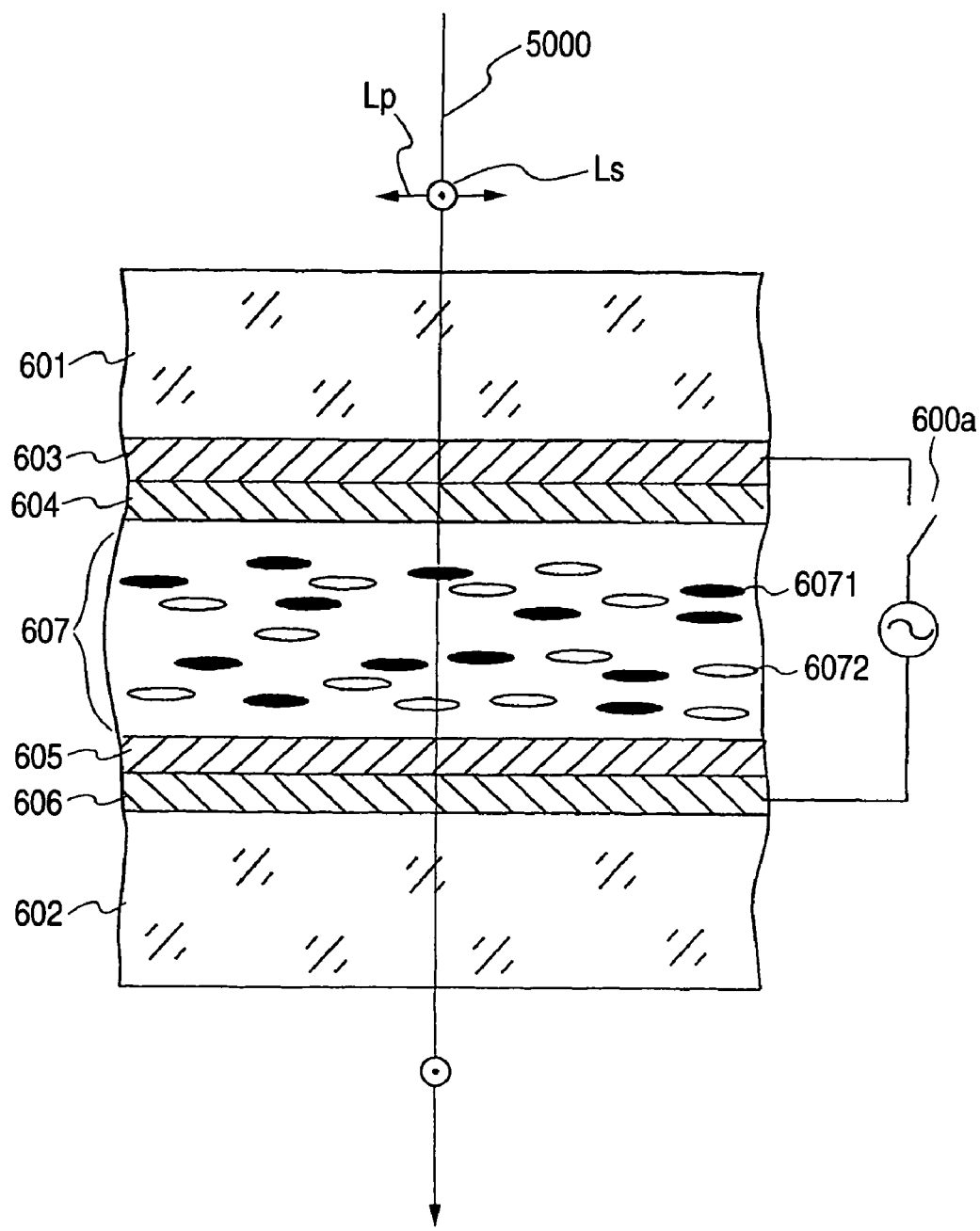
FIG. 17 is a cross-sectional view showing an example of the configuration of a variable polarization selection member 600 of the display device of Example 2 of the invention.
Figure 18:
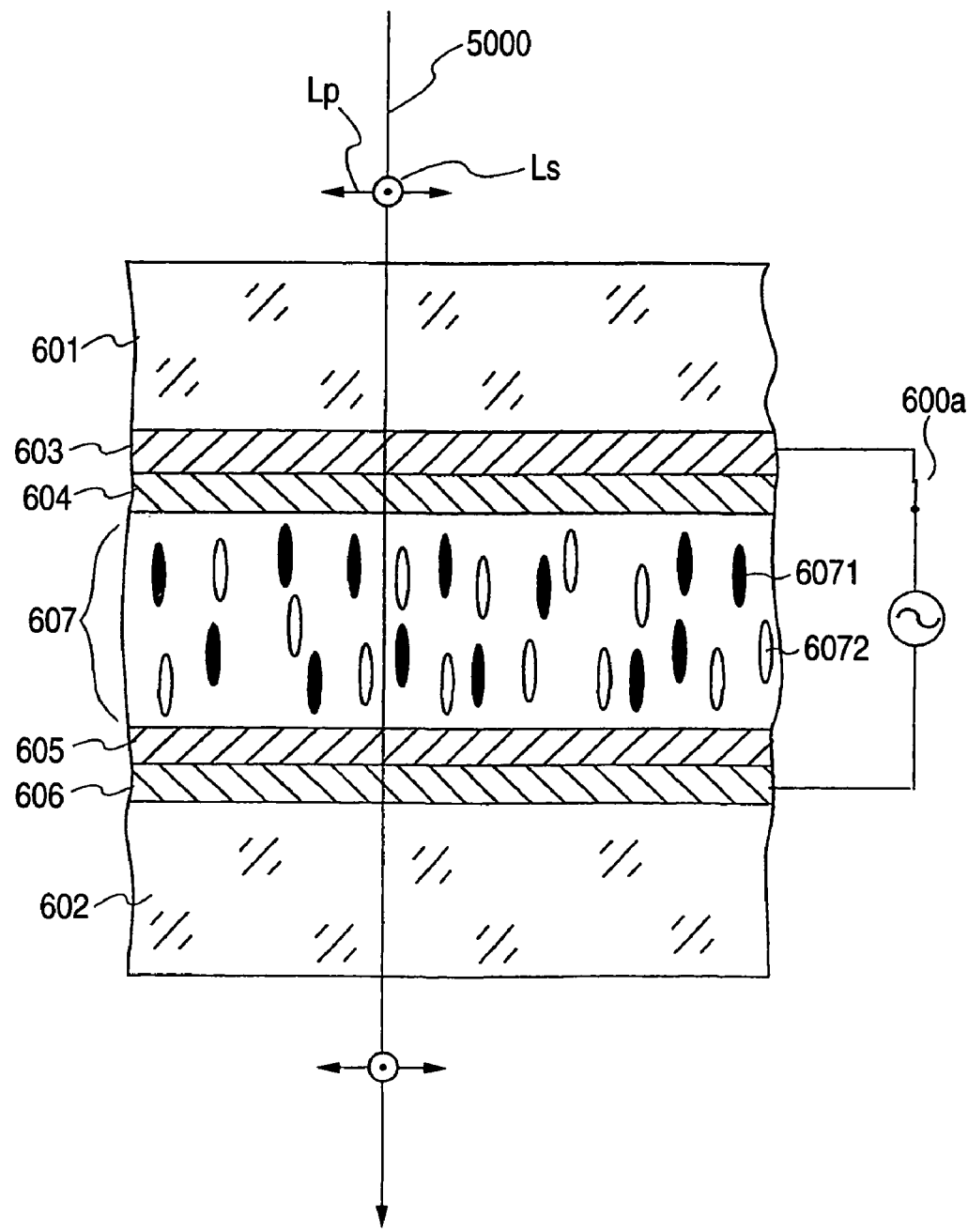
FIG. 18 is a cross-sectional view showing an example of the configuration of the variable polarization selection member 600 of the display device of Example 2 of the invention.

Here, the operation of the variable polarization selection member 600 will be described with reference to FIGS. 17 and 18. FIGS. 17 and 18 are partial schematic cross-sectional views showing an example of the variable polarization selection member 600. The guest host liquid crystal layer 607 is one in which dichroic dyes 6071 are added as a guest to nematic liquid crystal 6072. In the present example, liquid crystal whose anisotropy is positive is used as the nematic liquid crystal, and the orientation direction of the long axes of the liquid crystal molecules is substantially horizontal with respect to the substrates 601 and 602 due to the orientation films 604 and 605, to which a rubbing treatment has been administered, is an orientation in which there is no twist between the two transparent substrates 601 and 602, i.e., is a homogenous orientation. A pretilt is added at this time so that the orientation directions near the two transparent substrates 601 and 602 are mutually parallel. It is preferable to add a 2° or more angle of pretilt so that a reverse tilt does not occur.

Here, a pretilt of about 4° is added.

Here, the dichroic dyes 6071 have a rod-like structure and a property in which they are oriented in a direction parallel to the liquid crystal molecules. For this reason, when, for example, the orientation of the liquid crystal molecules is changed from a horizontal direction to a vertical direction with respect to the substrates, the orientation of the dichroic dyes is also similarly changed from the horizontal direction to the vertical direction. Here, the guest host liquid crystal material LA 121/4 (brand name) manufactured by Mitsubishi Chemical Corporation was used as the liquid crystal layer 607, and the thickness of the liquid crystal layer 607 was 5 μm.

FIG. 17 shows a state in which there is no difference in potential between the transparent electrodes 603 and 606 respectively formed on the two transparent substrates 601 and 602 and an electric field is not applied to the liquid crystal layer 607, i.e., a state in which the switching switch 600*a* is in an OFF state. In this case, the nematic liquid crystal 6072 of the liquid crystal layer 607 is in an initial orientation state, i.e., has a homogenous orientation substantially horizontal to the substrates (left-right direction of the page in the drawing) and the dichroic dyes 6071 is also similarly orientated. The dichroic dyes 6071 have an absorption polarization axis substantially parallel to the molecule axes and a property that strongly absorbs the polarization component parallel to the molecule axes and virtually does not absorb the polarization component orthogonal thereto. For this reason, when incident light 5000, which has various polarized wave surfaces made incident from a substantially vertical direction with respect to the transparent substrate surfaces, passes through the liquid crystal layer 607, a linear polarization component Lp that has the vibration direction of an electric vector parallel to the molecule axes of the dichroic dyes 6071 is absorbed and a linear polarization component Ls that is orthogonal thereto is transmitted.

FIG. 18 shows a state in which a voltage is applied to the transparent electrodes 603 and 606 respectively formed on the two transparent substrates 601 and 602 and an electric field is applied to the liquid crystal layer 607, i.e., a state in which the switching switch 600*a* is in an ON state. In this case, the orientation direction of the molecule axes of the nematic liquid crystal 6072 is changed from the horizontal direction to the vertical direction with respect to the two transparent substrates 601 and 602, and the orientation direction of the dichroic dyes 6071 is changed in accompaniment therewith. For this reason, the incident light 5000, which has various polarized wave surfaces made incident from a substantially vertical direction with respect to the transparent substrate surfaces, is transmitted virtually without its polarization component being absorbed. At this time, in the present example, the voltage applied to the transparent electrodes 603 and 606 of the transparent substrates 601 and 602 was ±30V, 60 Hz.

Therefore, by causing the orientation of the liquid crystal molecules to match the polarization axis of the first linear polarization, a variable polarization selection member, which is selectable between one of a state that absorbs the first linear polarization component of the incident light and transmits the second linear polarization component, whose polarization axis is orthogonal to that of the first linear polarization component, and a state that transmits all polarization components, can be realized.

It should be noted that, it is preferable to administer, to the surface of the variable polarization selection member 600, a treatment that suppresses regular reflection in order to suppress deterioration of image quality resulting from glare of outside light. However, that which is important here is that, in order for the display device of the invention to also function as a mirror, methods that reduce regular reflection components, such as forming minute recesses and projections on the surface or forming a transparent resin layer including transparent particles on the surface, are not preferable as the treatment for preventing regular reflectance of the variable polarization selection member 600. The reason for this is because, when such a treatment is administered, although image display performance is improved due to a reduction of glare, the problem arises that the image reflected in the mirror becomes blurry and the performance of the mirror deteriorates. Therefore, as the treatment for preventing regular reflectance of the variable polarization selection member 600, it is preferable to form an antireflection film on the surface thereof. Well known technology can be used for the antireflection film. That is, a method in which multilayers of several types of metal oxides having different optically designed refractive indexes are coated by vapor deposition, or a method in which a low refractive index material such as a fluorine compound is coated, can be used.

Figure 19:
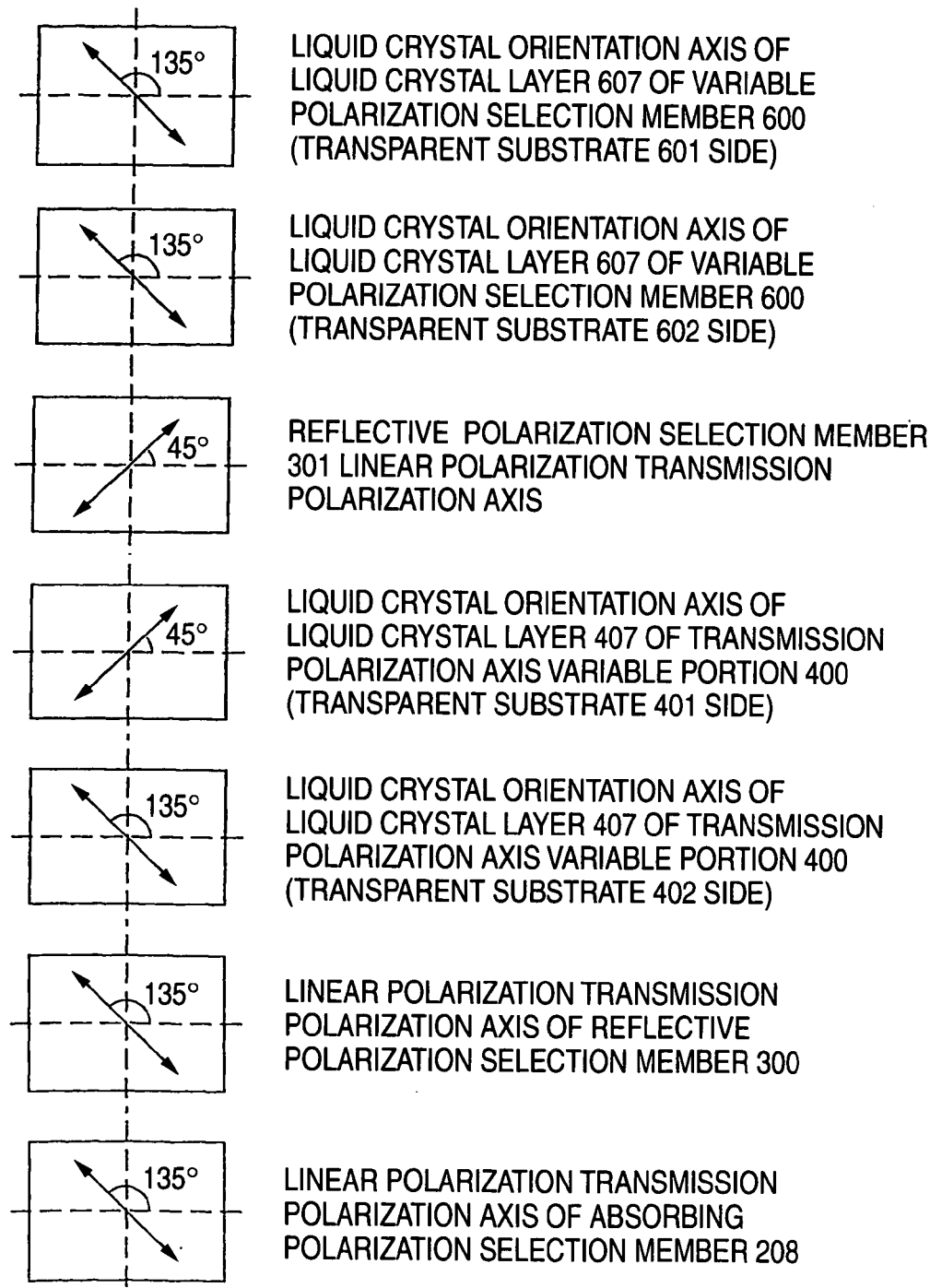
FIG. 19 are explanatory drawings of directions of axes of the respective members configuring the display device of Example 2 of the invention.

FIG. 19 are explanatory drawings of directions of axes of the respective members of the present example. It should be noted that the display of the angle of each axis uses, as a reference, a position at 3 o'clock in a horizontal direction of the image display surface, and is represented by an angle counterclockwise from here. As shown in FIG. 19, the transmission polarization axis of the linear polarization of the absorbing polarization selection member (polarizing plate) 208 of the TN liquid crystal display panel 200 configuring the image display portion 1000 is 135°. Therefore, the transmission polarization axis of the linear polarization of the reflective polarization selection member 300 is similarly 135°, the orientation directions of the liquid crystal molecule long axes of the transparent substrate 401 and the transparent substrate 402 of the transmission polarization axis variable portion 400 are 135° and 45°, respectively, the transmission polarization axis of the linear polarization of the reflective polarization selection member 301 is 45°, and the orientation directions of the liquid crystal molecule long axes of the transparent substrate 601 and the transparent substrate 602 of the variable polarization selection member 600 are both 135°.

Figure 20:
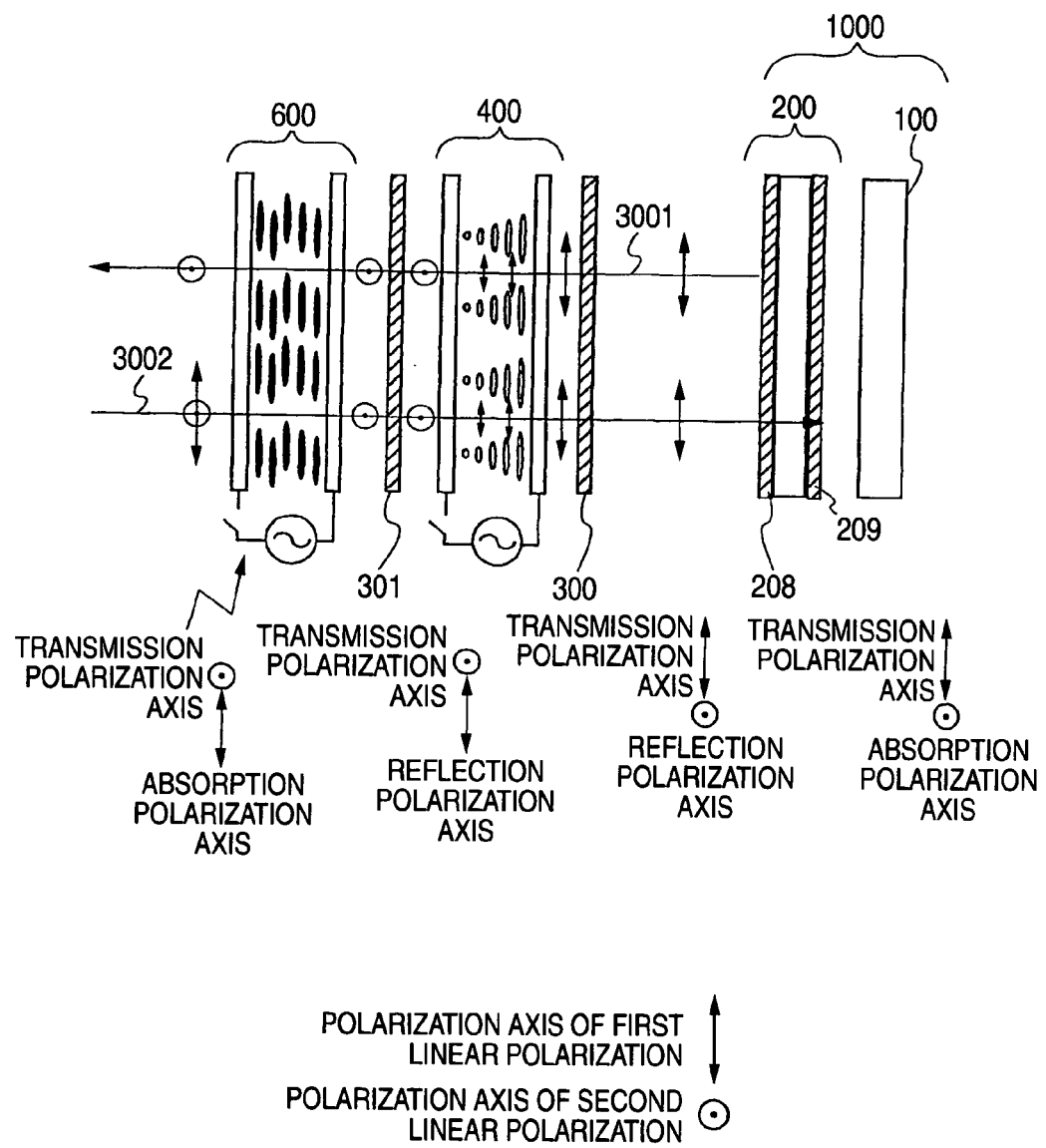
FIG. 20 is an explanatory drawing showing the operation of the display device of Example 2 of the invention.
Figure 21:
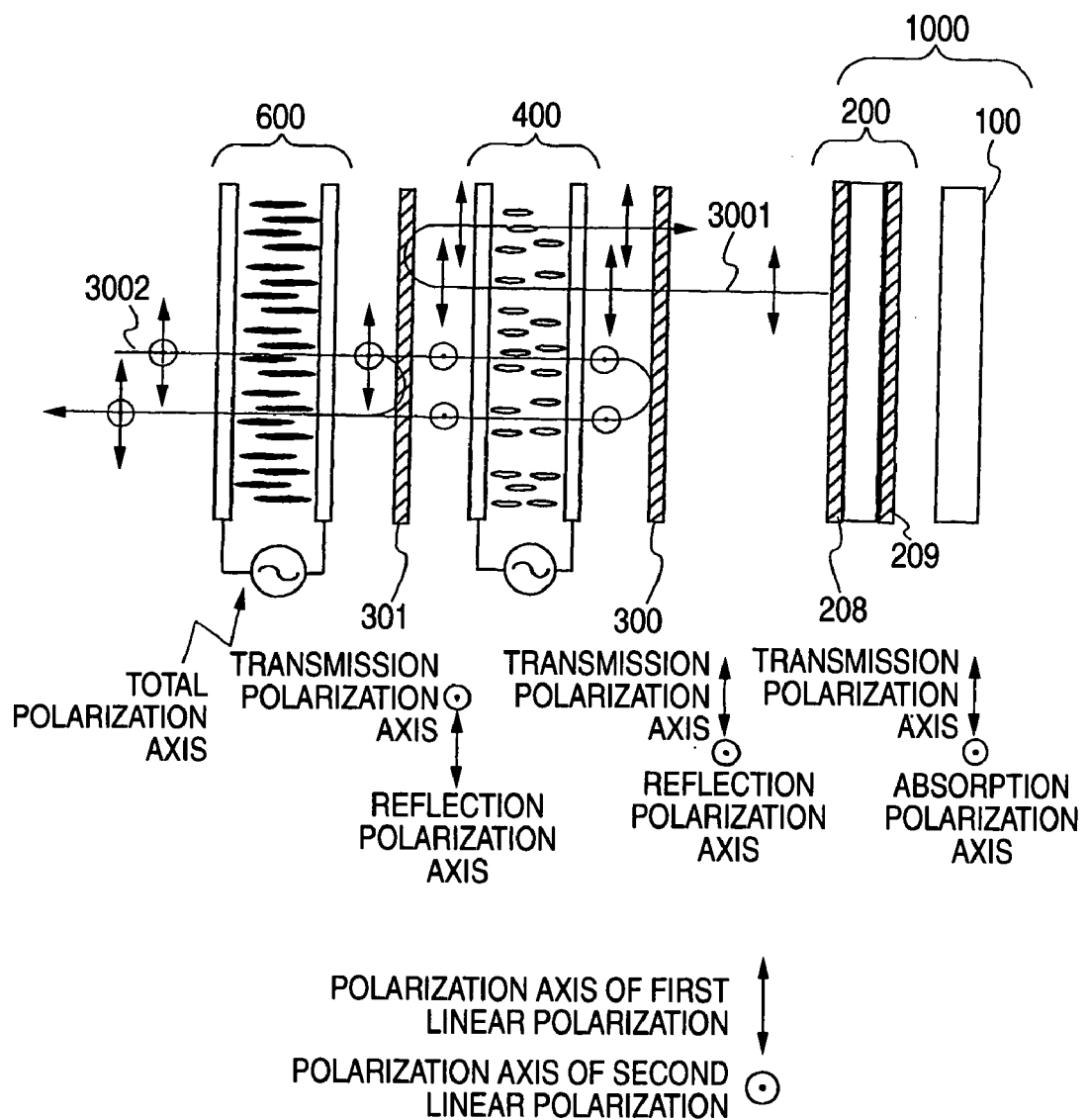
FIG. 21 is an explanatory drawing showing the operation of the display device of Example 2 of the invention.

Next, the operation of the display device of Example 2 will be described with reference to the drawings. FIGS. 20 and 21 are schematic structural diagrams for describing the basic configuration and operation of the present display device.

In the present example, a case will be described in which, when the variable polarization selection member 600 is in an OFF state, the first linear polarization component (in the vertical direction of the page in the drawings) is absorbed and the second linear polarization component (in the perpendicular direction of the page in the drawings), whose polarization axis is orthogonal to that of the first linear polarization component, is transmitted, and when the variable polarization selection member 600 is in an ON state, all polarization components are transmitted.

Also, a case will be described in which, when the transmission polarization axis variable portion 400 is in an OFF state, the polarization axis of the incident linearly polarized light is changed when the incident linearly polarized light is transmitted therethrough and the incident linearly polarized light is changed to linearly polarized light whose polarization axis is orthogonal to that of the incident linearly polarized light, and when the transmission polarization axis variable portion 400 is in an ON state, the polarization axis is not changed.

FIG. 20 shows the case of the image display status. When the present display device is in the image display status, the transmission polarization axis variable portion 400 is in a state in which voltage is not applied to the liquid crystal layer 407 configuring the transmission polarization axis variable portion 400, i.e., is in an OFF state. The variable polarization selection member 600 is also switched to an OFF state.

As was already described, the image display portion 1000 is configured by the liquid crystal display panel 200 and the lighting system 100 disposed at the rear surface thereof. The first linear polarization that is emitted from the lighting system 100 and transmitted through the absorbing polarization selection member (polarizing plate) 208 of the liquid crystal display panel 200 is emitted as the image light 3001 from the image display portion 1000. The image light 3001 comprising the first linearly polarized light emitted from the image display portion 1000 is transmitted through the reflective polarization selection member 300 and made incident at the transmission polarization axis variable portion 400.

The image light 3001 passing through the transmission polarization axis variable portion 400 is changed from the first linearly polarized light to the second linearly polarized light. The image light 3001 transmitted through the transmission polarization axis variable portion 400 is made incident at the reflective polarization selection member 301. Because the reflective polarization selection member 301 mirror-reflects the first linear polarization component but transmits the second linear polarization component, the image light 3001 that is changed to the second linearly polarized light by the transmission polarization axis variable portion 400 is transmitted through the reflective polarization selection member 301 and is made incident at the variable polarization selection member 600. When the display device is in the image display status, the variable polarization selection member 600 is in an OFF state, and of the light made incident thereat, the first linear polarization component is absorbed but the second linear polarization component is transmitted. Therefore, the image light 3001 is transmitted through the variable polarization selection member 600 and is viewable to the viewer.

Although the outside light 3002 made incident from the viewer side (the left side in the drawing) to the display device is non-polarized light, when the display device is in the image display status, the variable polarization selection member 600 is in an OFF state, the first linear polarization component of the light made incident thereat is absorbed, and only the second linear polarization component is transmitted. When the outside light 3002 transmitted through the variable polarization selection member 600 is transmitted through the reflective polarization selection member 301, it is changed when transmitted through the transmission polarization axis variable portion 400, from the second linearly polarized light to the first linearly polarized light, transmitted through the reflective polarization selection member 300, proceeds toward the image display portion 1000, and virtually does not return to the viewer side.

Therefore, in the image display status, a bright image can be obtained because the image light 3001 emitted from the image display portion 1000 proceeds toward the viewer with virtually no loss. Moreover, because the outside light 3002 is virtually not reflected in the display device, no deterioration of image quality resulting from the outside light, such as a drop in the contrast ratio and glare, occurs.

FIG. 21 shows a case where the display device is in the mirror status. When the display device is in the mirror status, the transmission polarization axis variable portion 400 is switched to an ON state in which voltage is applied to the liquid crystal layer 407 configuring the transmission polarization axis variable portion 400. The variable polarization selection member 600 is also switched to an ON state.

In this case also, the image light 3001 emitted from the image display portion 1000, and corresponding to the bright display transmitted through the reflective polarization selection member 300 is made incident at the transmission polarization axis variable portion 400. Because the image light 3001 transmitted through the transmission polarization axis variable portion 400 at this time is transmitted as the first linearly polarized light without its polarization axis being changed, is reflected by the reflective polarization selection member 301, and returns to the image display portion 1000, it is not viewable to the viewer.

With respect to the outside light 3002 proceeding from the viewer side to the display device, because the variable polarization selection member 600 is in an ON state and switched to a transparent state with respect to most of the polarization components when the display device is in the mirror status, most of the outside light 3002 is transmitted through the variable polarization selection member 600. The outside light 3002 transmitted through the variable polarization selection member 600 is made incident at the reflective polarization selection member 301. Of the outside light 3002 made incident at the variable polarization selection member 301, the second linear polarization component is transmitted through the reflective polarization selection member 301, and the first linear polarization component is reflected by the reflective polarization selection member 301, again transmitted through the variable polarization selection member 600, and proceeds toward the viewer side. Of the outside light 3002 made incident at the reflective polarization selection member 301, the second linear polarization component transmitted through the reflective polarization selection member 301 is transmitted through the transmission polarization axis variable portion 400 without its polarization axis being changed, is reflected by the reflective polarization selection member 300, is again transmitted through the transmission polarization axis variable portion 400, through the reflective polarization selection member 301, and through the variable polarization selection member 600, and proceeds toward the viewer side.

In other words, in the case of the mirror status, because the image light 3001 is reflected by the reflective polarization selection member 301 and returns to the image display portion 1000, it is not viewable to the viewer. Also, because most of the polarization components of the outside light 3002 are reflected by the first reflective polarization selection member 300 and the reflective polarization selection member 301, the outside light 3002 functions as an extremely bright mirror.

It should be noted that, similar to Example 1, when the display device is switched to the mirror status in the present example, the display device can be configured so that the corresponding portion of the image display portion 1000 is switched to the dark display or so that the lighting system 100 configuring the image display member is turned off in conjunction with the above-described operation. In this case, because the image light is not outputted from the image display portion 1000, unnecessary stray light does not proceed to the viewer and the performance of the mirror is not compromised. Particularly when the lighting system 100 is turned off, there is also the effect that power consumption can be reduced in the mirror status.

As described above, in the display device of the present example, the reflective polarization selection member 300 and the reflective polarization selection member 301 can be switched between an effectively transparent state and a state functioning as a mirror, due to the control of the absorption of the polarized light by the variable polarization selection member 600 and the control of the polarization state by the transmission polarization axis variable portion 400. Therefore, a bright image is obtained by switching the reflective polarization selection member 300 and the reflective polarization selection member 301 to an effectively transparent state in the image display status. Moreover, because outside light is virtually not reflected in the display device even in an environment in which the surrounding area is bright, deterioration of image quality, such as glare when a half mirror is used or a drop in the contrast ratio accompanying glare, does not arise. In other words, switching between the image display status and the mirror status can be realized without deteriorating their mutual performance.

In particular, in the present example, when the display device is in the mirror status, because the variable polarization selection member 600 is switched to the transparent state and most of the polarization components of the outside light are reflected by the reflective polarization selection member 300 and the reflective polarization selection member 301, there is the effect that an extremely bright mirror of two times or more that of the display device of Example 1 can be realized.

It should be noted that, in order to reduce interface reflectance of each of the members configuring the display device, it is also possible to configure the device so that each member is optically bonded with a transparent adhesive that combines their refractive indexes.

It should be noted that, in the above-described example, although a liquid crystal whose anisotropy is positive was used for the nematic liquid crystal of the liquid crystal layer 607 of the variable polarization selection member 600 and the orientation was a homogenous orientation, a liquid crystal whose anisotropy is negative may be used as the nematic liquid crystal of the liquid crystal layer 607 and the direction of the liquid crystal molecule long axes may have a homeotropic orientation that becomes substantially perpendicular to the transparent substrates in the initial state (a state in which an electric field is not applied). In this case, although the orientation direction of the liquid crystal molecule long axes changes from the perpendicular direction to a horizontal direction with respect to the two transparent substrates 601 and 602 when voltage is applied to the transparent electrodes 603 and 606 of the two transparent substrates 601 and 602 and an electric field is applied to the liquid crystal layer 607, a slight pretilt angle may be added to the initial orientation state of the liquid crystal so that the liquid crystal molecules are orientated in a constant direction.

When a liquid crystal whose anisotropy is negative is used as the nematic liquid crystal of the liquid crystal layer 607 and the orientation is a homeotropic orientation, because the direction of the molecule long axes of the nematic liquid crystal of the liquid crystal layer 607 becomes substantially perpendicular to the transparent substrates and the dichroic dye is also similarly oriented in the state in which there is no difference in potential between the transparent electrodes 603 and 606 of the two transparent substrates 601 and 602 and an electric field is not applied to the liquid crystal layer 607, i.e., the OFF state, the incident light from the outside is transmitted virtually without being absorbed in the liquid crystal layer 607.

In the state in which voltage is applied to the transparent electrodes 603 and 606 of the two transparent substrates 601 and 602 and an electric field is applied to the liquid crystal layer 607, i.e., in the ON state, the orientation direction of the molecule long axes of the nematic liquid crystal changes from the perpendicular direction to the horizontal direction with respect to the two transparent substrates 601 and 602, and the orientation direction of the dichroic dye also changes to the horizontal direction in accompaniment therewith. The dichroic dye has an absorption polarization axis substantially horizontal to the molecule axes and has the property that strongly absorbs the polarization component parallel to the molecule axes and virtually does not absorb the polarized light component orthogonal thereto. For this reason, when the incident light from the outside passes through the liquid crystal layer 607, the linear polarization component having the vibration direction of the electric vector in the direction parallel to the molecule axes of the dichroic dye is absorbed and the linear polarization component orthogonal thereto is transmitted.

In other words, by causing the orientation direction of the liquid crystal of the state in which an electric field is applied to the liquid crystal layer 607 to match the polarization axis of the first linear polarization, a variable polarization selection member, which is selectable between one of a state that absorbs the first linear polarization component of the incident light and transmits the second linear polarization component, whose polarization axis is orthogonal to that of the first linear polarization component, and a state that transmits all polarization components, can be realized.

It should be noted that, in Example 2, a case was described in which the variable polarization selection member 600 was disposed at the viewer side of the reflective polarization selection member 301. The variable polarization selection member is an important member that controls unnecessary reflection of outside light at the reflective polarization selection member 301 in the image display status and switches to an effectively transparent state in the mirror status to contribute to improving the brightness of the mirror. However, the present invention is not one that excludes a configuration in which the variable polarization selection member 600 is not disposed at the viewer side of the reflective polarization selection member 301 when consideration is given various purposes. In this case, although there are cases where outside light is reflected by the reflective polarization selection member 301 and the image becomes difficult to view in the image display status, an extremely high reflectance of 80% or more is obtained because there is no reflective polarization selection member and there is no member obstructing the reflection of outside light by the reflective polarization selection member 301 in the mirror status. This reflectance is a brightness comparable to a mirror in which a thin film of aluminium is formed on a glass substrate, and a mirror of a brightness equal to that of a common mirror can be realized.

(Size of the Mirror Region)

Here, a preferable size of the mirror region is determined in a case where the display device of Example 1 and Example 2 is chiefly used for a viewer to view his/her reflected face in the mirror status. When consideration is given to the fact that the average height of an entire face of an adult male is 234.6 mm and that the average head width is 156.4 mm (*Ningen kogaku kijun suchi sushiki binran* ("Handbook of Ergonomic Standard Numerical Values and Mathematical Formulas"), 1992, Gihodo Shuppan), a size with a height of 117.3 mm and a width of 78.2 mm or more is necessary as the size of the mirror in order for an entire face to be reflected in the mirror without the viewer changing his/her viewing position.

Switching between the image display status and the mirror status is conducted by the transmission polarization axis variable portion 400 in the display device of (Example 1) and by the transmission polarization axis variable portion 400 and the variable polarization selection member 600 in (Example 2). Thus, in order to realize a mirror region having the above-described size, it is preferable for the transparent electrodes 403 and 406 respectively formed on the two transparent substrates 401 and 402 configuring the transmission polarization axis variable portion 400 and the transparent electrodes 603 and 606 respectively formed on the two transparent substrates 601 and 602 of the variable polarization selection member 600 to be continuously formed, without omission, with respect to a region with at least a height of 117.3 mm and a width of 78.2 mm or more. The reason for this is because, although the portions with the transparent electrodes function as a mirror when the transparent electrodes are, for example, divided and formed within this region range, the gaps between the transparent electrodes do not function as a mirror, these gaps are viewed as stripes, and satisfactory performance as a mirror becomes unobtainable.

It should be noted that, when the display device of Example 1 and Example 2 is used in a portable instrument such as a mobile telephone or a PDA, sometimes the size of the display device itself is less than the above-described mirror size of the 117.3 mm height and the 78.2 mm width. Thus, the mirror region can be configured so that a mirror of a size that does not reflect the entire face but is suited for the viewer to partially fix his/her makeup or check contact lenses in his/her eyes is obtained. In this case, the mirror region may be made to a size in which ¼ of the face is reflected in the mirror. Specifically, it is preferable for the size of the mirror to have a height of 58.6 mm and a width of 39.1 mm or more.

Therefore, it is preferable for the transparent electrodes 403 and 406 respectively formed on the two transparent substrates 401 and 402 configuring the transmission polarization axis variable portion 400 and the transparent electrodes 603 and 606 respectively formed on the two transparent substrates 601 and 602 of the variable polarization selection member 600 to be continuously formed, without omission, with respect to a region with at least a height of 58.6 mm and a width of 39.1 mm or more.

EXAMPLE 3

Although, in the display devices of Example 1 and Example 2, a liquid crystal display panel in which the lighting system was disposed at the underside thereof was used as the image display portion 1000 emitting the first linear polarization as the image light, the present invention is not limited thereto.

A rear projection display device using a liquid crystal display panel as a two-dimensional optical switch element can be used as the image display portion 1000 that emits the linearly polarized light as the image light. Example 3 is an example that uses a rear projection display device as the image display portion 1000 of the display device described in Example 1. The same reference numerals will be given to parts that are the same as those in Example 1, and detailed description will be omitted.

Figure 22:
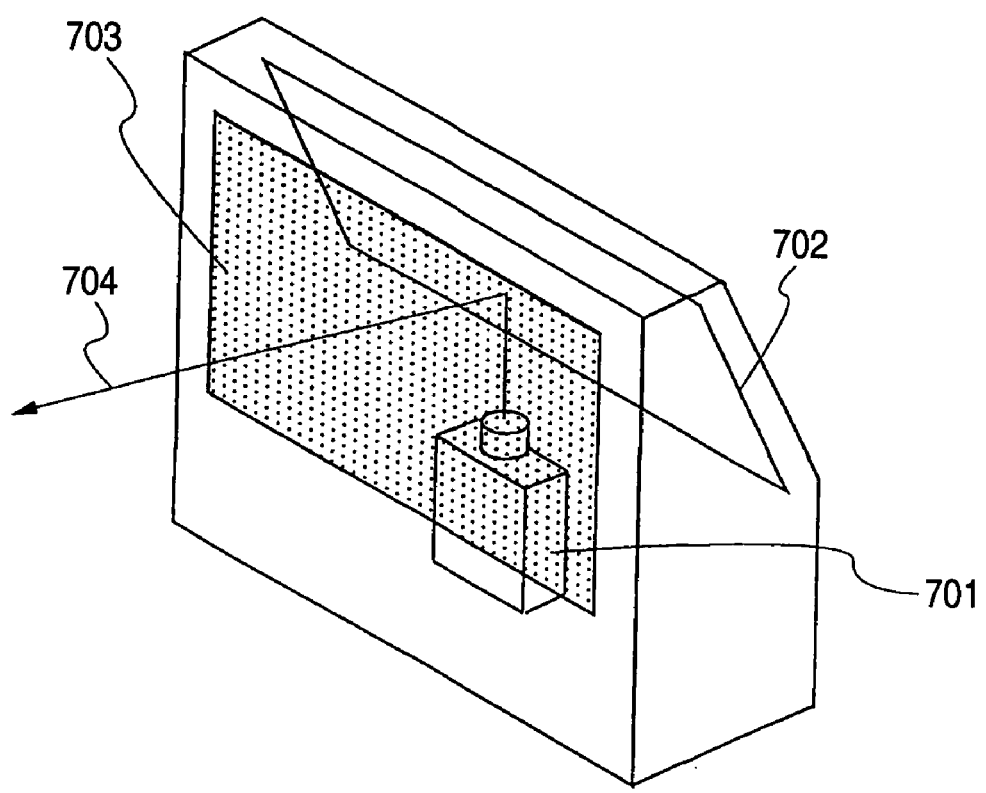
FIG. 22 is an explanatory drawing showing the schematic configuration of a display device of Example 3 of the invention.

As shown in FIG. 22, the display device is configured by a transmissive screen 703, a projection device 701, and a mirror 702, and structured so that projection light 704 emitted from the projection device 701 is irradiated onto the transmissive screen 703 via the mirror 702. The transmissive screen 703 includes the reflective polarization selection member 300, the transmission polarization axis variable portion 400, and the absorbing polarization selection member 500 of Example 1.

A liquid crystal projection device that uses a liquid crystal display panel as the two-dimensional optical switch element can be used for the projection device 701. A device that emits, as projection light, linear polarizations in which the polarization state of each color light matches is used for the projection device 701. Moreover, the image light 704 emitted from the projection device 701 is configured so that it becomes s-polarized light or p-polarized light with respect to the reflection surface of the mirror 702. The reason for this is because, when polarized light other than s-polarized light or p-polarized light is made incident, the polarized state thereof changes because, with respect to the light made incident on the reflection surface, a phase difference is usually generated between the s-polarization component and the p-polarization component with respect to the reflection surface.

A mirror in which a reflective metal such as silver or aluminium is vapor deposited on optically isotropic transparent glass can be used for the mirror 702.

Figure 23:
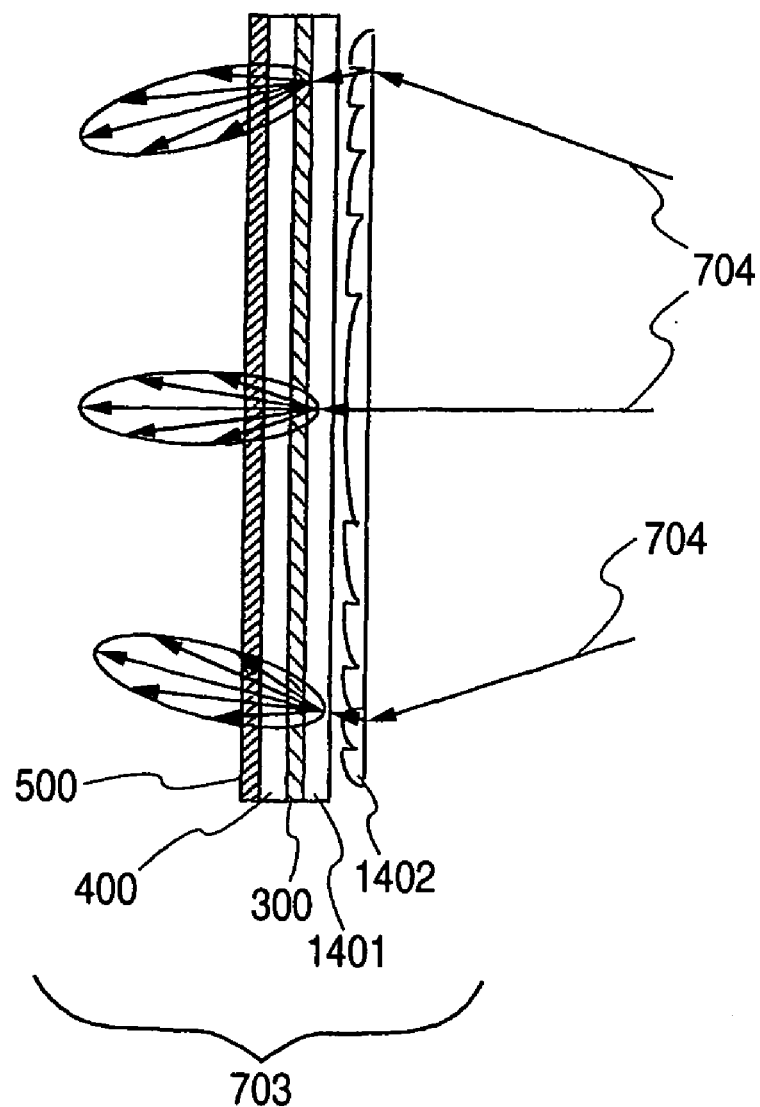
FIG. 23 is a partial cross-sectional view of a transmissive screen of the display device of Example 3 of the invention.

As shown in FIG. 23, the transmissive screen 703 has a configuration in which a Fresnel lens sheet 1402, a lenticular lens sheet 1401, the reflective polarization selection member 300, the transmission polarization axis variable portion 400, and the absorbing polarization selection member 500 are successively disposed. The Fresnel lens sheet 1402 is an optical part that acts in the same manner as a convex lens, and acts to widen the appropriate viewing range by bending the direction of the primary light ray from the projection device 701 to the viewer side. The lenticular lens sheet 1401 acts to effectively distribute a limited projection light beam from the projection device 701 to the viewing range of the viewer. Thus, a bright image is obtained.

Figure 24:
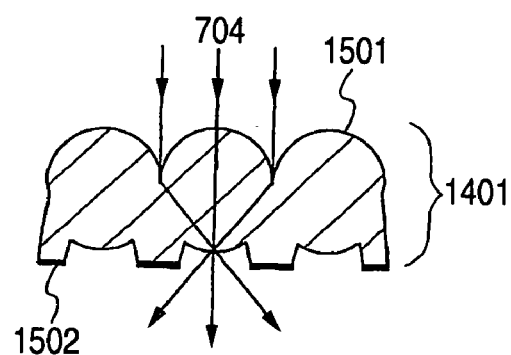
FIG. 24 is a partial cross-sectional view showing an example of a lenticular lens sheet of the display device of Example 3 of the invention.
Figure 25:
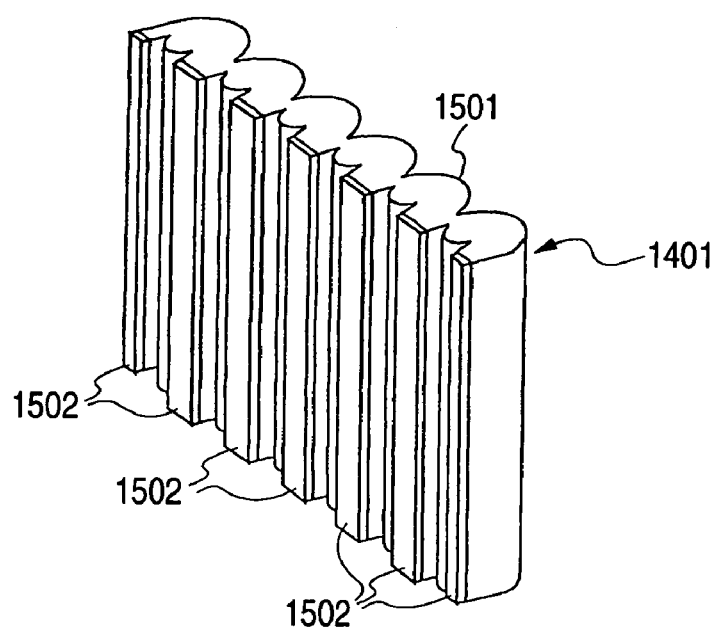
FIG. 25 is a partial perspective view showing an example of the lenticular lens sheet of the display device of Example 3 of the invention.

An example of the lenticular lens sheet 1401 that can be used in the present example will be described in FIGS. 24 and 25. The lenticular lens sheet 1401 has a configuration in which cylindrical lens-like lenses 1501 are plurally arranged in one direction and in which black stripes 1502 are disposed at portions other than portions condensing light, and has a configuration that controls drops in contrast ratio with respect to outside light, ideally without any loss of reflection light, by using a focal point position of the lenses 1501 as a viewing surface. Usually by arranging the lenticular lens sheet so that the bus thereof is in a perpendicular direction with respect to the display surface, a wide viewing angle is obtained in the horizontal direction.

It should be noted that it is preferable to use, together with the Fresnel lens sheet 1402 and the lenticular lens sheet 1401, a member whose birefringence is small, e.g., an injection-molded part using acrylic resin, so that disturbance of the polarization of the projection light 704 from the projection device 701 becomes as small as possible.

As was already mentioned, because the reflective polarization selection member 300 is an important member functioning as the reflection surface of the mirror, it can be made into a configuration adhered, with an adhesive, to a transparent substrate that has rigidity, is flat, and optically isotropic, e.g., an injection-molded acrylic resin plate with a thickness of about 3 mm, so that there is no warping.

The direction of each axis of the reflective polarization selection member 300, the transmission polarization axis variable portion 400, and the absorbing polarization selection member 500 is disposed so that, as mentioned in Example 1, the projection light 704 emitted from the projection device 701 and made incident at the transmissive screen 703 acts as the first linear polarization.

Next, the operation of the display device will be described. Here, a case will be described in which the absorbing polarization selection member 500 absorbs the first linear polarization component and transmits the second linear polarization component.

Because the display device is configured by the same members as in Example 1 other than using the rear projection display device for the image display member, the operation is also the same. Namely, when the display device is in the image display status, the image light 704 emitted from the projection device 701 is reflected by the mirror 702 and is made incident at the transmissive screen 703. The image light 704 made incident at the transmissive screen 703 is transmitted through the reflective polarization selection member 300 while being effectively widened to the viewing range of the viewer by the action of the Fresnel lens 1402 and the lenticular lens 1401, and is made incident at the transmission polarization axis variable portion 400. When the display device is in the image display status, the image light 704 passing through the transmission polarization axis variable portion 400 is changed from the first linearly polarized light to the second linearly polarized light, is transmitted through the absorbing polarization selection member 500, and is viewable to the viewer.

Although outside light proceeding from the viewer side toward the display device is non-polarized light, when the outside light is transmitted through the absorbing polarization selection member 500, the first linear polarization component is absorbed and only the second linear polarization component is transmitted. When the outside light transmitted through the absorbing polarization selection member 500 is transmitted through the transmission polarization axis variable portion 400, it is changed from the second linearly polarized light to the first linearly polarized light, transmitted through the reflective polarization selection member 300, proceeds toward the projection device 701 via the Fresnel lens 1402, the lenticular lens 1401, and the mirror 702, and virtually does not return to the viewer side.

Therefore, in the image display status, a bright image can be obtained because the image light 704 that is emitted from the projection device 701 and passes through the Fresnel lens 1402 and the lenticular lens 1401 proceeds toward the viewer with virtually no loss. Moreover, because the outside light is virtually not reflected in the display device, deterioration of image quality resulting from the outside light, such as glare and a drop in the contrast ratio, does not occur.

When the display device is in the mirror status, the image light 704 emitted from the projection device 701 is made incident at the transmissive screen 703 via the mirror 702. The image light 704 made incident at the transmissive screen 703 is transmitted through the reflective polarization selection member 300 while being effectively widened to the viewing range of the viewer by the action of the Fresnel lens 1402 and the lenticular lens 1401, and is made incident at the transmission polarization axis variable portion 400. When the display device is in the mirror status, because the image light 704 transmitted through the transmission polarization axis variable portion 400 is transmitted as the first linearly polarized light without its polarization axis being changed and is absorbed by the absorbing polarization selection member 500, it is not viewable to the viewer.

Although outside light proceeding from the viewer side toward the display device is non-polarized light, when the outside light is transmitted through the absorbing polarization selection member 500, the first linearly polarized light component is absorbed and only the second linearly polarized light component is transmitted and made incident at the transmission polarization axis variable portion 400. The outside light made incident at the transmission polarization axis variable portion 400 is transmitted as the second linearly polarized light through the transmission polarization axis variable portion 400 without its polarization axis being changed, and reaches the reflective polarization selection member 300. Because the reflective polarization selection member 300 transmits the first linear polarization component and mirror-reflects the second linear polarization component, the outside light is reflected by the reflective polarization selection member 300. The outside light reflected by the reflective polarization selection member 300 is transmitted as the second linearly polarized light through the transmission polarization axis variable portion 400 without its polarization axis being changed, is also transmitted through the polarization selection member 500, and proceeds toward the viewer.

Therefore, in the mirror status, the image light 704 is absorbed by the absorbing polarization selection member 500 and does not reach the viewer, and because ideally only half of the non-polarized light of the outside light made incident at the display device is reflected by the reflective polarization selection member 300 and proceeds toward the viewer side, the outside light functions as a bright mirror.

It should be noted that, when the display device is switched to the mirror status, the image of the projection device 701 is switched to the dark display at the region corresponding to the region serving as the mirror status. In this case, because virtually none of the image light from the projection device 701 leaks, unnecessary light does not proceed to the viewer. Thus, there is the effect that a mirror status in which is obtained a reflection image having a high contrast ratio can be realized.

Also, although a case was described in the above description where the absorbing polarization selection member 500 transmits the second linear polarization component and absorbs the first linear polarization component, a member may also be used in which the absorbing polarization selection member 500 transmits the first linear polarization component and absorbs the second linear polarization component. In this case, it can be made to function as a mirror when the power consumption of the display device is 0.

Figure 26:
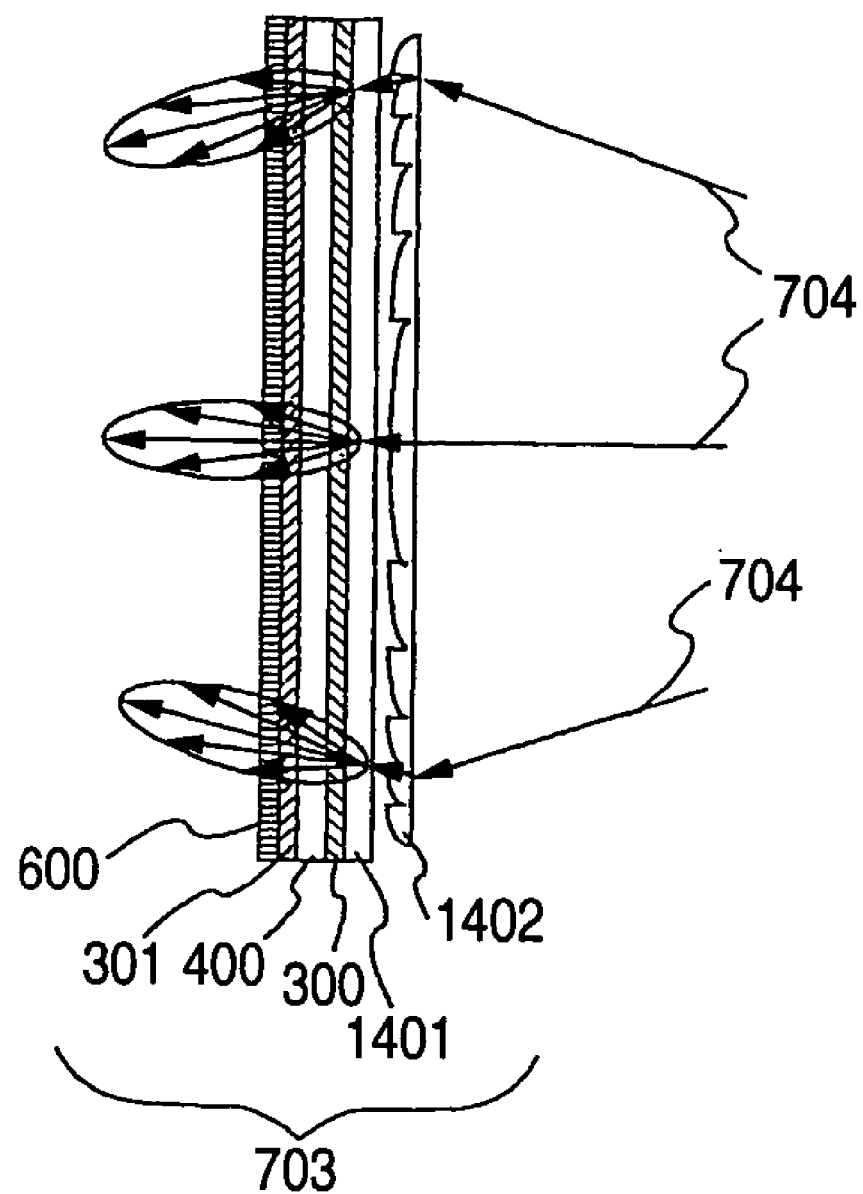
FIG. 26 is a partial cross-sectional view of the transmissive screen pertaining to the display device of Example 3 of the invention.

Also, in the present example, the transmissive screen 703 was configured so that the Fresnel lens sheet 1402, the lenticular lens sheet 1401, the reflective polarization selection member 300, the transmission polarization axis variable portion 400, and the absorbing polarization selection member 500 were successively disposed, as shown in FIG. 23. However, as an alternative to this configuration, the transmissive screen 703 may be configured so that the Fresnel lens sheet 1402, the lenticular lens sheet 1401, the reflective polarization selection member 300, the transmission polarization axis variable portion 400, the reflective polarization selection member 301, and the variable polarization selection member 600 are successively disposed, as shown in FIG. 26. In this case, the rear projection display device is used for the image display portion 1000 of display device described in Example 2, and an operation and action that are the same as those in the description of Example 2 are obtained.

Also, of the mirror function portion (the reflective polarization selection member 300, the transmission polarization axis variable portion 400, the reflective polarization selection member 301, and the variable polarization selection member 600) and the optical system (the Fresnel lens sheet 1402 and the lenticular lens sheet 1401) configuring the transmissive screen 703 of the present example, as a configuration in which the mirror function is detachable from the optical system, the device can be configured so that the mirror function portion is removed when the mirror function is unnecessary. Alternatively, it is also possible to configure a screen disposed independently of the mirror function portion without including the image display portion and fit the mirror function screen as needed to an optional display device.

EXAMPLE 4

A display device of Example 4 of the invention will be described using FIGS. 27 and 28. Example 4 is an example in which conductive metal linear patterns are formed at a pitch of over a thousand angstroms on the transparent substrates 401 and 402 (see FIG. 16) of the display device described in Example 2, and in which these metal linear patterns are also made to employ the functions of the reflective polarization selection member 301 and the transparent electrode 403 and the reflective polarization selection member 300 and the transparent electrode 406. Therefore, the same reference numerals will be given to parts that are the same as those in the above description, and detailed description will be omitted.

In Example 4, an aluminium metal linear pattern is formed at a pitch of over a thousand angstroms on the transparent substrates 401 and 402 of the transmission polarization axis variable portion 400. In this case, with respect to light made incident on the metal linear patterns, because the linear polarization component parallel to the longitudinal direction of the lines of the metal linear pattern is reflected and the linear polarization component of the direction orthogonal thereto is transmitted, the metal linear patterns function as the reflective polarization selection members. Also, because electric potential can be made the same or substantially the same by electrically connecting part of these adjacent linear patterns, the metal linear patterns can also be made to function as transparent electrodes that transmit specific linear polarization components. In other words, the metal linear patterns employ the functions of the reflective polarization selection members and the transparent electrodes. It should be noted that the electrical connection of adjacent linear patterns is conducted at places other than the mirror region, such as the peripheral edge portion or the like, so that the functions of the reflective polarization selection members are not adversely affected.

Figure 27:
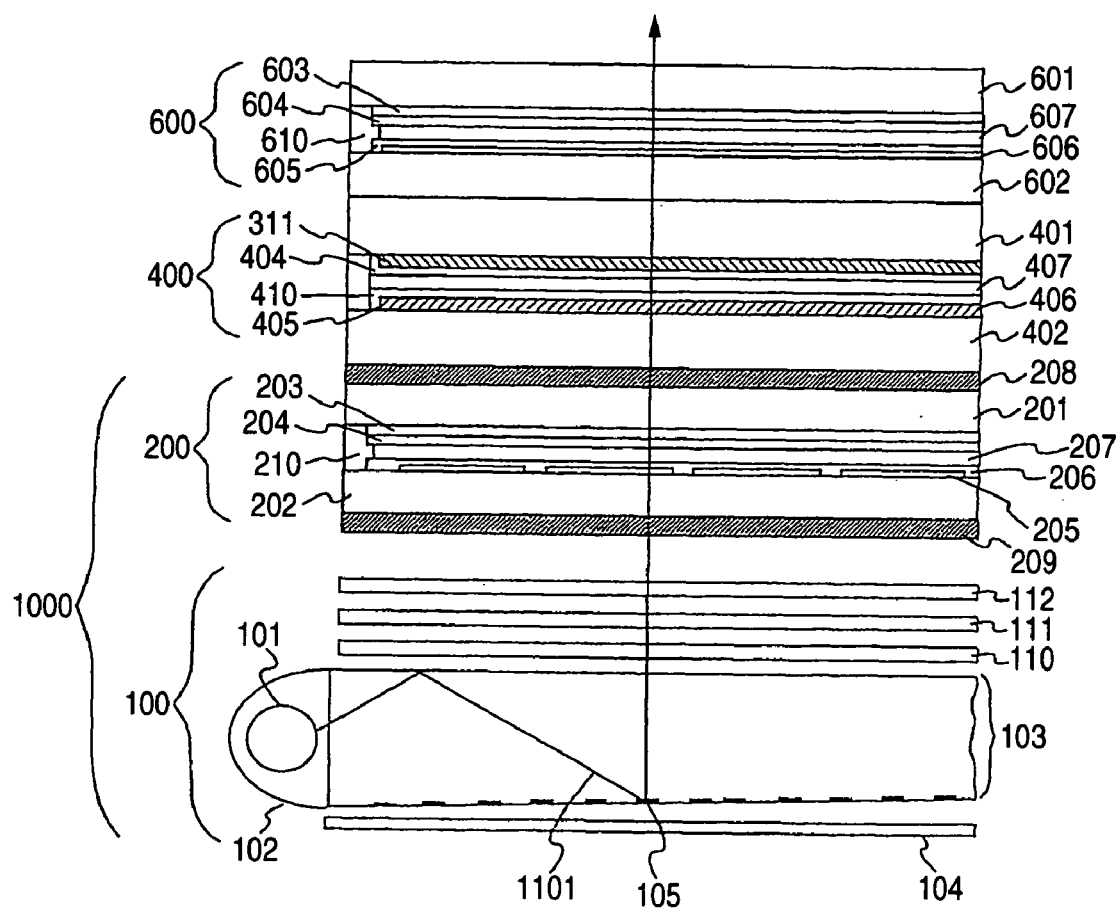
FIG. 27 is a cross-sectional view of respective members configuring a display device of Example 4 of the invention.

Here, as shown in FIG. 27, the transmission polarization axis variable portion 400 includes the first transparent electrode 401, on the entire surface of which are laminated and formed a metal linear pattern 311 and the orientation film 404 comprising a polyimide polymer, the second transparent electrode 402, on the entire surface of which are similarly laminated and formed a metal linear pattern 310 and the orientation film 405, and the liquid crystal layer 407.

The metal linear patterns 311 and 310 respectively formed on the two transparent substrates 401 and 402 are connected to a power source via unillustrated wiring and a switching element, and are configured to be selectable between one of a state in which voltage is not applied to the metal linear patterns 311 and 310 and a state in which voltage is applied. In other words, the metal linear patterns 311 and 310 are configured to be selectable between one of a state in which there is no difference in potential between the metal linear patterns 310 and 310 and an electric field is not applied to the liquid crystal layer 407 and a state in which voltage is applied to the metal linear patterns 311 and 310 and an electric field is applied to the liquid crystal layer 407. Also, the longitudinal directions of the lines of the metal linear patterns 310 and 311 are configured/disposed so that they are mutually orthogonal.

The liquid crystal layer 407 is configured by disposing the two transparent substrates 401 and 402 so that the surfaces on which the orientation films 404 and 410 are formed face each other, disposing a constant gap between the two transparent substrates 401 and 402 by sandwiching unillustrated spacers therebetween, sealing, in a frame shape, the area surrounding this gap with the seal material 410, forming a space, and injecting into this space nematic liquid crystal whose dielectric anisotropy is positive.

Figure 28:
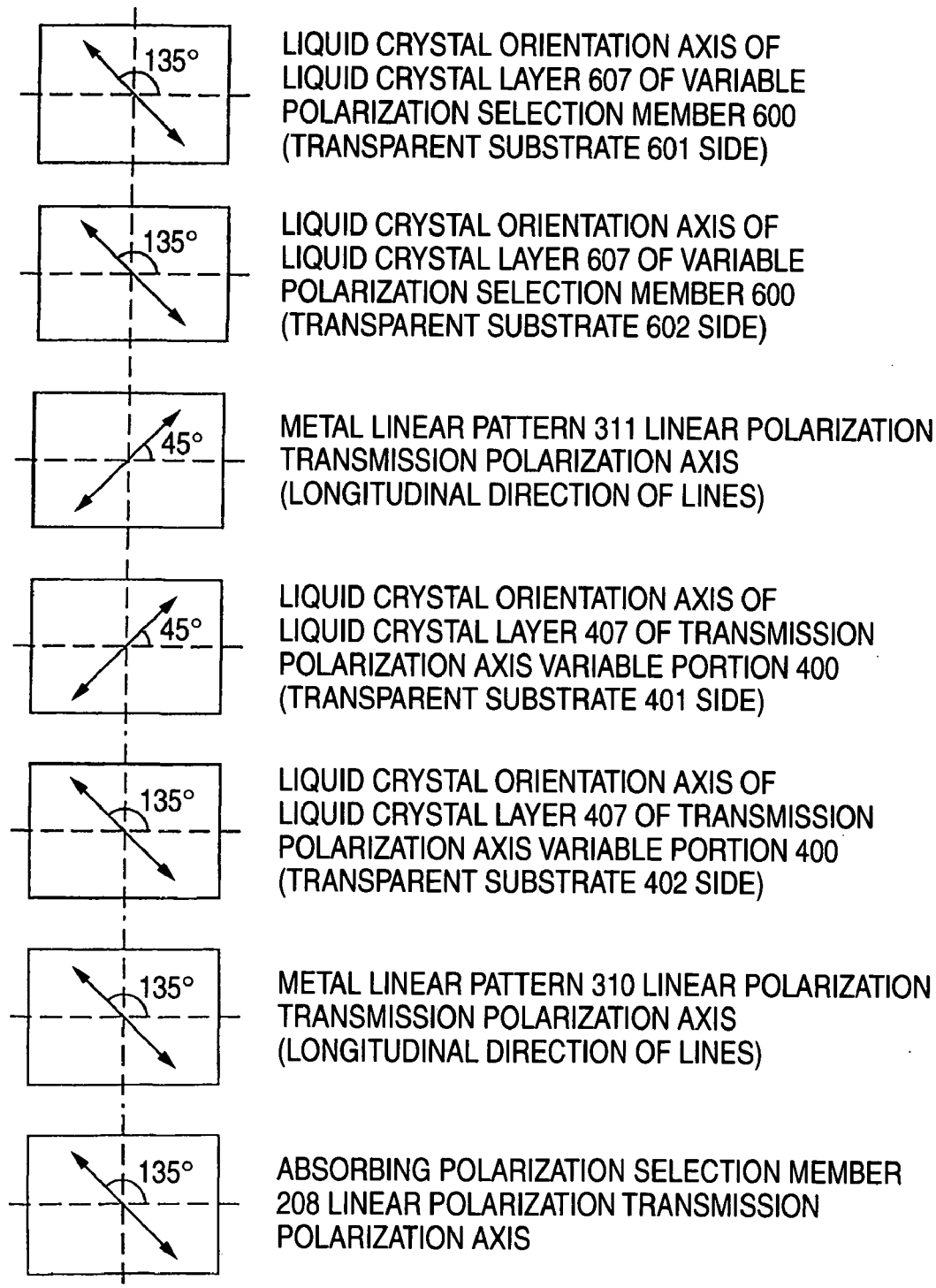
FIG. 28 are explanatory drawings of directions of axes of the respective members configuring the display device of Example 4 of the invention.

FIG. 28 are explanatory diagrams of the directions of the axes of the respective members of the present example. It should be noted that the display of the angle of each axis uses, as a reference, a position at 3 o'clock in a horizontal direction of the image display surface, and is represented by an angle counterclockwise from here. As shown in FIG. 28, the transmission polarization axis of the linearly polarized light of the absorbing polarization selection member (polarizing plate) 208 of the TN liquid crystal display panel 200 configuring the image display portion 1000 is 135°. Therefore, the transmission polarization axis of the linear polarization of the metal linear pattern 310 functioning as the reflective polarization selection member is similarly 135°, the orientation directions of the liquid crystal molecule long axes of the transparent substrate 401 and the transparent substrate 402 of the transmission polarization axis variable portion 400 are 135° and 45°, respectively, the transmission polarization axis of the linear polarization of the metal linear pattern 311 functioning as the reflective polarization selection member is 45°, and the orientation directions of the liquid crystal molecule long axes of the transparent substrate 601 and the transparent substrate 602 of the variable polarization selection member 600 are both 135°.

According to the above-described configuration, in the display device of Example 4, because the metal linear pattern 310 fulfills the functions of the reflective polarization selection member 300 and the electrode 406 of Example 2 and the metal linear pattern 311 fulfills the functions of the reflective polarization selection member 301 and the electrode 403 of Example 2, the display device of Example 4 operates in the same manner as the display device of Example 2 and the same effects are obtained.

It should be noted that, as mentioned in Example 2, the reflective polarization selection members 300 and 301 are members that function as reflection surfaces when the display device is switched to the mirror status. For this reason, it is necessary to make the gap between the two as small as possible because parallax arises in the images respectively reflected by the reflective polarization selection member 300 and the reflective polarization selection member 301 when the gap between the reflective polarization selection member 300 and the reflective polarization selection member 301 increases, and it is practically preferable for the interval to be 0.11 mm or less. In Example 4, because there are only the liquid crystal layer 407 of about several µm and the thin films such as the orientation films 404 and 410 that are less than 1 µm between the metal linear pattern 310 that functions as the reflective polarization selection member 300 and the metal linear pattern 311 that functions as the reflective polarization selection member 301, the gap between the two is less than 10 µm. For this reason, the effect that a high-definition mirror that is bright and has no parallax can be realized is obtained.

Also, because the metal linear patterns 310 and 311 are formed on a flat substrate such as glass, there is also the effect that a mirror that is resistant to environmental changes, such as changes in temperature and humidity, and in which it is difficult for distortion resulting from environmental changes to arise can be realized.

Also, in the present invention, it suffices as long as the metal linear patterns 310 and 311 are patterns with which an even reflection can be obtained within the visible light range, and the specific structure, pitch, pattern height, etc. of the linear patterns are not particularly limited. Also, a metal linear pattern formed by chrome or silver, other than the aluminium, may also be used.

EXAMPLE 5

In Examples 1 to 4, cases were described in which a mirror function portion comprising the reflective polarization selection member 300, the transmission polarization axis variable portion 400, and the polarization selection member 500, or the mirror function portion comprising the reflective polarization selection member 300, the transmission polarization axis variable portion 400, the reflective polarization selection member 301, and the variable polarization selection member 600, was disposed on the upper portion of the image display portion 1000 emitting the first linear polarization as the image light. In these cases, the image display portion 1000 is capable of image display even if the mirror function portion is not disposed, and depending on the intended use of the instrument, the mirror function portion is made detachable so that the mirror function portion is removed when the mirror function portion is unnecessary, whereby convenience can be improved.

However, the present invention is not limited to these cases. In other words, the invention may have a configuration in which image display is possible when there is the mirror function portion, or a configuration in which a partial configuration of the mirror function portion and the image display member is shared.

Figure 29:
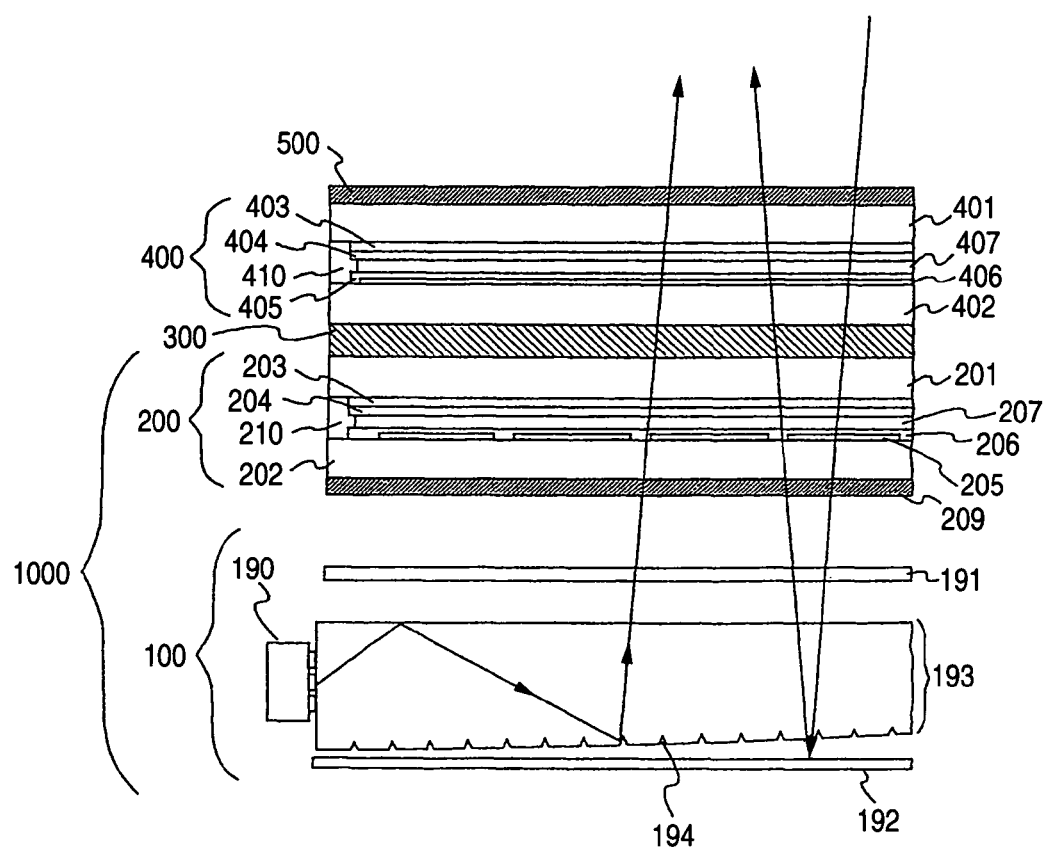
FIG. 29 is a cross-sectional view of respective members configuring a display device of Example 5 of the invention.

A display device of Example 5 will be described using FIG. 29. Because there are many portions in Example 5 that are common to those of Example 1 (e.g., see FIG. 8), the same reference numerals will be given to members that are the same as those in Example 1 and detailed description will be omitted.

The present display device is one in which, in the display device described in Example 1, a lighting system that can irradiate, time divisionally, the three primary colors of red, green, and blue is used as the lighting system 100 and the absorbing polarization selection member (polarizing plate) 208 of the viewer side is removed from the image display portion 1000. Therefore, when the mirror function portion comprising the reflective polarization selection member 300, the transmission polarization axis variable portion 400, and the absorbing polarization selection member 500 is removed, the liquid crystal display panel 200 of the present example cannot display a clear image.

The liquid crystal display panel 200 of the present example is one in which, in the liquid crystal display panel 200 of Example 1, the absorbing polarization selection member (polarizing plate) 208 is removed, the color filter is eliminated, and in which it is possible to increase the speed of the response of the liquid crystal so that it is able to correspond to a field-sequential color display system.

Technical details of field-sequential color display systems are described in, for example, JP-A-5-19257 and JP-A-11-52354. The present system is one that irradiates illumination light of the three primary colors onto the liquid crystal display panel at the time sharing and realizes display of a color image by driving the liquid crystal synchronously therewith. That is, in the liquid crystal display panel, because it is necessary to successively display three subframes corresponding to the three primary colors in order to conduct display of one frame, it is necessary for the liquid crystal to respond at a higher speed. In order to quicken the response of the liquid crystal so that it can correspond to a field-sequential color display system, e.g., when a TN mode is used, liquid crystal having a large birefringence Δn is used in order to satisfy the conditions of the above-described waveguide and the thickness of the liquid crystal layer 207 is thinly configured to about 2 μm.

It should be noted that, although the case of the TN mode will be described below in the present example, the liquid crystal display panel of the present invention is not limited to the above-described configuration as long as it has a configuration in which response characteristics corresponding to a field-sequential color display system are obtained.

The lighting system 100 is configured by a waveguide 193 comprising a transparent medium, a light source 190 that emits the three primary colors of red, green, and blue and is disposed at an end surface of the waveguide 193, a polarization maintenance reflection sheet 192 disposed at an underside of the waveguide 193, and a polarization maintenance diffusion portion 191 disposed at the front side of the waveguide 193.

An LED (Light Emitting Diode) in which three chips are integrated that emit respective color lights of the three primary colors can be used as the light source 190 emitting light of the three primary colors of red, green, and blue. Such an LED is sold by Nichia Corporation.

The waveguide 193 is configured by a transparent acrylic resin, has a configuration that traps thereinside light made incident from the end surface by total reflection, and is disposed at the underside (side opposite from the liquid crystal display panel 200) with an inclined reflection surface 194 that is configured by plural steps or uneven surfaces including minute inclined surfaces that radiate light toward the liquid-crystal display panel 200 by changing the reflection angle of the light propagated through the inside. This is for maintaining the polarized state of the light made incident at the waveguide 193 from the liquid crystal display panel 200 for a reason described later.

Although it is preferable for the inclined reflection surface 194 to be a metal thin film of aluminium, silver or the like or a mirror reflection surface by a derivative multilayer film, it is not limited to these, and is a surface in which a necessary reflective function is satisfied by a difference in birefringence between the air and the acrylic resin even if such a special reflective member is not added.

Here, the average pitch of the inclined reflection surface 194 is 200 μm, the average height is 10 μm, and the average angle of inclination is 41°. It should be noted that the evenness of the light emitted from the waveguide 193 may be raised by continuously changing the height of the inclined reflection surface 194 so that it is low near the light source 190 and high at a place distant from the light source 190, or by continuously changing the pitch or angle of inclination of the inclined reflection surface 194 by the distance from the light source 190, or by thinning the thickness of the waveguide 193 as it is becomes distanced from the light source 190.

It should be noted that the shape of the waveguide 193 is not limited to the present shape as long as it substantially maintains the polarization state of the light made incident at the waveguide 193 from the liquid crystal display panel 200 side.

The polarization maintenance reflection sheet 192 is a sheet in which a reflection surface that maintains the polarization state is formed on a substrate material such as a glass plate, a resin plate, or a resin film, and includes the function of again reflecting light that has returned from the liquid crystal display panel 200 side to the lighting system 100 toward the liquid crystal display panel 200 side while maintaining the polarization state thereof. The reflection surface maintaining the polarization state described here is a reflection surface that reflects linearly polarized light as the same linearly polarized light and reflects a circular polarization as a circular polarization in which the rotation direction thereof is reversed, with respect to at least perpendicularly incident light. Specifically, a surface in which a metal thin film of Al or Ag is adhered to a substrate material, or a mirror reflection surface resulting from a derivative multilayer film configured so that a high reflectance is obtained with respect to the waveband of the light source light, is used as the reflection surface.

The polarization maintenance diffusion portion 191 is for making even the in-plane luminance distribution and emission angle distribution of the light emitted from the waveguide 193, and for substantially maintaining the polarization state of the light passing therethrough. A member in which plural spherical transparent beads are closely lined up in a sheet and fixed with a transparent resin to an optically isotropic substrate material, a hologram diffusion plate formed on an optically isotropic transparent substrate material, or the LCG (light control glass) described in *SPIE*, Vol. 1536, Optical Materials Technology for Energy Efficiency and Solar Energy Conversion X (1991), pp. 138-148, can be used as the polarization maintenance diffusion portion 191.

Figure 30:
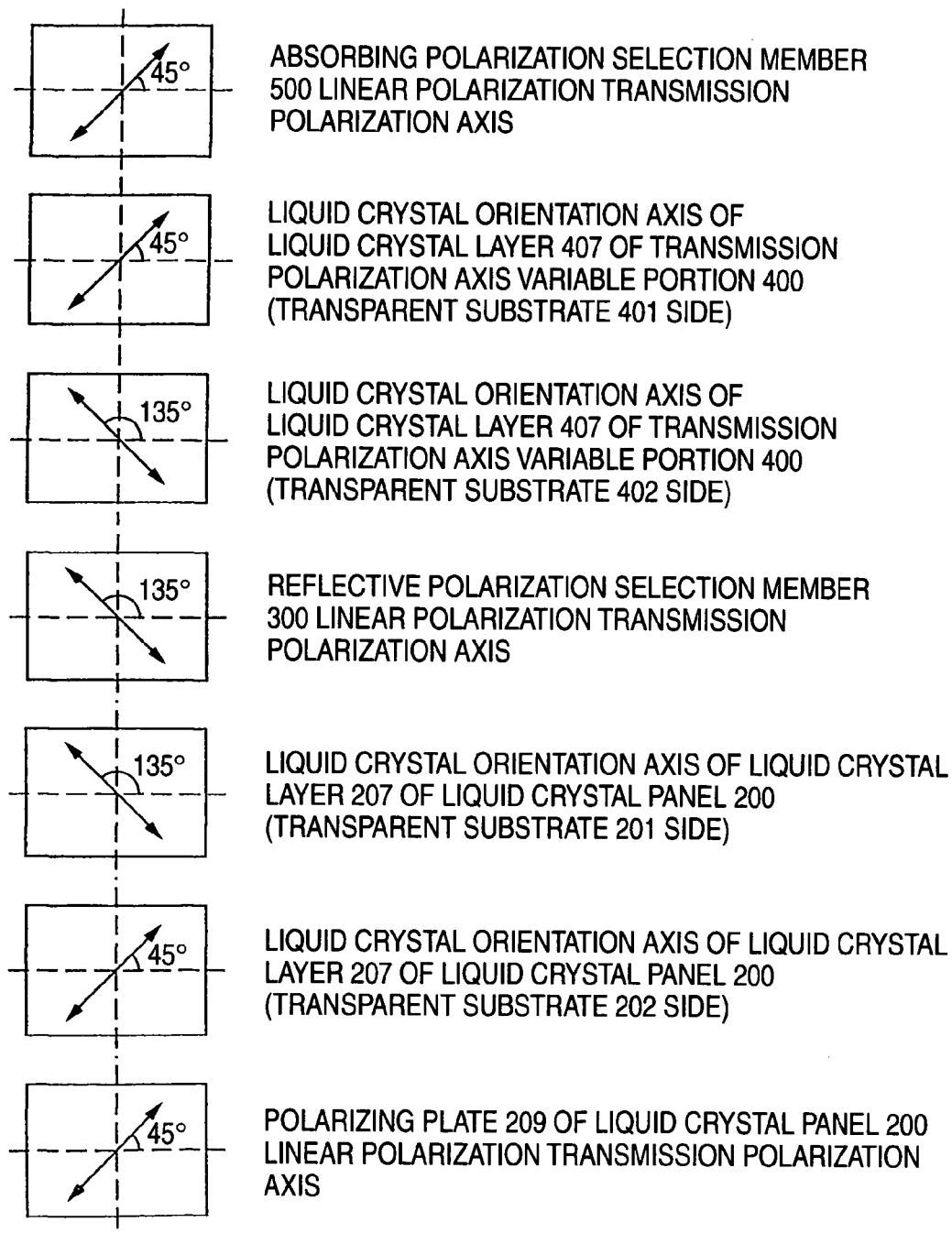
FIG. 30 are explanatory drawings of directions of axes of the respective members configuring the display device of Example 5 of the invention.

FIG. 30 are explanatory diagrams of the directions of the axes of the respective members of the present example. As is illustrated, when a TN liquid crystal display panel is used as the liquid crystal display panel 200, the transmission polarization axis of the linear polarization of the polarizing plate 209 is ordinarily 45° or 135° (in the present example, 45°) in order to obtain horizontal direction symmetry of viewing angle characteristics. The liquid crystal orientation axis of the transparent substrate 202 and the liquid crystal orientation axis of the transparent substrate 201 are 45° and 135°, respectively, the transmission polarization axis of the linear polarization of the reflective polarization selection member 300 is 135°, the orientation directions of the liquid crystal molecule long axes of the transparent substrate 401 and the transparent substrate 402 of the transmission polarization axis variable portion 400 are 135° and 45°, respectively, and the transmission polarization axis of the linear polarization of the absorbing polarization selection member 500 is 45°.

Next, the operation of the present example will be described. The light emitted from the light source 190 is made incident at the waveguide 193 and is propagated through the waveguide 193 while repeating total reflection. Of the light propagated through the waveguide 193, the traveling direction of the light reaching the inclined reflection surface 194 is changed and the light is emitted from the surface side of the waveguide 193. After the emission angle distribution and in-plane luminance distribution of the light emitted from the waveguide 193 have been made even by the polarization maintenance diffusion portion, the light is irradiated onto the liquid crystal display element 200.

Of the light irradiated on the liquid crystal display panel 200, the linearly polarized light transmitted through the polarizing plate 209 passes through the liquid crystal layer 207 and is made incident at the reflective polarization selection member 300, but the polarization state of the light transmitted through the liquid crystal layer 208 can be changed by the voltage applied to the liquid crystal layer 207. For this reason, voltage corresponding to the image information transmitted from the image information generating portion is applied to the transparent electrodes 203 and 205 on the transparent substrates 202 and 201 and an electric field is applied to the liquid crystal layer 207, whereby the polarization state of the light passing through the liquid crystal layer 207 is changed and the light amount transmitted through the reflective polarization selection member 300 is controlled, whereby an optical image comprising the linearly polarized light can be formed. That is, the reflective polarization selection member 300 of the present example employs the function of the absorbing polarization selection member (polarizing plate) 208 disposed at the viewer side of the liquid crystal display panel 200 in Example 1.

The image light transmitted through the reflective polarization selection member 300 is made incident at the transmission polarization axis variable portion 400. When the display device is in the image display status, the transmission polarization axis variable portion 400 is in a state in which voltage is not applied to the liquid crystal layer 407 configuring this, i.e., an OFF state.

Here, when the linear polarization component transmitted through the reflective polarization selection member 300 is the first linear polarization component and the linear polarization component whose polarization axis is orthogonal thereto is the second linear polarization component, the image light passing through the transmission polarization axis variable portion 400 is changed from the first linearly polarized light to the second linearly polarized light. The image light transmitted through the transmission polarization axis variable portion 400 is made incident at the absorbing polarization selection member 500. Because the absorbing polarization selection member 500 absorbs the first linear polarization component and transmits the second linear polarization component, the image light 3001 that is changed to the second linearly polarized light by the transmission polarization axis variable portion 400 is transmitted through the absorbing polarization selection member 500 and is viewable to the viewer.

When the display device is in the mirror status, the transmission polarization axis variable portion 400 applies an electric field to the liquid crystal layer 407 configuring this and is switched to an ON state. Because there is no absorbing polarization selection member (polarizing plate) 208 disposed as the absorbing polarization selection member in the above example in the display device in this case, the image light leaks to the viewer side when the lighting system 100 is turned on, whereby the contrast ratio of the reflection image drops and an easy-to-view mirror cannot be realized. Therefore, the lighting system 100 is turned on in the mirror status. In the case of the present example, because it can be turned on and off at a high speed by disposing the LED as the light source 190 of the lighting system 100, the mirror status and the image display status are switchable at a high speed to the extent that it does not cause the viewer to feel stress.

When the outside light proceeding from the viewer side to the display device is transmitted through the absorbing polarization selection member 500, the first linear polarization component is absorbed and only the second linear polarization component is transmitted and made incident at the transmission polarization axis variable portion 400. The outside light made incident at the transmission polarization axis variable portion 400 is transmitted through the transmission polarization axis variable portion 400 as the second linear polarization without its polarization axis being changed and reaches the reflective polarization selection member 300. Because the reflective polarization selection member 300 transmits the first linear polarization component and mirror-reflects the second linear polarization component, the outside light 3002 is reflected by the reflective polarization selection member 300. The outside light 3002 reflected by the reflective polarization selection member 300 is transmitted through the transmission polarization axis variable portion 400 as the second linear polarization without its polarization axis being changed, is further transmitted through the absorbing polarization selection member 500, and proceeds toward the viewer.

Therefore, in the display device of the present example, because the lighting system is turned off in the mirror status, the image light does not reach the viewer, and because ideally half of the non-polarized light of the outside light is reflected by the reflective polarization selection member 300 and proceeds toward the viewer side, the light functions as a bright mirror.

In addition, there are the following unique effects in the present example.

Figure 31:
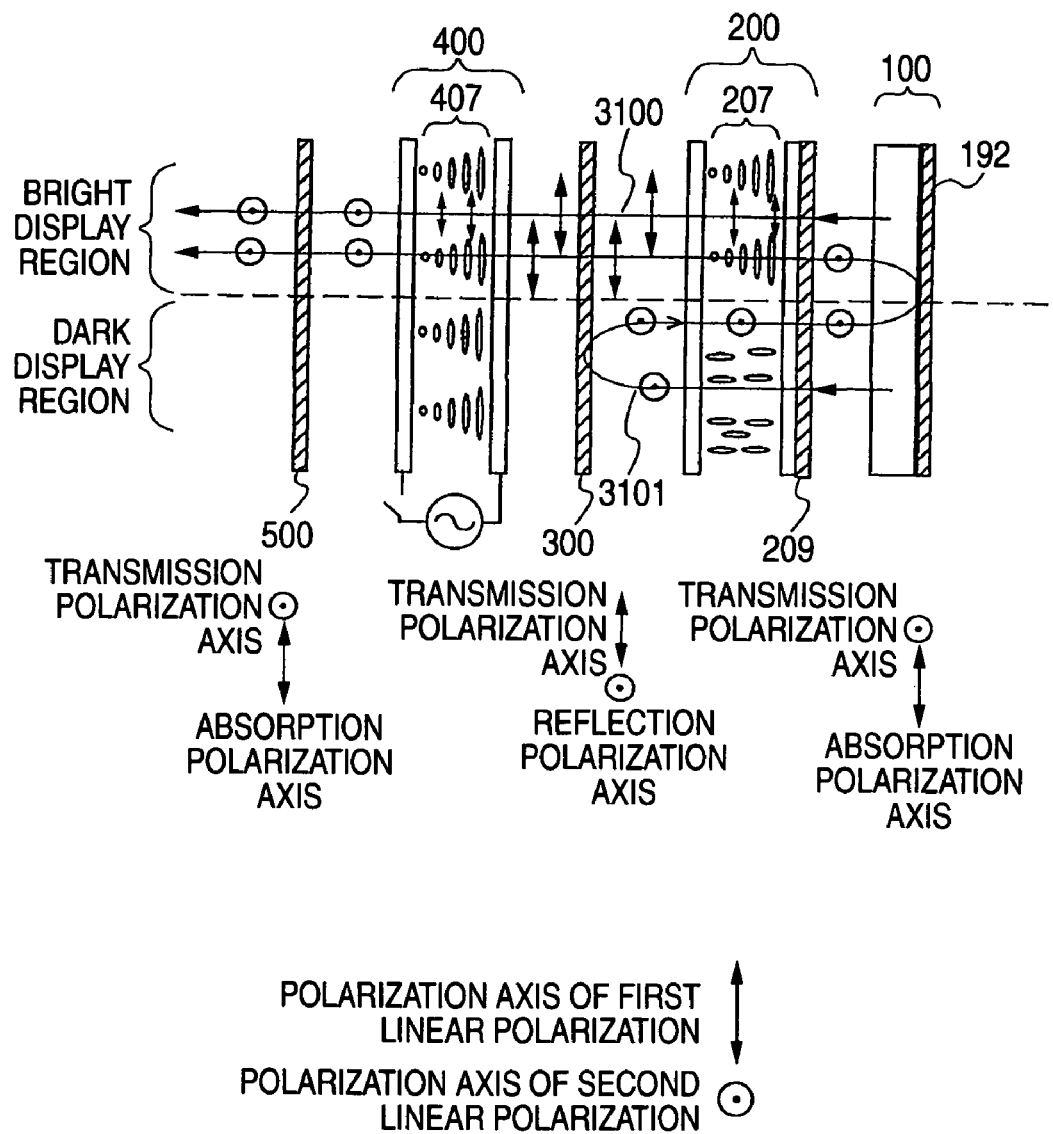
FIG. 31 is an explanatory drawing for explaining the operation of the display device of Example 5 of the invention.

FIG. 31 is a diagram for describing the unique effects of the present example. Here, when the linear polarization component transmitted through the reflective polarization selection member 300 is the first linear polarization component and the linear polarization component whose polarization axis is orthogonal thereto is the second linear polarization component, the polarizing plate 209 transmits the second linear polarization component.

In the display device, as described above, of the light irradiated on the liquid crystal display panel 200 from the lighting system 100, the second linearly polarized light (direction perpendicular to the page in the drawing) transmitted through the polarizing plate 209 passes through the liquid crystal layer 207 and is made incident at the reflective polarization selection member 300. At this time, the polarization state of the light transmitted through the liquid crystal layer 207 is modulated in correspondence to the image information, and the light 3100 passing through the bright display region is changed from the second linearly polarized light to the first linearly polarized light, transmitted through the reflective polarization selection member 300, and proceeds toward the viewer.

Because the light 3101 passing through the dark display region is made incident at the reflective polarization selection member 300 as the second linearly polarized light, it is reflected by the reflective polarization selection member 300 and does not reach the viewer. The light 3101 reflected by the reflective polarization selection member 300 is again transmitted through the liquid crystal layer 207 and the polarizing plate 209 as the second linearly polarized light and returns to the lighting system 100. At this time, the polarization maintenance diffusion portion, the waveguide, and the polarization maintenance reflection sheet 192 configuring the lighting system 100 substantially maintain, transmit, or reflect the polarization state of the light returning from the liquid crystal display element 200 side. For this reason, because the light 3101 reflected by the lighting system 100 and proceeding to the liquid crystal display panel 200 generally becomes the second linearly polarized light, it is made incident at the liquid crystal layer 207 virtually with out being absorbed by the polarizing plate 209. Of the light 3101 made incident at the liquid crystal layer 207, the light made incident at the bright display region is changed from the second linearly polarized light to the first linearly polarized light transmitted through the reflective polarization selection member 300, proceeds toward the viewer side, and can be effectively utilized as the image light.

In other words, because the light made incident at the dark display region is initially reflected by the reflective polarization selection member 300, it does not become image light. However, the light reflected by the reflective polarization selection member 300 proceeds to the lighting system 100, is reflected in the lighting system 100 in a state in which its polarization state is substantially maintained, and again proceeds to the liquid crystal display panel 200. For this reason, reuse of light is conducted in a state in which there is not large loss, and the brightness of the bright display region is improved.

Also, although light transmittance of a color filter is usually about 25%, which is low, because a color filter is not used in the present example, reuse of light is conducted more efficiently.

Here, in liquid crystal display panels, there is usually no difference in the luminance of the white display between a case where the entire screen is switched to a white display and a case where a portion is switched to a white display. With a CRT (Cathode Ray Tube), it is said that the white display can be brightened by about four times in a case where a 15% portion of the screen is switched to a white display with respect to a case where the entire screen is switched to a white display. When a high luminance image is partially displayed with, for example, sunlight, this appears as a difference in image quality in which a more vivid image is obtained with a CRT than a liquid crystal display panel.

In the display device of the present example, because the brightness of the bright display region can be improved by reusing the light made incident at the dark display region, the white display can be brightened in a case where a portion is switched to a white display in comparison with a case where the entire screen is switched to a white display. Therefore, a vivid image that is close to that of a CRT is obtained.

Moreover, the following effects are obtained when the display device is used as a display portion in a portable instrument such as a mobile telephone. Although the display device functions as a color display device resulting from a field-sequential color display system when the lighting system is turned on, it can be made to function as a reflective liquid crystal display panel of a bright monochrome display because there is no color filter when the lighting system is turned off. Here, in the case of the color display, although it is necessary to display at least three subframes of red, green, and blue in order to conduct display of one frame, in the case of the monochrome display, the drive frequency can be made $1/3$ or lower because it is not necessary to dispose a subframe. Because the drive frequency can be lowered to $1/3$ or lower and the power consumption can be largely reduced, the power consumption of the monochrome display state can be largely reduced when a drive frequency switch portion is disposed and the drive frequency is switched between the color display state and the monochrome display state.

In other words, when the display device is used as a display portion in a portable instrument, the lighting system is turned on when the device is in a use state and the device is switched to the color display state, whereby a vivid, bright, high-definition image is obtained, and, when the device is standing by, the lighting system is turned off, the drive frequency is lowered, and the device is switched to the monochrome display state, whereby power consumption can be greatly lowered. For this reason, use time resulting from a battery in the portable instrument can be lengthened by lengthening the standby time of, for example, a mobile telephone.

Moreover, these effects are established as described above because it is possible to switch between the image display status and the mirror status without their mutual performance being deteriorated. Also, in the present example, the metal linear patterns are formed on the transparent substrates at the viewer side of the liquid crystal display panel and parts of the respective patterns are electrically connected, whereby metal linear patterns may be made to employ the functions of the transparent electrodes and the reflective polarization selection member.

EXAMPLE 6

Another example of the invention will be described below on the basis of the drawings.

Figure 32:
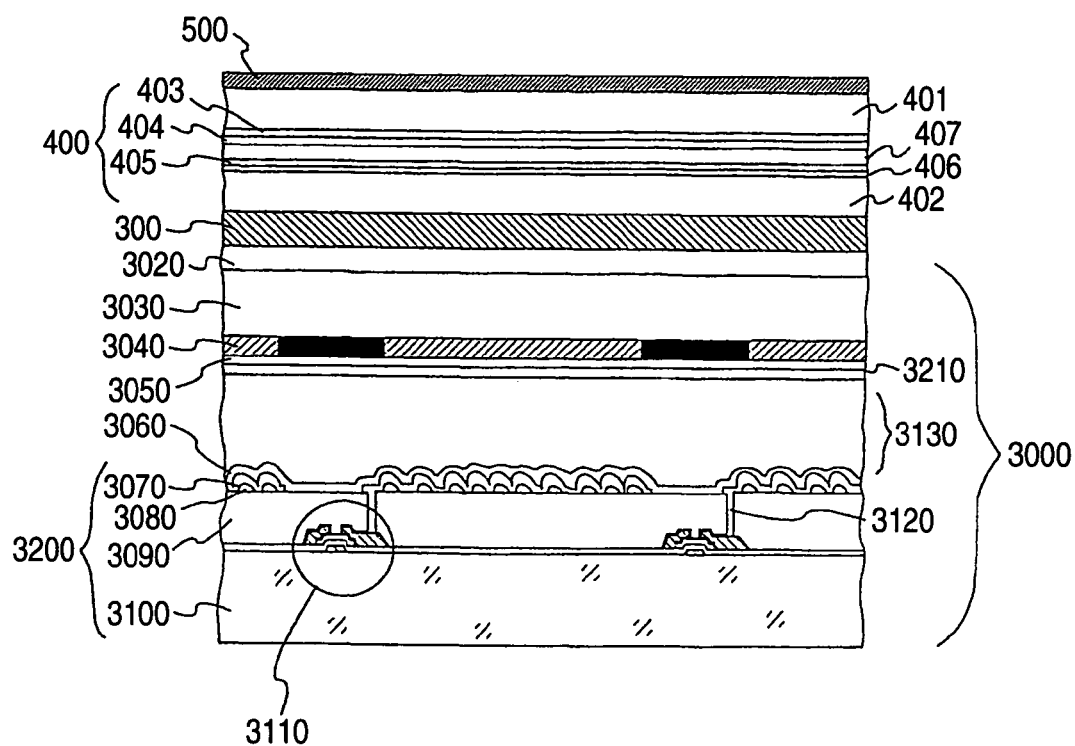
FIG. 32 is a cross-sectional view of respective members configuring a display device of Example 6 of the invention.

A display device disposed with a function for switching to a mirror status of Example 6 of the invention will be described using FIG. 32. The display device is one in which a reflective liquid crystal panel 3000 is used as the image display portion 1000 in Example 1. The same reference numerals will be given to members that are the same those of the above-described examples and detailed description will be omitted.

The display device of Example 6 includes the reflective liquid crystal element 3000, and the reflective liquid crystal element includes a transparent substrate 3030, a reflective substrate 3100 disposed with a reflective portion, and a liquid crystal layer 3130 that is sealed in a space formed by adhering these two substrates via spacers such as beads and sealing the substrates with a frame-like seal member. Also, a phase-difference plate 3020, the reflective polarization selection member 300, the transmission polarization axis variable portion 400, and the absorbing polarization selection member 500 are superposed and disposed on the transparent substrate 3030.

A flat insulating substrate such as glass or a polymer film is used as the reflective substrate 3100, and a 0.7 mm-thick glass substrate is used here. A switching element 3110 comprising a scanning electrode, a signal electrode, and, for example, a TFT (Thin Film Transistor) disposed at the intersection of these, an insulating film 3090 formed on an upper portion of these, and a pixel electrode 3070 that is formed on the insulating layer and is segmented in a matrix electrically connected to the switching element via a through hole 3120 opening to the insulating layer 3090 are disposed on the reflective substrate 3100.

The pixel electrode 3070 comprises a metal with a high reflectance, such as aluminium or silver, and functions as a diffuse reflecting reflective portion due to minute recess portion or projecting portion shapes formed on the insulating layer 3090. An orientation film 3060 comprising a polyimide polymer is formed on the entire surface of the upper layer of the pixel electrode 3070, and a surface treatment is administered to the surface thereof by rubbing.

An optically isotropic, flat, transparent insulating substrate such as glass or a polymer film can be used as the transparent substrate 3030, and a 0.7 mm-thick glass substrate is used here. A color filter 3040 is formed at a position on the transparent electrode 3030 corresponding to the pixel electrode 3070 of the reflective substrate 3100. The color filter 3040 is one in which three types of color filters including transmission spectrums respectively corresponding to the three primary colors of red, green, and blue are alternatingly repeated and disposed at a position corresponding to the pixel electrode 3070.

Also, a black matrix may be formed at positions corresponding to the spaces between the pixels of the color filter 3040 to suppress light leaking from the spaces between the pixels. A transparent electrode 3050 comprising ITO is formed on the entire surface of the upper layer of the color filter 3040 via an unillustrated overcoat layer, an orientation film 3210 comprising a polyimide polymer is formed on the entire surface of the upper layer of the transparent electrode 3050, and a surface treatment is administered to the surface thereof by rubbing.

The transparent substrate 3030 and the reflective substrate 3100 are adhered together so that the sides on which the transparent electrode 3050 and the reflective electrode 3070 are formed face each other. At this time, bead spacers are dispersed between the substrates and the area surrounding the portion corresponding to the display surface of both substrates is sealed with a frame-like seal member, whereby a space including a constant gap is formed.

The liquid crystal layer 3130 is configured by injecting and sealing, in the gap between the substrates 3030 and 3100, a liquid crystal composition in which a small amount (0.1 to 0.2%) of a chiral agent is added to nematic liquid crystal whose anisotropy is positive. The Δnd of the liquid crystal layer 3130 is 0.365 μm. The orientation direction of the liquid crystal molecule long axes of the liquid crystal layer 3130 is defined by the surface treatment (orientation treatment) administered to the orientation film 3210 and the orientation film 3060 formed on the transparent substrate 3030 and the reflective substrate 3100, and is continually twisted only by a predetermined angle between the two substrates.

The phase-difference plate 3020 is laminated on the transparent substrate 3030. A uniaxially stretched polymer film, such as polycarbonate, polysulfone, or polyvinyl alcohol, can be used as the phase-difference plate 3020. Here, a phase-difference plate comprising polycarbonate whose Δnd is 0.18 μm is used as the phase-difference plate 3020.

The transparent substrate 3030, the phase-difference plate 3020, the reflective polarization selection member 300, the transmission polarization axis variable portion 400, and the absorbing polarization selection member 500 are respectively adhered with an acrylic adhesive so as to be optically bonded.

FIG. 33 are diagrams showing the directions of the axes of the respective members of the display device when seen from the viewer side. The angle of each axis uses, as a reference, a position at 3 o'clock in a horizontal direction of the image display surface, and is represented by an angle counterclockwise from here. As shown in FIG. 33, in the display device, the liquid crystal orientation axis of the reflective substrate 3100 is 295°, the azimuth of the liquid crystal orientation axis at a side of transparent substrate 3030 is 65°, the lag axis of the phase-difference plate 3020 is 135°, the transmission polarization axis of the linear polarization of the reflective polarization selection member 300 is 30°, the liquid crystal orientation axis of the transparent substrate 402 is 30°, the liquid crystal orientation axis of the transparent substrate 401 is 120°, and the transmission polarization axis of the linear polarization of the absorbing polarization selection member 500 is 120°.

Next, the operation of the display device will be described using the drawings. It should be noted that, in the present example, similar to Example 1, the linear polarization component transmitted through the reflective polarization select ion member 300 is the first linear polarization component and the linear polarization component whose polarization axis is orthogonal thereto is the second linear polarization component.

Figure 34:
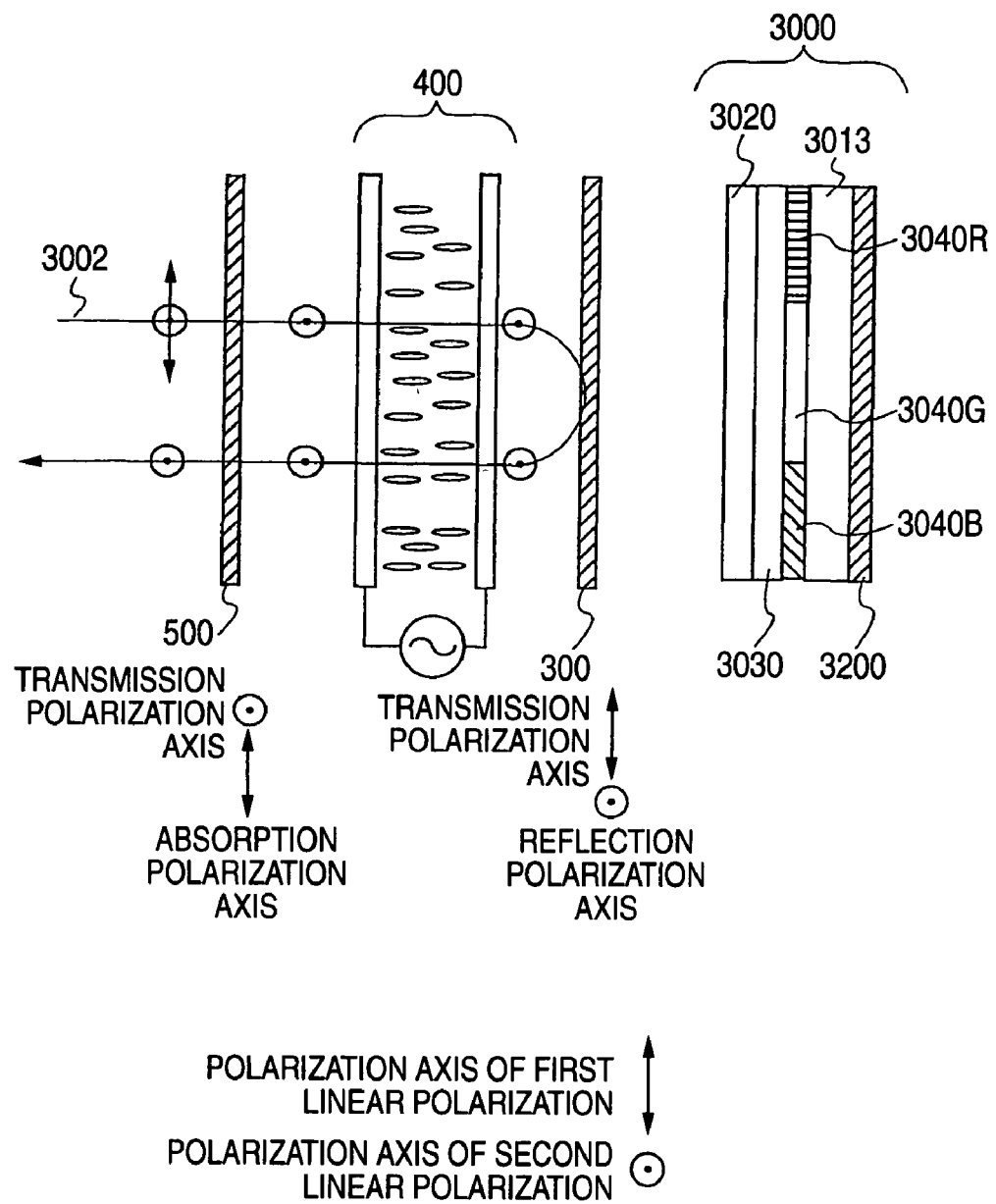
FIG. 34 is an explanatory drawing for explaining the operation of the display device of Example 6 of the invention.

FIG. 34 shows a case where the display device is in the mirror status. In this case, although the outside light 3002 proceeding toward the display device from the viewer side is non-polarized light, when it is transmitted through the absorbing polarization selection member 500, the first linear polarization component is absorbed, and only the second linear polarization component is transmitted and made incident at the transmission polarization axis variable portion 400. The outside light 3002 made incident at the transmission polarization axis variable portion 400 is transmitted through the transmission polarization axis variable portion 400 as the second linear polarization without its polarization axis being changed, and reaches the reflective polarization selection member 300. Because the reflective polarization select ion member 300 transmits the first linear polarization component and mirror-reflects the second linear polarization component, the outside light 3002 is reflected by the reflective polarization selection member 300. The outside light 3002 reflected by the reflective polarization selection member 300 is transmitted through the transmission polarization axis variable portion 400 as the second linear polarization without its polarization axis being changed, is further transmitted through the absorbing polarization selection member 500, and proceeds toward the viewer.

In other words, when the display device is in the mirror status, the outside light 3002 is reflected by reflective polarization selection member 300 without reaching the reflective liquid crystal element 3000, proceeds toward the viewer side, and functions as a bright mirror.

It should be noted that, when the display device is switched to the mirror status, the reflective liquid crystal element 3000 can be switched to a non-display state so that energy is not wastefully consumed.

Figure 35:
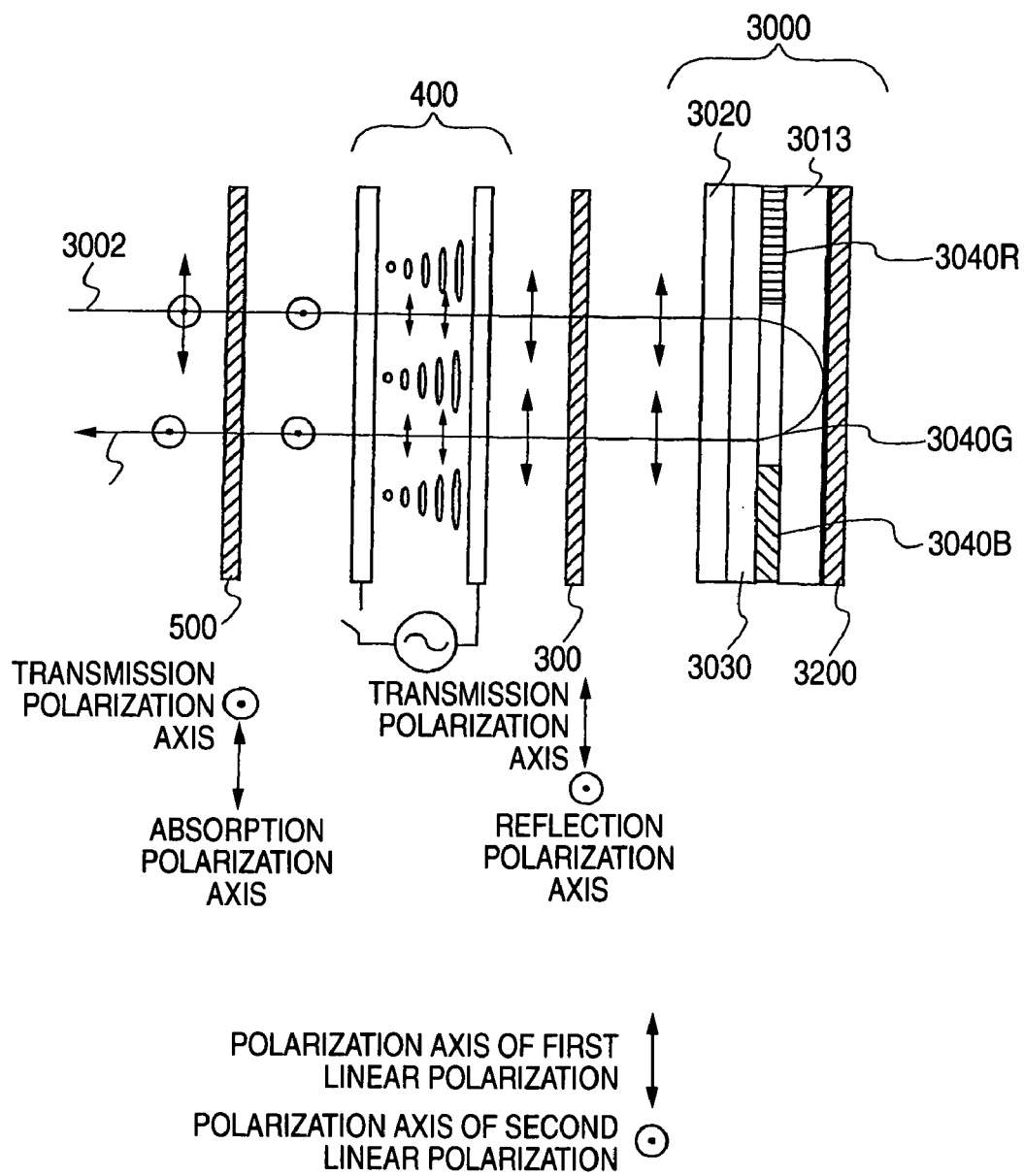
FIG. 35 is an explanatory drawing for explaining the operation of the display device of Example 6 of the invention.
Figure 36:
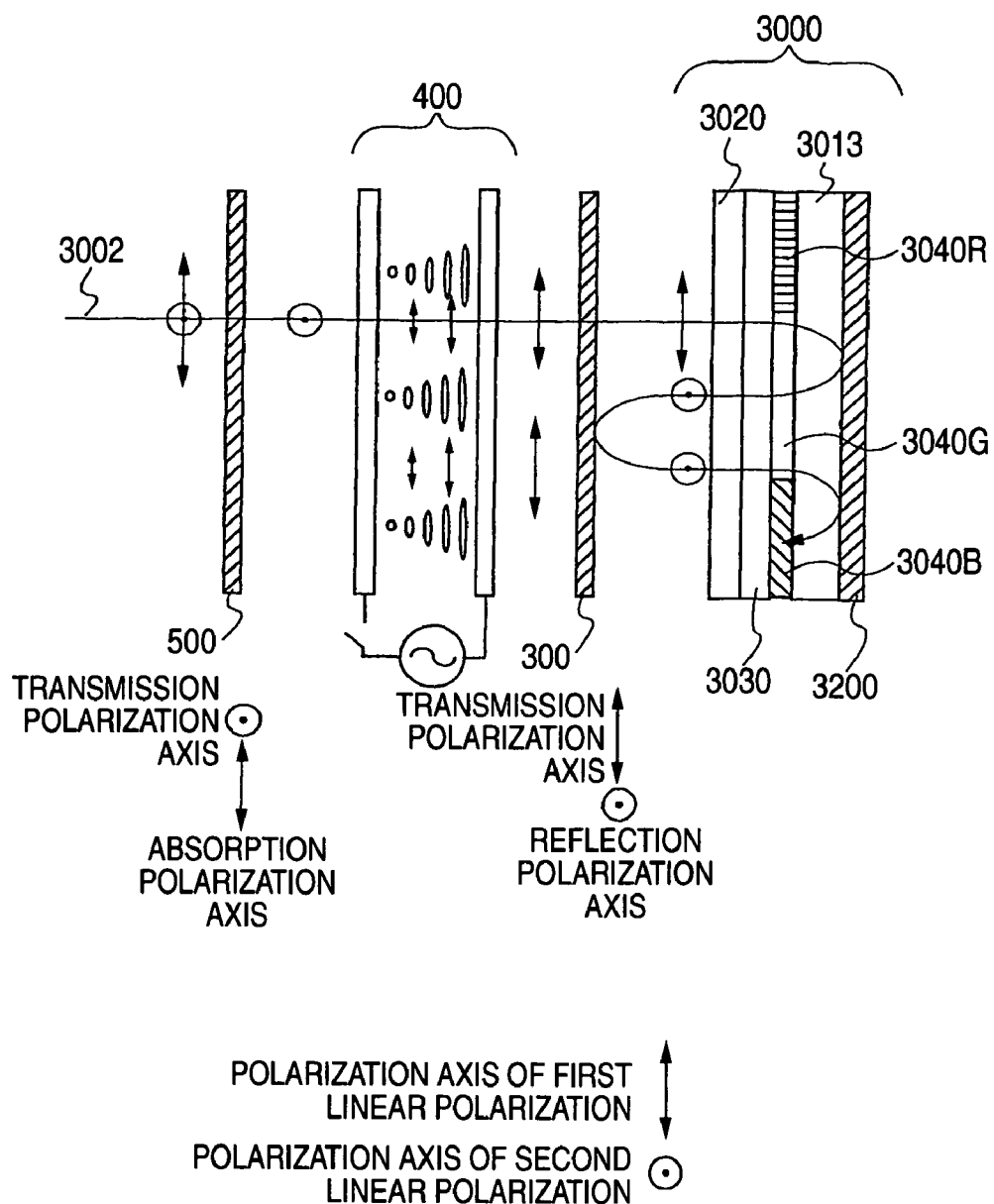
FIG. 36 is a schematic structural diagram for explaining the operation of the display device of the invention.

FIG. 35 and FIG. 36 show a case where the display device is in the image display status. The image display status will be also described with reference to FIG. 32. In this case, although the outside light 3002 proceeding from the viewer side (left side in the drawing) toward the display device is non-polarized light, when it is transmitted through the absorbing polarization selection member 500, the first linear polarization component is absorbed, and only the second linear polarization component is transmitted. When the outside light 3002 transmitted through the absorbing polarization selection member 500 is transmitted through the transmission polarization axis variable portion 400, it is changed from the second linearly polarized light to the first linearly polarized light, transmitted through the reflective polarization selection member 300, and made incident at the reflective liquid crystal element 3000. The first linearly polarized light made incident at the reflective liquid crystal element 3000 is transmitted through the phase-difference plate 3020 and the liquid crystal layer 3130, is reflected by the pixel electrode 3070, again passes through the liquid crystal layer 3130 and the phase-difference plate 3020, and is made incident at the reflective polarization selection member 300. At this time, the polarization state of the light transmitted through the liquid crystal layer 3130 is changed by voltage applied to the liquid crystal layer 3130.

Here, the switching element 3110 is connected to the pixel electrode 3070 via the through hole 3120 and switches the voltage applied to the pixel electrode 3070, whereby the voltage applied to the liquid crystal layer 3130 sandwiched between the transparent electrode 3050 and the pixel electrode 3070 can be controlled per pixel. Therefore, by applying a voltage corresponding to the image information to the transparent electrode 3050 and the pixel electrode 3070 and applying a predetermined voltage to the liquid crystal layer 3130, the polarization state of the light passing through the liquid crystal layer 3130 is controlled, the light amount transmitted through the reflective polarization selection member 300 is controlled, and an optical image can be formed.

FIG. 35 illustrates the case of the bright display. In the configuration of the present example, when a voltage is not applied to the liquid crystal layer 3130, the light made incident at the reflective liquid crystal element 3000 is reflected as the first linearly polarized light, is again transmitted through the reflective polarization selection member 300, and is made incident at the transmission polarization axis variable portion 400. When the light made incident at the transmission polarization axis variable portion 400 is transmitted therethrough, it is changed from the first linearly polarized light to the second linearly polarized light, transmitted through the absorbing polarization selection member 500, proceeds toward the viewing side, and becomes the bright display.

FIG. 36 shows the case of the dark display. In the configuration of the present example, when the predetermined voltage is applied to the liquid crystal layer 3130, the first linearly polarized light made incident at the reflective liquid crystal element 3000 is reflected by the reflective liquid crystal element 3000 and emitted, at which time it becomes the second linearly polarized light and is again made incident at the reflective polarization selection member 300. The second linearly polarized light that is again made incident at the reflective polarization selection member 300 is reflected by the reflective polarization selection member 300 and again made incident at the reflective liquid crystal element 3000. The second linearly polarized light made incident at the reflective liquid crystal element 3000 is reflected by the reflective liquid crystal element 3000 and emitted, at which time it becomes the first linearly polarized light.

However, at this time, the three types of color filters 3040 including respectively different transmission spectrums corresponding to the three primary colors of red, green, and blue are alternatingly repeated and formed on the transparent substrate 3030 of the reflective liquid crystal element 3000. Therefore, for example, as is illustrated, the light initially made incident at the reflective liquid crystal element 3000 is made incident at the green color filter 3040G, transmitted, and made incident at the blue color filter 3040B in the second incidence, whereby the light is virtually absorbed and becomes the dark display. Also, even if the light made incident at the reflective liquid crystal element 3000 passes through a color filter of the same color, it passes twice along a reciprocal path so that it passes through the color filter for a total of four times, whereby the dark display is obtained. That is, in the configuration of the present example, the color filters are used as members for improving the darkness of the display.

In order to realize a sufficiently dark display, it is preferable to pass through the color filters of the different colors when it passes through the color filters four times. For this reason, it is preferable for the arrangement of the color filters to be made into a delta arrangement and not a stripe, in order for the colors of the color filters that are vertically and left-right adjacent to be as different as possible.

Also, because the thicker the transparent substrate 3030 of the reflective liquid crystal element 3000 is, the easier it becomes for the light reflected by the reflective polarization selection member 300 to pass through different positions of the reflective liquid crystal element 3000 and pass through the color filters of the different colors, it is preferable to thicken the transparent substrate 3030 as much as possible within a practical range.

As described above, according to the display device of Example 6, the reflective polarization selection member 300 is switchable between an effectively transparent state and a state functioning as a mirror, due to the control of the polarization state by the transmission polarization axis variable portion 400. Therefore, in the image display status, the reflective polarization selection member 300 is switched to the effectively transparent state, whereby a bright image is obtained. Moreover, even in an environment in which the surrounding area is bright, deterioration of image quality, such as glare in a case where a half mirror is used, and a drop in the contrast ratio and a drop in the brightness of the image light accompanying glare, does not arise. In other words, switching between the image display status and the mirror status can be realized without deteriorating their mutual performance.

Incidentally, in the present example, a case was described where a polarizing plate functioning as the absorbing polarization selection member is not disposed at the reflective liquid crystal panel 3000. This is because it is important to reduce as much as possible members that absorb light in order to improve the brightness of the image display status. In particular, it is because it is a situation in which it is not allowable for an image to become darker due to the mirror function portion comprising the absorbing polarization selection member, the transmission polarization axis variable portion, and the reflective polarization selection member, because an image is originally dark in a reflective liquid crystal display panel capable of color display. Therefore, a polarizing plate may be disposed at the reflective liquid crystal element 3000 if the purpose is one in which the frequency of use is high in a place where the outside light is strong, such as outdoors.

Moreover, if the polarizing plate is one having a high transmittance, in which the transmittance with respect to the predetermined linearly polarized light component is near 100%, it is preferable that the brightness of the image is virtually not reduced even if the transmission polarization axis of the polarizing plate is combined with the transmission polarization axis of the reflective polarization selection member and the polarizing plate is disposed at the reflective liquid crystal element 3000, i.e., between the reflective polarization selection member 300 and the transparent substrate 3030. In this case, although an image display of a sufficient contrast ratio is not possible with a single reflective liquid crystal panel because the degree of polarization of a polarizing plate with a high transmittance is usually low, there are no problems with display performance when a polarizing plate having a high degree of polarization is used as the absorbing polarization selection member 500. Rather, in the case of the image display, there is the advantage that a darker dark display is realized and an image display with a high contrast ratio can be realized.

In other words, in a case where a reflective liquid crystal display panel in which a reflective portion is internally housed within a substrate is used as the image display member, when a polarizing plate having a high degree of polarization is used for the absorbing polarization selection member and a polarizing plate having a low degree of polarization and a high transmittance is used for the absorbing polarization selection member disposed at the reflective polarization selection member side of the image display member, brightness and a high contrast ratio of an image are balanced.

It should be noted that, although a case was described in the present example where a reflective liquid crystal display panel is used, a reflective display and a transmissive display may be used together by disposing an opening portion in part of the pixel electrode functioning as the reflective member to partially transmit. In this case, a ¼ phase-difference plate, a polarizing plate, and a lighting system may be disposed at the undersurface of the reflective member. According to this configuration, display of an image becomes possible, even in a situation in which the outside light is weak, such as at night or inside a building, by turning on the lighting system.

EXAMPLE 7

Another example of the invention will be described on the basis of the drawings.

Figure 38A:
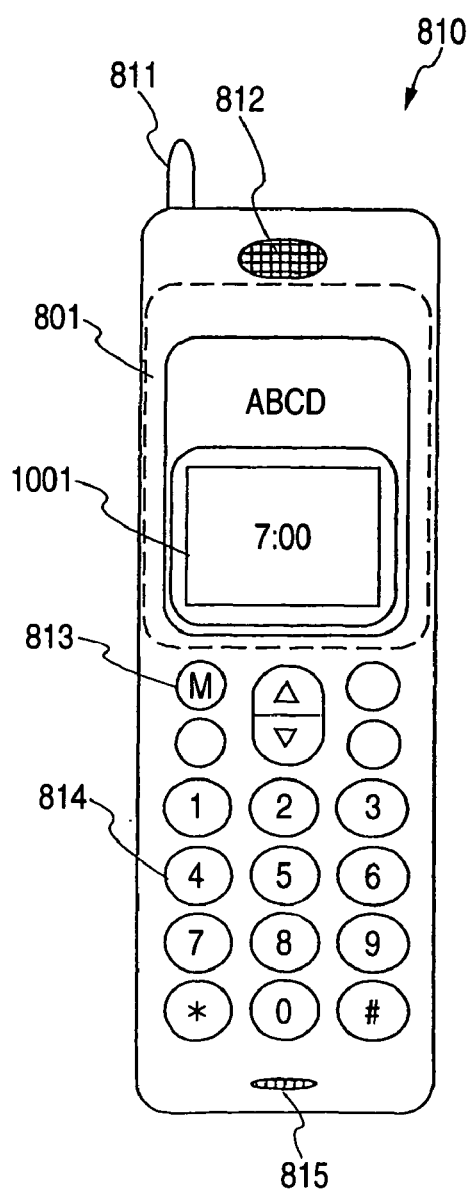
FIGS. 38(a) and 38(b) are top views showing appearances of a mobile telephone pertaining to Example 7 of the invention.
Figure 38B:
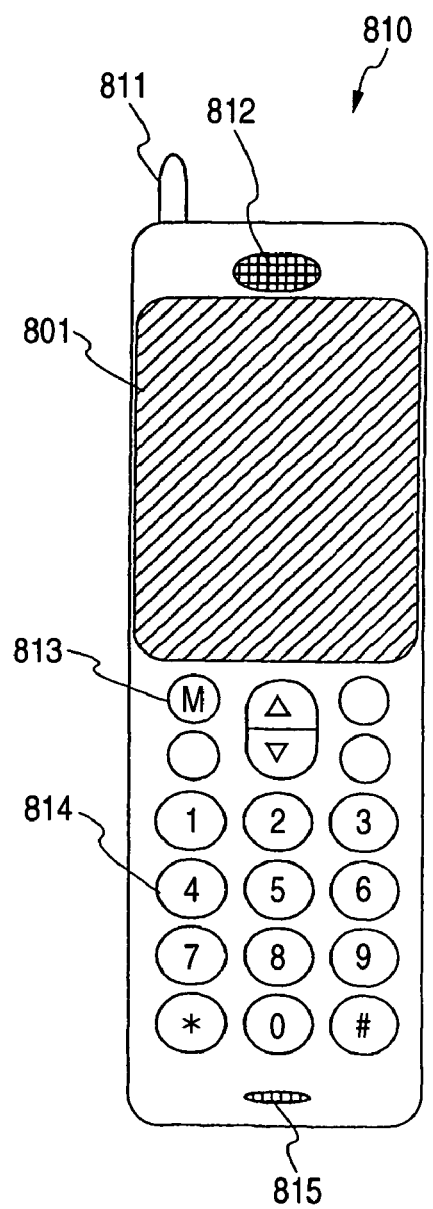
Figure 39:
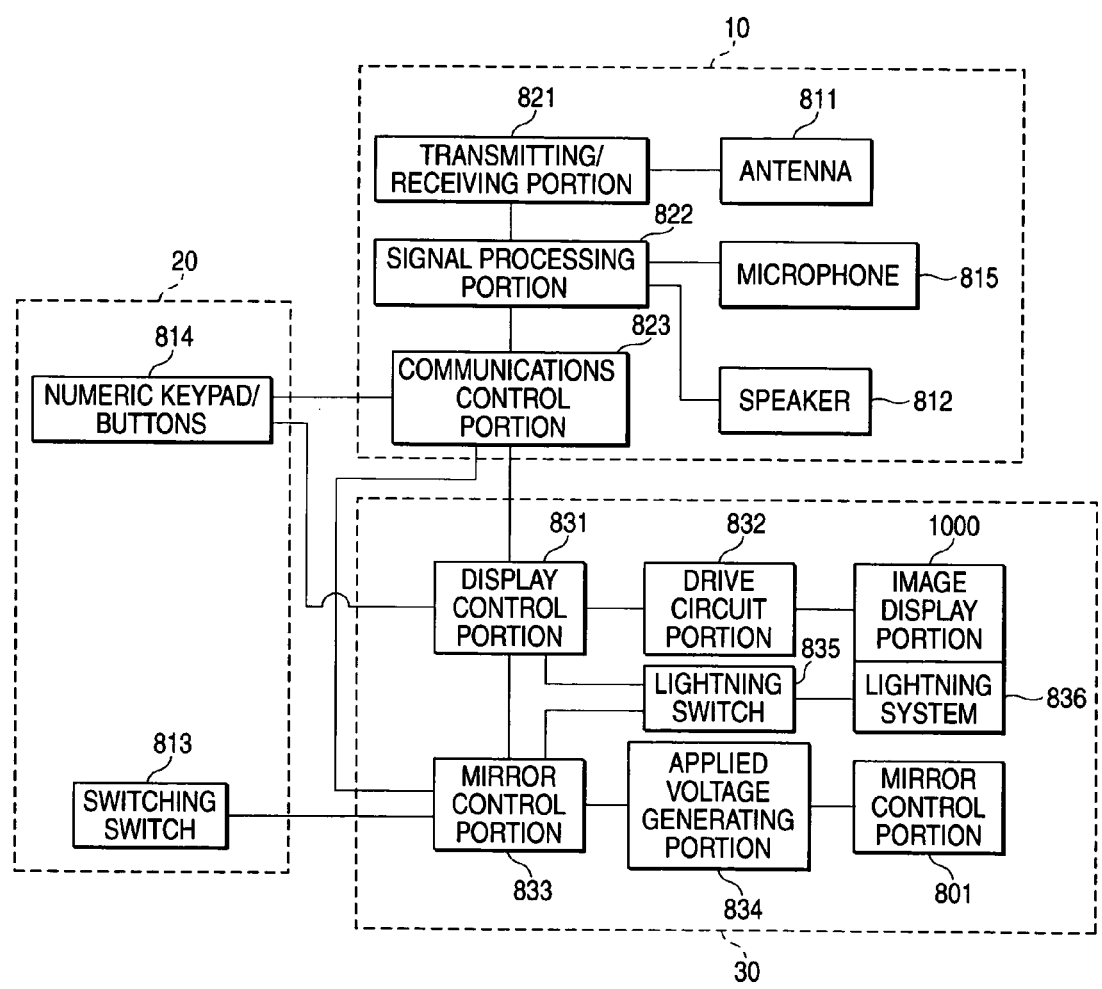
FIG. 39 is a block diagram showing a schematic functional configuration of the mobile telephone pertaining to Example 7 of the invention.

A display device disposed with a function for switching to a mirror status of Example 7 will be described using FIG. 37. Also, FIG. 38 are pattern diagrams showing appearances of a mobile telephone in which the present display device is used, with FIG. 38(*a*) showing an image display status and FIG. 38(*b*) showing a mirror status. FIG. 39 shows an example of a circuit configuration of the mobile telephone shown in FIG. 38 and in which the present display device is used.

A mobile telephone 810 of Example 7 includes at least an antenna 811, a speaker 812, buttons 814 such as a numeric keypad, a microphone 815, a switching switch 813 of the mirror status and the image display status, the image display portion 1000 of the present display device, and a mirror function portion 801.

The mobile telephone 810 of Example 7 is disposed with a communications portion 10 for realizing telephone functions, an operations portion 20 for inputting operations, and a display portion 30 according to the invention that is capable of switching between an information display state and the mirror status. The communications portion 10 is disposed with a transmitting/receiving portion 821, which is connected to the antenna 811 and implements the transmission/reception of communications signals, a signal processing portion 822, which conducts the input and output of audio information through the microphone 815 and the speaker 812 and implements signal conversion processing between the audio information and transmitted and received signals, and a communications control portion 823, which controls the transmitting and receiving operations in response to inputted operation instructions. The operations portion 20 is disposed with the numeric keypad/buttons 814 that conduct input of various operations, and the switching switch 813 for switching between the information display state and the mirror status.

The display portion 30 is disposed with the image display portion 1000, which is disposed with a lighting system 836 and conducts information display, a display control portion 831, which receives control instructions from the communications portion 10 and the operations portion 20 and controls the operation of the display portion, a drive circuit portion 832, which drives the image display portion 1000 in response to a control signal from the display control portion 831, the mirror function portion 801, which is superposed on the image display portion 1000 and selectively realizes the mirror status and a transmission state, an applied voltage generating portion 834, which generates at least a voltage applied to the transmission polarization axis variable portion 400 of the mirror function portion 801, a mirror control portion 833, which controls the applied voltage generating portion 834 so as to switch the state of the mirror function portion 801 in response to a communications state or an instruction from the switching switch 813, and a lighting switch 835 for turning the lighting system on and off in response to a control signal from the mirror control portion 833 and the display control portion 831.

Figure 37:
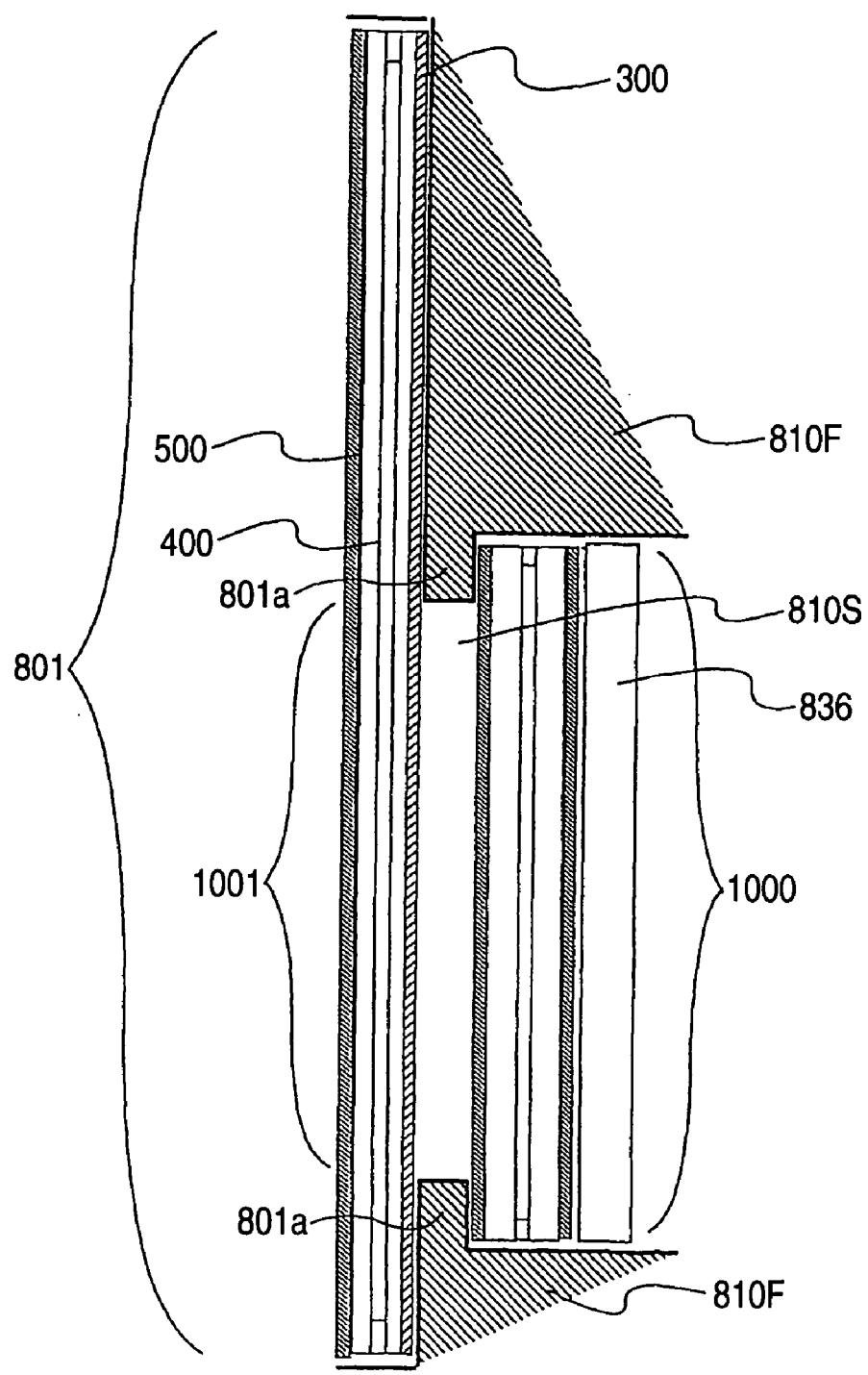
FIG. 37 is a partial cross-sectional view of a display device of Example 7 of the invention.

As shown in FIG. 37, the present display device is one in which the area of the mirror function portion 801, which includes the reflective polarization selection member 300, the transmission polarization axis variable portion 400, and the absorbing polarization selection member 500, has been made larger than the area of an image display region 1001 of the image display portion 1000. Aside from this, because the present display device basically includes the same configuration and functions as those in Example 1, the same reference numerals will be given to parts that are the same as those in the above-described examples and detailed description will be omitted.

The reflective polarization selection member 300 of the mirror function portion 801 is fixed, by a transparent adhesive, to a substrate configuring the transmission polarization axis variable portion 400. A projecting portion 801a formed in a mobile telephone frame 810F is used as a spacer and a constant space 801S is disposed between the mirror function portion 801 and the image display portion 1000 so that interference patterns are not generated by the reflective polarization selection member 300 halfway contacting the image display portion 1000.

Here, as described above, given that the primary purpose of the present display device during the mirror status is to reflect a viewer's face for the viewer to view, and not to display information such as data thereon, it is preferable for the size of the mirror to be as described above, with a height of 58.6 mm and a width of 39.1 mm or more. However, because there are problems, such as power consumption increasing, when the image display portion is made large, the image display member cannot be made too large. On the other hand, problems do not arise by making the area of the mirror function portion large. Thus, in Embodiment 7, the area of the mirror function portion is made as large as possible, regardless of the area of the image display region 1001.

Also, the mirror function portion 801 of the present display device is one that can switch between an effectively transparent state and the mirror status due to the control of the polarization state by the transmission polarization axis variable portion 400. Therefore, in a case where the large area mirror function portion 801 is effectively transparent even if it is disposed with a design such as logo mark having been administered, the degree of freedom of the design of the device is not robbed because the substrate is not affected.

Next, the operation of the mobile telephone 810 of the present example will be described with reference to FIG. 38.

As shown in FIG. 38(*a*), in the case where image display is conducted even when the mobile telephone is in use or standing by, the mirror function portion 801 is effectively transparent, a bright image display is obtained, and logo marks and designs around the image display portion are also visible. As shown in FIG. 38(*b*), in the case of the mirror status, a mirror surface that is larger than the image display portion appear s and a practical mirror is obtained.

It should be noted that operability is high because the display device of Example 7 is configured so that switching between the mirror status and the image display status can be done with one touch by the switching switch 813. The switching switch 813 is configured so as to be capable of switching between a case where an alternating voltage of about ±3 V to ±5 V is applied to a pair of electrodes sandwiching the liquid crystal layer of the transmission polarization ax is variable portion 400 and a state in which the pair of electrodes is shorted. Moreover, in the case of the mirror status, power consumption is reduced by switching the image display portion 1000 to a non-display state and turning off the lighting system in conjunction with the switching switch 813.

Also, by configuring the device so that the switching from the mirror status to the image display status is automatically switched by an incoming call, convenience for the user is further improved because the incoming call information can be viewed without operating a switch.

It should be noted that no inconvenience is caused to the user because the switching of the mirror status and the image display status is switched at a high speed within several +msec when a TN liquid crystal element is used as the transmission polarization axis variable portion 400.

Also, although the area of the mirror function portion 801 is made larger than the area of the image display region 1001 in the present example, in the present invention, the ratio between the area of the mirror function portion 801 or a region that can realize the mirror status and the area of the image display region 1001 or a transmissive/reflective image display member is not limited to this example. of course, both areas maybe substantially the same, as in the above-described examples. Alternatively, it is also possible to make the area of the mirror function portion smaller, or superpose the mirror function portion on the image display portion excluding a specific region. For example, a configuration in which only the display portion of a mark that indicates whether or not the mobile telephone is in a communicable state is not covered by the mirror function portion, so that the mark can always be checked, can be made.

Moreover, although a case was described in the present example where the entire surface of the mirror function portion was switched to the mirror status, a configuration in which, for example, the mirror region of the mirror function portion is plurally divided and the switching between the mirror status and the image display status is conducted per divided region can be made. More specifically, a configuration can be made in which the application of voltage to the transmission polarization axis variable portion or the variable absorbing polarization selection member is conducted per divided region, or in which pixel electrodes are disposed in a matrix and optional pictures or characters in the mirror status are displayed.

EXAMPLE 8

Another example of the invention will be described on the basis of the drawings.

Figure 40:
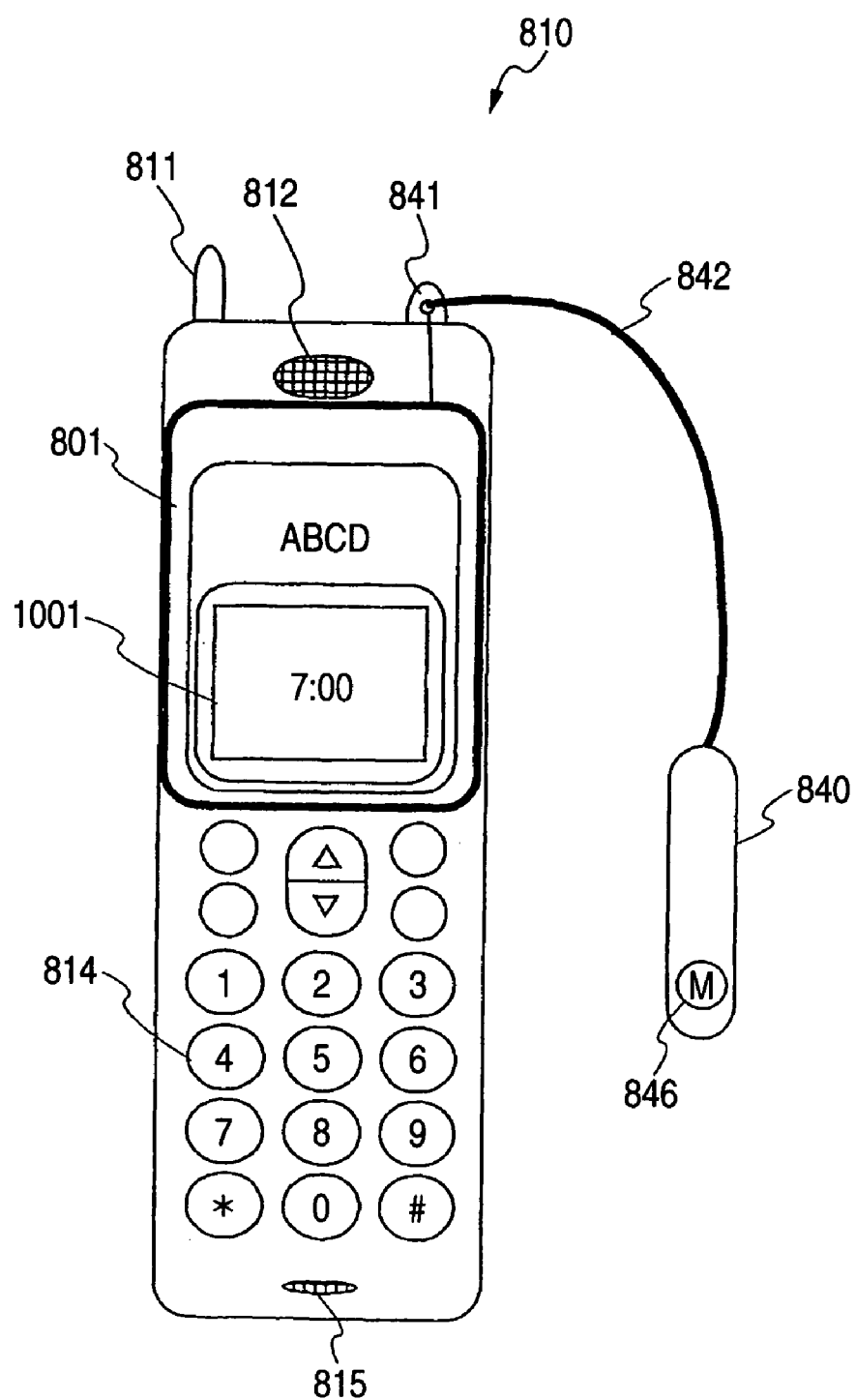
FIG. 40 is a top view showing an appearance of a mobile telephone pertaining to Example 8 of the invention.
Figure 41:
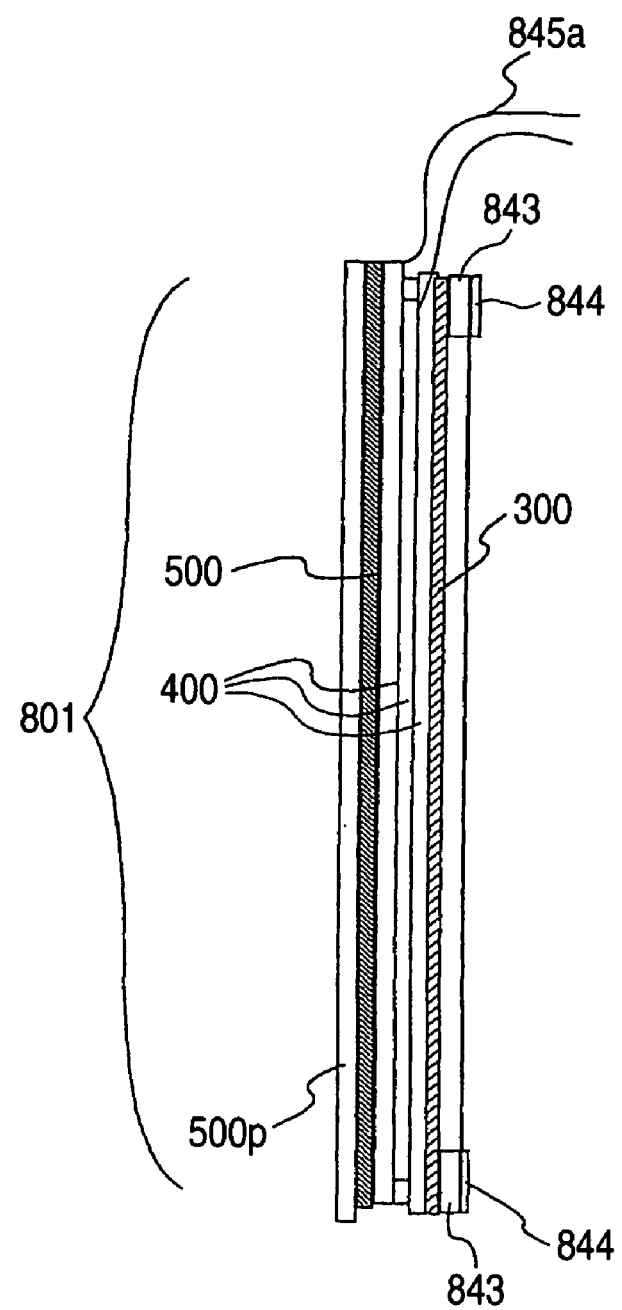
FIG. 41 is a partial cross-sectional view showing an example of a detachable mirror function portion pertaining to Example 8 of the invention.

Example 8 of the invention will be described using FIGS. 40, 41 and 42. In Example 8, the same reference numerals will be given to portions that are the same as those of Example 7, and detailed description will be omitted.

The configuration of Example 8 is a detachable mirror function portion that enables a user to impart a mirror function to an existing mobile telephone. As shown in FIG. 41, the detachable mirror function portion 801 includes the reflective polarization selection member 300, the transmission polarization axis variable portion 400, and the absorbing polarization selection member 500, and these are mutually adhered and fixed by a transparent adhesive. Also, a transparent protective member 500P comprising a film or a thin acrylic plate is adhered by a transparent adhesive on the surface of the absorbing polarization selection member 500. A sponge-like, frame-like spacer 843 having flexibility is disposed at a peripheral edge portion of the reflective polarization selection member 300, and a two-sided tape 844 is disposed on the surface of the spacer 843 as needed. The spacer 843 is disposed so that the reflective polarization selection member 300 can maintain a constant space without contacting other members when the mirror function portion is attached to a device such as a mobile telephone. Thus, interference fringe caused by the reflective polarization selection member 300 contacting other members is prevented.

The transmission polarization variable portion 400 is connected to a mirror function drive portion 840 via wiring connected to the transparent electrodes formed on in transparent substrate shapes configuring this.

Figure 42:
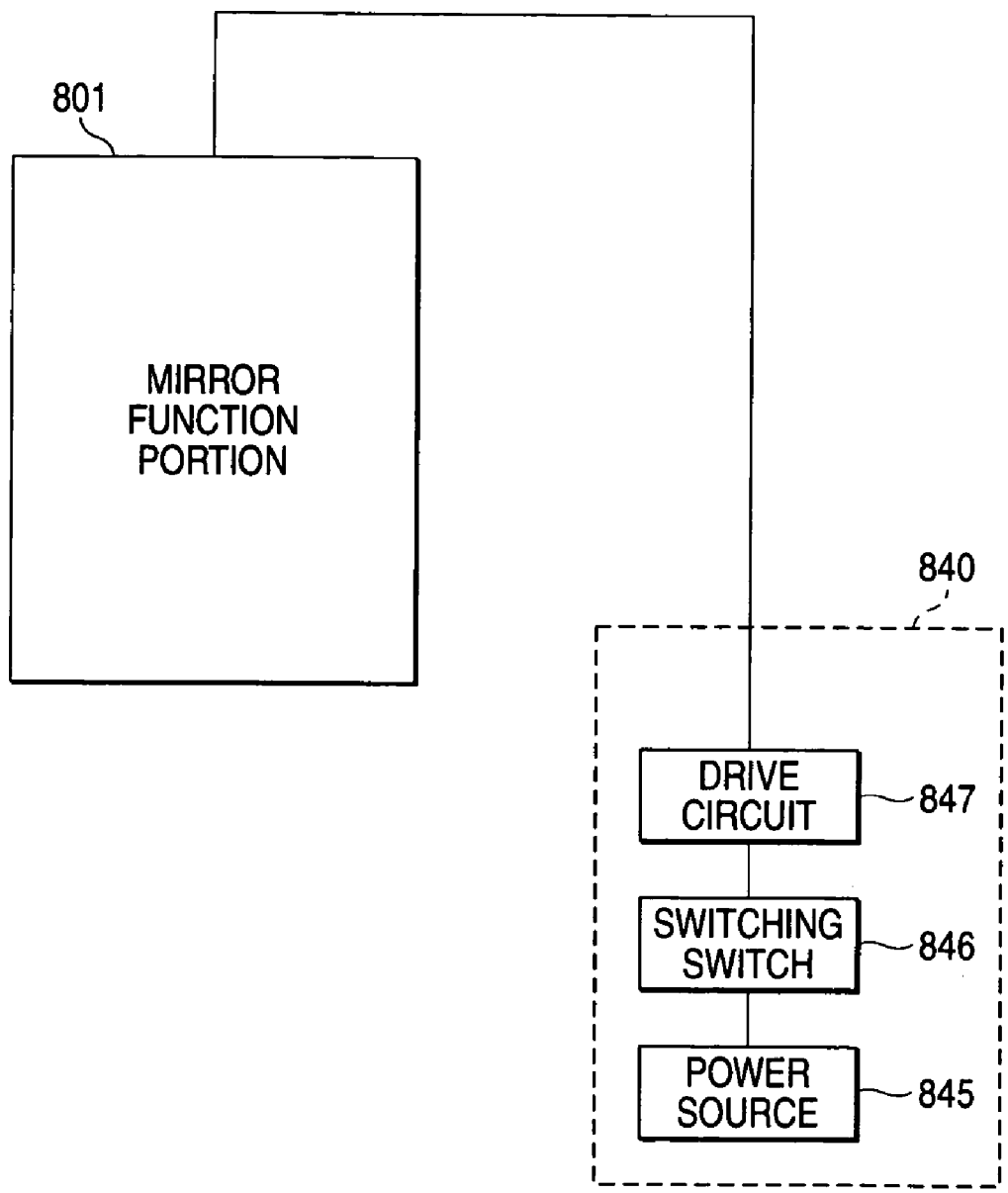
FIG. 42 is a block diagram showing a schematic functional configuration of a drive portion of the mirror function portion pertaining to Example 8 of the invention.

As shown in FIG. 42, the mirror function drive portion 840 is configured by a power source 845 comprising a small battery, a switching switch 846, and a drive circuit 847 that generates a voltage that drives the transmission polarization axis variable portion 400 by power supply from the power source 845, and drives the transmission polarization axis variable portion 400 by operation of the switching switch 846 to switch the mirror function portion between the mirror status and the transparent state.

When the mirror function portion 801 is attached to the mobile telephone 810, the wiring between the mirror function portion 801 and the mirror function drive portion 840 can be configured so that it is attached through a strap attachment portion 841 of the mobile telephone and wiring 842 and the mirror function drive portion 840 are like a strap. In this case, there is the advantage that, even if the mirror function drive portion 840 is accidentally pulled, the force thereof is stopped by the strap attachment portion 841 of the mobile telephone and is not directly added to the mirror function portion.

EXAMPLE 9

Figure 43:
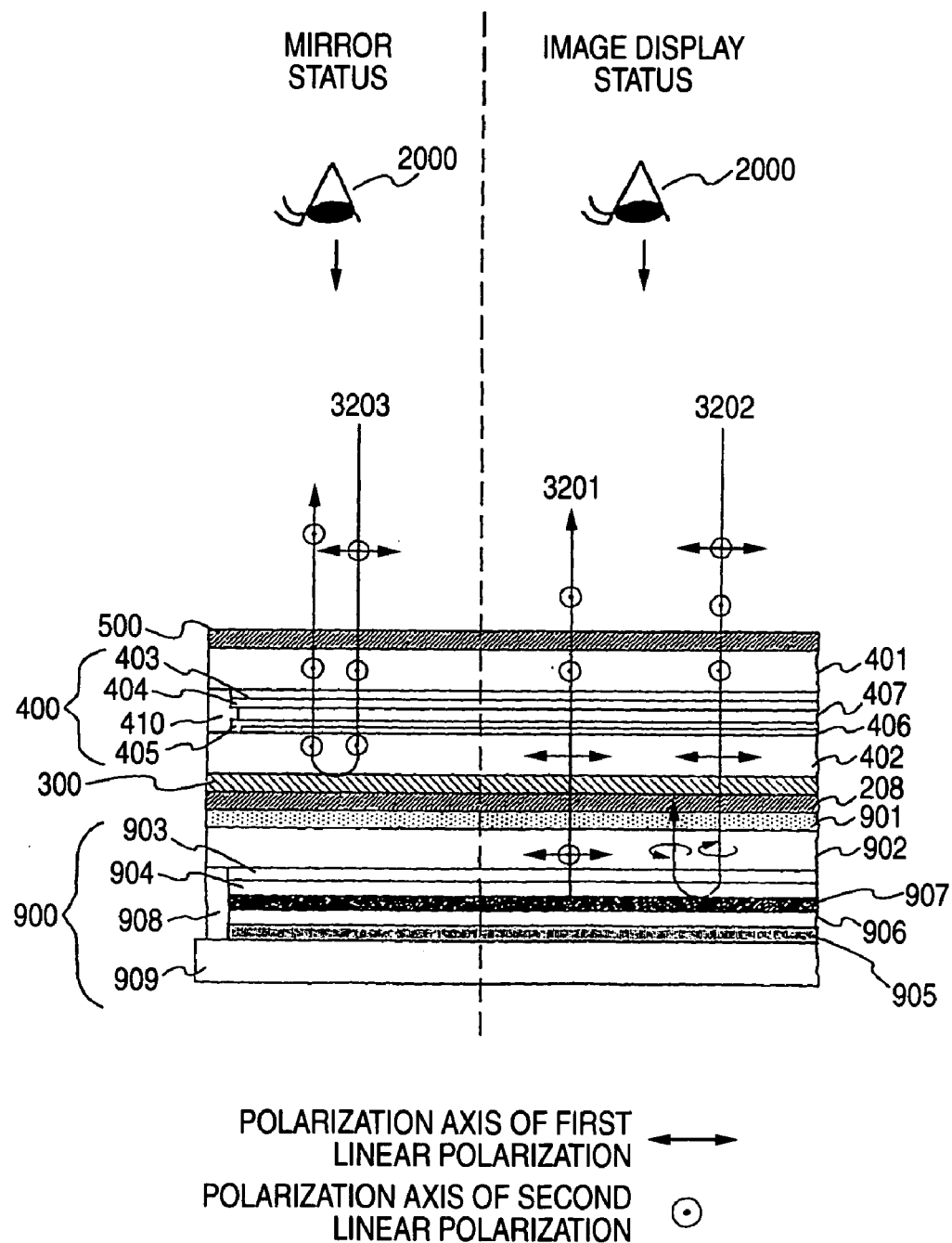
FIG. 43 is a partial cross-sectional view showing an example of a display device of Example 9 of the invention.

A display device of Example 9 of the invention will be described on the basis of FIG. 43.

The display device of Example 9 of FIG. 43 uses an organic electroluminescence (EL: electro luminescence) display panel 900 as an image display portion emitting the image light, and the same reference numerals will be given to members that are the same as those of Example 1, and detailed description will be omitted.

The present display device is configured by the organic EL display panel 900 that emits image light of the first linear polarization, the reflective polarization selection member 300, the transmission polarization axis variable portion 400, and the absorbing polarization selection member 500. The absorbing polarization selection member 208 and phase-difference plate 901, which transmit the first linear polarization component and absorb the second linear polarization component, whose polarization axis is orthogonal to that of the first linear polarization component, are disposed at the side of the organic EL display panel 900 facing the reflective polarization selection member 300.

A ¼ wavelength plate may be used as the phase-difference plate 901. For example, a polymer film such as uniaxially stretched polycarbonate, polysulfone, or polyvinyl alcohol can be used. Although it is difficult to configure a phase-difference plate functioning as a ¼ wavelength plate with respect to the entire visible wavelength region with one type of phase-difference plate due to wavelength dependency (below, wavelength dispersion) of the refractive index of materials commonly configuring the ¼ wavelength plate, a plate configured to function as a ¼ wavelength plate in a wide wavelength region by adhering together at least two types of phase-difference plates whose wavelength dispersion is different so that the optical axes thereof are orthogonal can be used.

The organic EL display panel 900 is a self-luminous display device that converts electric energy to light energy by injecting a current to an emission layer comprising an organic thin film and emits the light energy, and has a configuration in which a transparent electrode 903 comprising ITO, a hole transport layer 904, an emission layer 907, an electron transport layer 906, and a reflective metal electrode 905 configured by Al or the like are successively laminated on the transparent substrate 902. These laminated films are sealed by a sealing agent 908 between the transparent substrate 902 and a seal member 909 in a state in which oxygen and water have been removed in order to suppress deterioration.

It is thought that, in an organic EL display panel, when a DC voltage is applied between the transparent electrode 903, which is an anode, and the reflective metal electrode 905, which is a cathode, the hole injected from the transparent electrode 903 passes through the hole transport layer 904 and electrons injected from the cathode (reflective metal electrode) 905 pass through the electron transport layer, so that they respectively reach the emission layer 907, recombination of the electrons/hole is generated, and an emission of a predetermined wavelength is generated. Because the light emitted from the emission layer 907 is usually omnidirectionally and isotropically emitted without directivity, it is preferable to use a metal electrode or an electrode material having high reflectance in order to effectively use the light processing to the metal electrode 905 as display light.

The configuration of the organic EL display panel 900 is not limited to the above-described configuration. In other words, a self-luminous display device that is configured by at least an emission layer and a reflective member disposed at the undersurface of the emission layer can be used as the organic EL display panel pertaining to the invention.

Next, the operation of the display device of Example 9 will be described using FIG. 43. The right side of FIG. 43 shows the image display status and the left side of FIG. 43 shows the mirror status.

When the display device is in the image display status, the transmission polarization axis variable portion 400 is switched to a state in which voltage is not applied to the liquid crystal layer 407 configuring this, i.e., an OFF state. In the case of the image display status, light emitted from the emission layer is directly emitted from the transparent substrate 902 or emitted from the transparent substrate 902 after being reflected by the undersurface metal electrode 905.

When image light 3201 emitted from the transparent substrate 902 is transmitted through the phase-difference plate 901 and passes through the absorbing polarization selection member 208, the first linear polarization component is transmitted and the second linear polarization component, whose polarization axis is orthogonal to that of the first linear polarization component, is absorbed. The image light 3201 transmitted through the absorbing polarization selection member 208 is also transmitted through the reflective polarization selection member 300 and made incident at the transmission polarization axis variable portion 400. In this case, the image light 3201 passing through the transmission polarization axis variable portion 400 is changed from the first linear polarization to the second linear polarization. The image light 3201 transmitted through the transmission polarization axis variable portion 400 is made incident at the absorbing polarization selection member 500. Because the absorbing polarization selection member 500 absorbs the first linear polarization component and transmits the second linear polarization component, the image light 3201 that is changed to the second linearly polarized light by the transmission polarization axis variable portion 400 is transmitted through the absorbing polarization selection member 500 and viewed by a viewer 2000.

Although outside light 3202 made incident at the display device from the viewer 2000 side is non-polarized light, when it is transmitted through the absorbing polarization selection member 500, the first linear polarization component is absorbed and only the second linear polarization component is transmitted. When the outside light 3202 transmitted through the absorbing polarization selection member 500 is transmitted through the transmission polarization axis variable portion 400, it is changed from the second linearly polarized light to the first linearly polarized light, transmitted through the reflective polarization selection member 300, and made incident at the organic EL display panel 900.

When the outside light 3202 made incident at the organic EL display panel 900 is transmitted through the absorbing polarization selection member 208 and transmitted through the phase-difference plate 901, it receives the action thereof and becomes a circular polarization (here, for example, a clockwise circular polarization). When the outside light 3202 transmitted through the phase-difference plate 901 is reflected by the metal electrode 905, it becomes a circular polarization in which the phase is π offset and the rotational direction is reversed (a counterclockwise circular polarization). When the outside light 3202 reflected by the metal electrode 905 is again transmitted through the phase-difference plate 901, it receives the action thereof, this time becomes the second linear polarization, and is absorbed by the absorbing polarization selection member 208, whereby it does not return to the viewer 2000 side.

Therefore, in the image display status, a bright image can be obtained because the image light 3201 emitted from the organic EL display panel 900 proceeds toward the viewer with virtually no loss. Moreover, because the outside light 3202 made incident at the display device from the surrounding area is not reflected by the reflective polarization selection member 300 functioning as a mirror in the case of the mirror status, and because the light reflected by the metal electrode 905 of the organic EL display panel 900 is absorbed by the absorbing polarization selection member 208, it is virtually not viewable to the viewer 2000. In other words, an image display having a high contrast ratio and in which unnecessary reflection of outside light is suppressed can be realized.

When the display device is switched to the mirror status, the transmission polarization axis variable portion 400 is switched to an ON state by applying an electric field to the liquid crystal layer 407 configuring this. In the case of the mirror status, although outside light 3203 proceeding toward the display device from the viewer 2000 side is non-polarized light, when it is transmitted through the absorbing polarization selection member 500, the first linear polarization component is absorbed and only the second linear polarization component is transmitted and made incident at the transmission polarization axis variable portion 400. At this time, the outside light 3203 made incident at the transmission polarization axis variable portion 400 is transmitted through the transmission polarization axis variable portion 400 as the second linearly polarized light without its polarization axis being changed, and reaches the reflective polarization selection member 300. At the reflective polarization selection member 300, because the first linear polarization component is transmitted and the second linear polarization component is mirror-reflected, the outside light 3203 is reflected by the reflective polarization selection member 300. The outside light 3203 reflected by the reflective polarization selection member 300 is transmitted through the transmission polarization axis variable portion 400 as the second linear polarization without its polarization axis being changed, is also transmitted through the polarization selection member 500 and proceeds toward the viewer, whereby the mirror status is realized.

At this time, it is preferable to switch the display region of the organic EL display panel 900 corresponding to the region serving as the mirror status to a non-emitting state at the same time as the operation of the mirror function. Because leakage of light from an undersurface side of the reflective polarization selection member 300 can be completely eliminated by this operation, a high-definition mirror that reflects a reflection image of a high contrast ratio can be realized, and power consumption of the display device is reduced by the amount that the emission amount is suppressed.

However, the display region does not always have to be switched to a non-emitting state. Even when the image light is emitted from the organic EL display panel 900, because the image light emitted from the organic EL display panel 900 is the first linearly polarized light transmitted through the absorbing polarization selection member 208, it is transmitted through the reflective polarization selection member 300, transmitted through the transmission polarization axis variable portion 400 as the first linearly polarized light without its polarization axis being changed, absorbed by the absorbing polarization selection member 500, and is virtually not viewable to the viewer 2000. Thus, a mirror that reflects a reflection image of a high contrast ratio can be realized.

It should be noted that the characteristics of the polarizing plates functioning as the absorbing polarization selection member 208 and the absorbing polarization selection member 500 are directly related to the image quality of the image display status and the ease with which the mirror of the mirror status can be viewed. For this reason, similar to Example 1, it is effective to use a polarizing plate having a high degree of polarization for one of the absorbing polarization selection member 208 and the absorbing polarization selection member 500 and to use a polarizing plate having a low degree of polarization for the other in order to maintain a sufficient contrast ratio and to improve luminance in the image display status.

As described above in each of the examples, according to the display device of the present invention, because the reflective polarization selection member functioning as the mirror can be optionally switched between an effectively transparent state and a state functioning as the mirror, there is the effect that the switching between the image display status and the mirror status can be realized without deteriorating their mutual performance. In other words, in the image display status, a bright image is obtained with virtually no loss of image light, and a high-definition image, in which there is no deterioration of image quality resulting from outside light such as glare and a drop in contrast ratio accompanying glare, is obtained even in an environment in which the surrounding area is bright.

In the mirror status, there is the effect that a bright mirror can be realized because outside light is effectively reflected, and because leakage of light of the image light is suppressed, a mirror that reflects a reflection image having a high contrast ratio can be realized. Therefore, in the mirror status, an easy-to-view reflection image suitable for a person to view his/her own face or figure is obtained.

As described above, according to the invention, there can be provided a device that is capable of switching between a state in which a high-quality image is displayed and a mirror status in which is obtained an easy-to-view reflection image suitable for a person to view his/her own face or figure.

What is claimed is:

1. A device capable of switching between an image display status and a mirror status, the device comprising:
an image display portion that emits image light for displaying a desired image; and
a mirror function portion that is superposed on the image display portion and is capable of being switched between an image transmittance state that transmits the image light and a mirror status that reflects outside light, the mirror function portion comprising reflective polarization selection means, transmission polarization axis variable means, and absorbing polarization selection means successively disposed from the image display portion side, with the reflective polarization selection means transmitting a first polarization of a predetermined polarization axis and reflecting a second polarization whose polarization axis intersects that of the first polarization, the transmission polarization axis variable means being capable of switching between a state that transmits by changing the incident first polarization to the second polarization and a state that transmits without changing the polarization axis of the incident light, and the absorbing polarization selection means transmitting one of the first polarization and the second polarization and absorbing the other, and the image display portion comprising a lighting system, a liquid crystal display panel and an image light-use polarization selection means disposed proximate to the liquid crystal display panel, wherein:

the image light-use polarization selection means transmits light of the desired image of the first polarization and absorbs light of the second polarization, and the image display portion emits the desired image, as the image light, light of the first polarization transmitted through the image light-use polarization selection means.

2. The device of claim 1, further comprising:

switching means for switching the mirror function portion between the image transmittance state and the mirror status, wherein the switching means switches the mirror function portion to the image transmittance state by switching the transmission polarization axis variable means to a state that changes the first polarization to the second polarization and switches the mirror function portion to the mirror status by switching the transmission polarization axis variable means to a state that transmits without changing the incident polarization axis.

3. The device of claim 1, further comprising:

switching means for switching the mirror function portion between the image transmittance state and the mirror status, wherein the switching means switches the mirror function portion to the image transmittance state by switching the transmission polarization axis variable means to a state that transmits without changing the incident polarization axis and switches the mirror function portion to the mirror status by switching the transmission polarization axis variable means to a state that changes the first polarization to the second polarization.

4. The device of claim 2 or 3, wherein:

the image display portion is capable of being switched to a state in which the image light is not emitted, and when the switching means switches the mirror function portion to the mirror status, the switching means switches, in conjunction therewith, the image display portion to the state in which the image light is not emitted.

5. The device of claim 4, wherein:

the switching means turns the lighting system off or switches the liquid crystal element to a dark display in order to switch the image display portion to the state in which the image light is not emitted.

6. The device of claim 4, wherein:

the transmission polarization axis variable means has a configuration that is capable of being switched to a state that transmits only through a partial region without changing the incident polarization axis, and the switching means switches a display of the image display portion of a portion overlapping with the partial region to a dark display when the transmission polarization axis variable means is switched to the state that transmits only through the partial region without changing the incident polarization axis and the image light is not emitted from the partial region.

7. The device of claim 1, wherein:

the transmission polarization axis variable means comprises a liquid crystal layer and an electrode for applying an electric field in a thickness direction of the liquid crystal layer, the liquid crystal layer has a configuration in which a long axis direction of liquid crystal molecules is continuously twisted 90° in the thickness direction when the electric field is not applied and in which the long axis direction of the liquid crystal molecules becomes parallel to the thickness direction when the electric field is applied, and, when the mirror function portion is in the mirror status, the transmission polarization axis variable means is in a state that applies the electric field to the liquid crystal layer.

8. The device of claim 1, wherein the transmission polarization axis variable means includes a liquid crystal layer and an electrode for applying an electric field in a thickness direction of the liquid crystal layer, the liquid crystal layer having a configuration in which a long axis direction of liquid crystal molecules is continuously twisted 90° in the thickness direction when the electric field is not applied and in which the long axis direction of the liquid crystal molecules becomes parallel to the thickness direction when the electric field is applied, and, when the mirror function portion is in the mirror status, the transmission polarization axis variable means is in a state that does not apply the electric field to the liquid crystal layer.

9. The device of claim 1, wherein, when P1 represents the degree of polarization of the image light-use polarization selection means and P2 represents the degree of polarization of the absorbing polarization selection means, the relationship of $0.966 \leq P1 \leq 0.995 \leq P2$ is satisfied.

10. The device of claim 1, wherein, when P1 represents the degree of polarization of the image light-use polarization selection means and P2 represents the degree of polarization of the absorbing polarization selection means, the relationship of $0.966 \leq P2 \leq 0.995 \leq P1$ is satisfied, and when the mirror function portion is switched to the mirror status, the image display portion is switched, in conjunction therewith, to a state in which the image light is not emitted.

11. The device of claim 1, wherein a size of a region serving as the mirror status of the mirror function portion is at least 58.6mm ×39.1mm.

12. A device capable of switching between an image display status and a mirror status, the device comprising the following elements arranged in the following order:

a) an absorbing polarization selection member with an absorption polarization axis in a first direction and a transmission polarization axis in a second direction, wherein the first direction and the second direction are approximately perpendicular;

b) a transmissive polarization axis variable portion, wherein the polarization axis of transmitted light is not changed when no voltage is applied, and is either changed from the first direction to the second direction or from the second direction to the first direction when voltage is applied;

c) a reflective polarization selection member with a reflective polarization axis in the second direction and a transmission polarization axis in the first direction, wherein elements a), b), and c) act as a mirror for outside light with the second polarization axis when voltage is applied to element b), and wherein elements a), b), and c) act as a window for outside light with the second polarization axis when voltage is not applied to element b);

d) an absorbing polarization selection member with a transmission polarization axis in the first direction and an absorption polarization axis in the second direction;

e) a liquid crystal panel; and f) a lighting system, wherein elements d), e), and f) act as an image display portion for image light with a transmission polarization axis in the first direction when the lighting system and the liquid crystal panel are powered.

13. A device capable of switching between an image display status and a mirror status, the device comprising the following elements arranged in the following order:

a) an absorbing polarization selection member with a transmission polarization axis in a first direction and an absorption polarization axis in a second direction, wherein the first direction and the second direction are approximately perpendicular;

b) a transmissive polarization axis variable portion, wherein the polarization axis of transmitted light is not changed when no voltage is applied, and is either changed from the first direction to the second direction or from the second direction to the first direction when voltage is applied;

c) a reflective polarization selection member with a reflective polarization axis in the second direction and a transmission polarization axis in the first direction, wherein elements a), b), and c) act as a mirror for outside light with the second polarization axis when voltage is not applied to element b), and wherein elements a), b), and c) act as a window for outside light with the second polarization axis when voltage is applied to element b);

d) an absorbing polarization selection member with a transmission polarization axis in the first direction and an absorption polarization axis in the second direction;

e) a liquid crystal panel; and f) a lighting system, wherein elements d), e), and f) act as an image display portion for image light with a transmission polarization axis in the first direction when the lighting system and the liquid crystal panel are powered.

\* \* \* \* \*